(12) United States Patent
Mirza et al.

(10) Patent No.: US 9,056,539 B2
(45) Date of Patent: *Jun. 16, 2015

(54) DISPLAY APPARATUS AND METHOD HAVING PARAMETER DISPLAY TOGGLE CAPABILITY FOR AN ENVIRONMENTAL CONTROL SYSTEM

(75) Inventors: Muhammad Ali Mirza, Farmers Branch, TX (US); Timothy E. Wallaert, Wylie, TX (US)

(73) Assignee: LENNOX INDUSTRIES INC., Richardson, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 12/884,628

(22) Filed: Sep. 17, 2010

(65) Prior Publication Data

US 2011/0010651 A1 Jan. 13, 2011

Related U.S. Application Data

(63) Continuation of application No. 12/197,078, filed on Aug. 22, 2008, now abandoned, and a continuation of application No. 12/197,127, filed on Aug. 22, 2008.

(51) Int. Cl.
*G06F 3/048* (2013.01)
*B60H 1/00* (2006.01)
*F24F 11/00* (2006.01)
*G05D 23/19* (2006.01)
(Continued)

(52) U.S. Cl.
CPC ........ *B60H 1/00985* (2013.01); *B60H 1/00642* (2013.01); *F24F 11/0009* (2013.01); *F24F 2221/32* (2013.01); *F24F 2011/0068* (2013.01); *F24F 2011/0091* (2013.01); *G06F 3/048* (2013.01); *B60H 1/00657* (2013.01); *G05D 23/1902* (2013.01); *F24F 11/00* (2013.01); *G05D 23/1951* (2013.01); *B60H 1/0065* (2013.01); *F24F 11/001* (2013.01); *F24F 11/0086* (2013.01); *G06F 3/04847* (2013.01); *G06F 3/0484* (2013.01); *F24F 2011/0057* (2013.01); *F24F 11/0012* (2013.01); *G05D 23/00* (2013.01)

(58) Field of Classification Search
CPC .............. G05D 23/00; G05D 23/1902; G05D 23/1951; F24F 11/00; F24F 11/001; F24F 11/0009; F24F 11/0012; F24F 2011/0057; F24F 11/0086; F24F 2011/0068; F24F 2011/0086; F24F 2011/0091; F24F 2221/32; B60H 1/00642; B60H 1/0065; B60H 1/00657; B60H 1/00985; G06F 3/04847; G06F 3/0484; G06F 3/048
USPC ........................................... 715/780; 236/1 R
See application file for complete search history.

(56) References Cited

U.S. PATENT DOCUMENTS

| | | | |
|---|---|---|---|
| 4,606,401 | A | 8/1986 | Levine et al. |
| 4,621,336 | A | 11/1986 | Brown |
| 5,124,957 | A | 6/1992 | Owens et al. |

(Continued)

*Primary Examiner* — Patrick Riegler

(57) ABSTRACT

A display apparatus for a control unit in an environmental control system; the display apparatus including: a display area presenting a plurality of first loci, a plurality of second loci and at least one third locus; each respective first locus of the plurality of first loci being responsive to pressure for effecting a respective response; each respective second locus of the plurality of second loci presenting information using a fixed segment data format; at least one third locus of the at least one third locus presenting information using a dot matrix data format, the display apparatus configured to allow a display of parameters to be toggled.

19 Claims, 51 Drawing Sheets

(51) Int. Cl.
*G06F 3/0484* (2013.01)
*G05D 23/00* (2006.01)

(56) References Cited

U.S. PATENT DOCUMENTS

| | | |
|---|---|---|
| 5,125,078 A | 6/1992 | Matsuda et al. |
| 5,613,157 A | 3/1997 | Davidson et al. |
| 5,771,634 A | 6/1998 | Fudger |
| 5,873,519 A | 2/1999 | Beilfuss |
| 5,974,554 A | 10/1999 | Oh |
| 6,380,953 B1 | 4/2002 | Mizuno |
| 6,496,168 B1 | 12/2002 | Tomida |
| 6,502,758 B2 | 1/2003 | Cottrell |
| 6,639,939 B1 | 10/2003 | Naden et al. |
| 6,820,235 B1 | 11/2004 | Bleicher et al. |
| 6,997,390 B2 | 2/2006 | Alles |
| 7,016,855 B2 | 3/2006 | Eaton et al. |
| 7,028,912 B1 | 4/2006 | Rosen |
| 7,114,554 B2 | 10/2006 | Bergman et al. |
| 7,191,038 B2 | 3/2007 | Green et al. |
| 7,556,207 B2 | 7/2009 | Mueller et al. |
| 7,565,813 B2 | 7/2009 | Pouchak |
| 7,604,046 B2 | 10/2009 | Bergman et al. |
| 7,641,126 B2 | 1/2010 | Schultz et al. |
| 7,693,582 B2 | 4/2010 | Bergman et al. |
| 7,802,618 B2 | 9/2010 | Simon et al. |
| 8,083,154 B2 | 12/2011 | Schultz et al. |
| 8,091,795 B1 | 1/2012 | McLellan et al. |
| 8,196,185 B2 | 6/2012 | Geadelmann et al. |
| 2004/0074978 A1* | 4/2004 | Rosen .................. 236/1 C |
| 2004/0133314 A1 | 7/2004 | Ehlers et al. |
| 2004/0193324 A1 | 9/2004 | Hoog et al. |
| 2004/0216059 A1 | 10/2004 | Vong et al. |
| 2005/0103875 A1 | 5/2005 | Ashworth et al. |
| 2005/0116930 A1* | 6/2005 | Gates .................. 345/158 |
| 2005/0119765 A1* | 6/2005 | Bergman et al. ............ 700/16 |
| 2005/0119766 A1 | 6/2005 | Amundson et al. |
| 2005/0194457 A1 | 9/2005 | Dolan |
| 2005/0224591 A1 | 10/2005 | Wolfson |
| 2006/0192021 A1 | 8/2006 | Schultz et al. |
| 2006/0206220 A1 | 9/2006 | Amundson |
| 2006/0283965 A1 | 12/2006 | Mueller et al. |
| 2007/0016311 A1 | 1/2007 | Bergman et al. |
| 2007/0045443 A1* | 3/2007 | Chapman et al. ............. 236/94 |
| 2007/0088463 A1 | 4/2007 | Green et al. |
| 2007/0114291 A1 | 5/2007 | Pouchak |
| 2007/0138308 A1 | 6/2007 | Schultz et al. |
| 2007/0257120 A1 | 11/2007 | Chapman, Jr. et al. |
| 2008/0048046 A1 | 2/2008 | Wagner et al. |
| 2008/0120446 A1 | 5/2008 | Butler et al. |
| 2008/0256475 A1 | 10/2008 | Amundson et al. |
| 2009/0001182 A1* | 1/2009 | Siddaramanna et al. ... 236/46 R |
| 2009/0005026 A1 | 1/2009 | Lunsford et al. |
| 2009/0033472 A1 | 2/2009 | Fotuhi |
| 2009/0057424 A1 | 3/2009 | Sullivan et al. |
| 2009/0140056 A1 | 6/2009 | Leen |
| 2009/0140062 A1* | 6/2009 | Amundson et al. ............. 236/51 |
| 2009/0143879 A1 | 6/2009 | Amundson et al. |
| 2009/0143916 A1 | 6/2009 | Boll et al. |
| 2009/0143918 A1 | 6/2009 | Amundson et al. |
| 2009/0158188 A1* | 6/2009 | Bray et al. .................. 715/771 |
| 2010/0044449 A1 | 2/2010 | Tessier |
| 2010/0050075 A1 | 2/2010 | Thorson et al. |
| 2010/0050108 A1 | 2/2010 | Mirza |
| 2010/0070086 A1 | 3/2010 | Harrod et al. |
| 2010/0070089 A1 | 3/2010 | Harrod et al. |
| 2010/0106305 A1 | 4/2010 | Pavlak et al. |
| 2010/0107112 A1 | 4/2010 | Jennings et al. |
| 2010/0272102 A1 | 10/2010 | Kobayashi |
| 2011/0004823 A1 | 1/2011 | Wallaert |
| 2011/0004824 A1 | 1/2011 | Thorson et al. |
| 2011/0004825 A1 | 1/2011 | Wallaert |
| 2011/0004842 A1 | 1/2011 | Mirza et al. |
| 2011/0007016 A1 | 1/2011 | Mirza et al. |
| 2011/0007017 A1 | 1/2011 | Wallaert |
| 2011/0010620 A1 | 1/2011 | Mirza et al. |
| 2011/0010621 A1 | 1/2011 | Wallaert et al. |
| 2011/0010652 A1 | 1/2011 | Wallaert |
| 2011/0010653 A1 | 1/2011 | Wallaert et al. |
| 2011/0010660 A1 | 1/2011 | Thorson et al. |

\* cited by examiner

DISPLAY APPARATUS AND METHOD HAVING PARAMETER DISPLAY TOGGLE CAPABILITY FOR AN ENVIRONMENTAL CONTROL SYSTEM

CROSS-REFERENCE TO RELATED APPLICATION

This application is a continuation of U.S. patent application Ser. No. 12/197,127, filed by Mirza on Aug. 22, 2008, entitled "Display Apparatus and Method for Entering a Reminder in a Control Unit for an Environmental Control System," and U.S. patent application Ser. No. 12/197,078, filed by Thorson, et al., on Aug. 22, 2008, entitled "Display Apparatus and Method for a Control Unit for an Environmental Control System," commonly assigned with this application and incorporated herein by reference.

TECHNICAL FIELD

This application is directed to heating ventilating air conditioning (HVAC) system controller devices, and especially to a thermostat or other control unit having a parameter display toggle capability.

BACKGROUND

HVAC systems have become more complex in recent years. Control units for use with HVAC systems have not been sufficiently detailed and varied in the information provided for a user to permit efficient use of features of the HVAC system. Complexity in programming and displaying information has caused some confusion to the extent that some users do not employ all of the features of an HVAC system, or find that the employment of some features is cumbersome.

Some attempts at facilitating the interface between a user and an HVAC control unit have involved limiting flexibility in the programming or display capabilities of the control unit. Such oversimplification of a control unit may also limit employment of features or capabilities of a HVAC system.

Prior art thermostat control devices generally require a user to enter a reminder interval or delay using a code corresponding to a time, such as a number of days. The time code is commonly provided in a user manual and is likely not something the user remembers. The capability to enter reminder delay interval or other time in terms of a number of months (or other predetermined time interval) in a display is a significant improvement in convenience and ease of use for a user.

SUMMARY

One aspect provides a display apparatus for a control unit in an environmental control system. In one embodiment, the display apparatus includes: a display area presenting a plurality of first loci, a plurality of second loci and at least one third locus; each respective first locus of the plurality of first loci being responsive to pressure for effecting a respective response; each respective second locus of the plurality of second loci presenting information using a fixed segment data format; at least one third locus of the at least one third locus presenting information using a dot matrix data format; the display apparatus configured to allow a display of parameters to be toggled.

Another aspect provides a touchscreen input apparatus for an environmental control system. In one embodiment, the apparatus includes: a display area having a plurality of touch-sensitive input loci, at least one first display locus and at least one second display locus; the at least one first display locus presenting information using a fixed segment data format; the touchscreen input configured to allow a display of individual parameters to be toggled.

Yet another aspect provides a method for entering input to an environmental control system. In one embodiment, the method includes: (a) providing a display area; (b) in no particular order: (1) presenting a plurality of first loci in the display area; (2) presenting a plurality of second loci in the display area; and (3) presenting at least one third locus in the display area; and (c) in no particular order: (1) configuring each respective first locus of the plurality of first loci for being responsive to pressure for effecting a respective the input; (2) configuring each respective second locus of the plurality of second loci presenting information using a fixed segment data format; (3) configuring at least one third locus of the at least one third locus presenting information using a dot matrix data format; and (4) allowing a display of individual parameters to be toggled.

BRIEF DESCRIPTION

Reference is now made to the following descriptions taken in conjunction with the accompanying drawings, in which.

DETAILED DESCRIPTION

Figure 1:
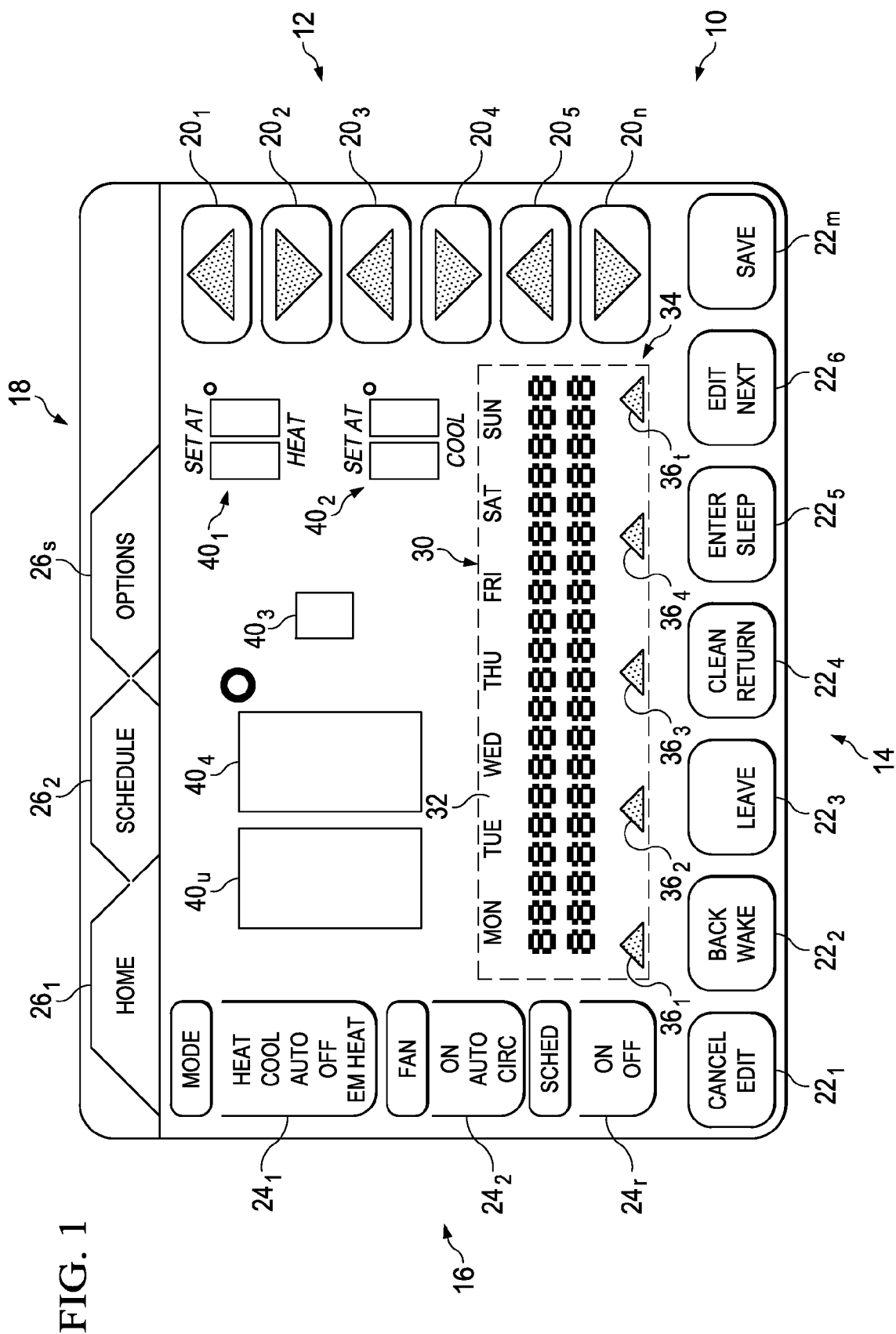
FIG. 1 is a plan view of a thermostat display configured according to the teachings of the present invention.

FIG. 1 is a plan view of a thermostat display configured according to the teachings of the present invention. In FIG. 1, a thermostat display 10 may be appropriate for use with a control unit in an environmental control system such as, by way of example and not by way of limitation, a Heating Ventilating Air Conditioning (HVAC) system. Display 10 may include a plurality of touch responsive loci configured to respond to pressure applied to respective touch responsive loci for effecting respective responses.

In the exemplary display 10 illustrated FIG. 1, touch responsive loci 12 may be generally indicated by delineated directional areas $20_1$, $20_2$, $20_3$, $20_4$, $20_5$, $20_n$ annotated with directional symbols indicating alteration or adjustment of a parameter up or down. Actuation may be carried out in any known manner, preferably by pressing or depressing an individual locus $20_n$ in the manner of a touch screen input device known by those skilled in the art of design of control devices for HVAC systems. The indicator "n" is employed to signify that there can be any number of delineated directional areas in display 10. The inclusion of six delineated directional areas $20_1$, $20_2$, $20_3$, $20_4$, $20_5$, $20_n$ in FIG. 1 is illustrative only and does not constitute any limitation regarding the number of delineated directional areas that may be included in the display of the present invention.

Display 10 may include additional touch responsive first loci 14 generally indicated by functional action areas $22_1$, $22_2$, $22_3$, $22_4$, $22_5$, $22_6$, $22_m$ annotated to indicate specified actions or functions that may be effected by actuating a respective area. Action area $22_1$ permits effecting a "CANCEL" or "EDIT" action or function. Action area $22_2$ permits effecting a "BACK" or "WAKE" action or function. Action area $22_3$ permits effecting a "LEAVE" action or function. Action area $22_4$ permits effecting a "CLEAN" or "RETURN" action or function. Action area $22_5$ permits effecting an "ENTER" or "SLEEP" action or function. Action area $22_6$ permits effecting an "EDIT" or "NEXT" action or function. Action area $22_m$ permits effecting a "SAVE" action or function. The indicator "m" is employed to signify that there can be any number of functional action areas in display 10. The inclusion of seven functional action areas $22_1$, $22_2$, $22_3$, $22_4$, $22_5$, $22_6$, $22_m$ in FIG. 1 is illustrative only and does not constitute any limitation regarding the number of functional action areas that may be included in the display of the present invention.

Display 10 may include additional touch responsive loci 16 generally indicated by mode controlling areas $24_1$, $24_2$, $24_r$ annotated to indicate specified modes or controls that may be effected by actuating a respective area. Mode controlling area $24_1$ permits effecting a "HEAT" mode, a "COOL" mode, an "AUTO" mode, an "OFF" mode or an "EM HEAT" (emergency heat) mode. Mode controlling area $24_2$ permits effecting a fan mode of "ON", "AUTO" or "CIRC" (circulate). Mode controlling area $24_r$ permits effecting a schedule mode of "ON" or "OFF". Actuation may be carried out in any known manner, preferably by pressing or depressing an individual locus $24_2$ in the manner of a touch screen input device known by those skilled in the art of design of control devices for HVAC systems. The indicator "r" is employed to signify that there can be any number of mode controlling areas in display 10. The inclusion of three mode controlling areas $24_1$, $24_2$, $24_r$ in FIG. 1 is illustrative only and does not constitute any limitation regarding the number of mode controlling areas that may be included in the display of the present invention.

Display 10 may include additional touch responsive loci 18 generally indicated by tab selecting areas $26_1$, $26_2$, $26_s$ annotated to indicate specified separate control menus or tabs that may be effected by actuating a respective area. Tab selecting area $26_1$ permits selecting a "HOME" menu or tab. Tab selecting area $26_2$ permits selecting a "SCHEDULE" menu or tab. Tab selecting area $26_s$ permits selecting an "OPTIONS" menu or tab. Actuation may be carried out in any known manner, preferably by pressing or depressing an individual locus $26_m$ in the manner of a touch screen input device known by those skilled in the art of design of control devices for HVAC systems. The indicator "s" is employed to signify that there can be any number of tab selecting areas in display 10. The inclusion of three tab selecting areas $26_1$, $26_2$, $26_s$ in FIG. 1 is illustrative only and does not constitute any limitation regarding the number of tab selecting areas that may be included in the display of the present invention.

Touch responsive areas 12, 14, 16, 18 may be configured using fixed segment display technology. Fixed segment display technology generally results in clear, crisp, well-defined displayed information. However, fixed segment display technology is generally inflexible and resistant to change. Fixed segment display technology is not readily amenable to presenting custom messages or similar ad hoc information displays. Displays employing fixed segment display technology do not permit in-the-field changes in displayed information to accommodate differing needs among different users.

Display 10 may include a display locus 30 configured to employ dot matrix display technology. Dot matrix display technology is readily accepting of changes so that customizable messages or other information may be presented using dot matrix display technology responsive to changes entered by a user. Display locus 30 may include a message zone 32 for display of customized messages, alerts or other displays. Display locus 30 may further include touch responsive loci 34, generally indicated by customizable selecting areas $36_1$, $36_2$, $36_3$, $36_4$, $36_t$ annotated to indicate specified separate control functions or selections that may be effected by pressing or otherwise actuating a respective area. Each of customizable selecting areas $36_1$, $36_2$, $36_3$, $36_4$, $36_t$ may be programmed to effect a predetermined response in reaction to pressure applied to a respective customizable area. The particular response to touching may be indicated by a customized message in display area 30 using dot matrix display technology. The indicator "t" is employed to signify that there can be any number of customizable selecting areas in display 10. The inclusion of five customizable selecting areas $36_1$, $36_2$, $36_3$, $36_4$, $36_t$ in FIG. 1 is illustrative only and does not constitute any limitation regarding the number of customizable selecting areas that may be included in the display of the present invention. Alternatively, selecting areas $36_1$, $36_2$, $36_3$, $36_4$, $36_t$ may be non-responsive to touch but may be employed to effect labeling of associated touch-responsive areas located substantially adjacent to selecting areas $36_1$, $36_2$, $36_3$, $36_4$, $36_t$. By way of example and not by way of limitation, selecting area $36_1$ may be employed to label functional area $22_2$ for use as a selecting button associated with an element displayed in message zone 32. Selecting area $36_2$ may be employed to label functional area $22_3$ for use as a selecting button associated with an element displayed in message zone 32. Selecting area $36_3$ may be employed to label functional area $22_4$ for use as a selecting button associated with an element displayed in message zone 32. Selecting area $36_4$ may be employed to label functional area $22_5$ for use as a selecting button associated with an element displayed in message zone 32. Selecting area $36_t$ may be employed to label functional area $22_6$ for use as a selecting button associated with an element displayed in message zone 32.

Other areas of display 10 may be configured for display only without providing a coincident touch sensitive area for receiving user inputs such as, by way of example and not by way of limitation, display-only areas $40_1$, $40_2$, $40_3$, $40_4$, $40_u$. Display-only areas $40_1$, $40_2$, $40_3$, $40_4$, $40_u$ may employ any display technology, but preferably employ fixed segment display technology. By way of example and not by way of limitation, display-only area $40_1$ may display up to two digits indicating a set temperature for a HEAT mode of operation, display-only area $40_2$ may display up to two digits indicating a set temperature for a COOL mode of operation, display-only area $40_3$ may display an "F" indicator indicating degrees Fahrenheit or a "C" indicator indicating degrees Celsius, and display-only areas $40_4$, $40_u$ may cooperate to display up to two digits indicating an extant indoor temperature. The indicator "u" is employed to signify that there can be any number of display-only areas in display 10. The inclusion of five display-only areas $40_1$, $40_2$, $40_3$, $40_4$, $40_u$ in FIG. 1 is illustrative only and does not constitute any limitation regarding the number of display-only areas that may be included in the display of the present invention.

Day-of-week indicators "MON" (Monday), "TUE" (Tuesday), "WED" (Wednesday), "THU" (Thursday), "FRI" (Friday), "SAT" (Saturday) and "SUN" (Sunday) are illustrated as being included within message zone 32 and configured using dot-matrix display format. Day-of-week indicators may be situated outside of message zone 32 and configured using fixed segment display format if desired.

Employment of fixed segment display technology and dot matrix display technology in display 10 permits designing display 10 so that frequently used controls and associated information displays such as, by way of example and not by way of limitation, controls and information related with touch responsive loci 12, 14, 16, 18 may be rendered in highly readable fixed segments. Mixing display technologies also permits dynamic information to be rendered in dot matrix display technology to present customizable text messages clearly understandable by a user and instructive to a user.

By way of example and not by way of limitation, system status indications on prior art thermostat display units have typically been effected using fixed indicators such as a light indicator, a code display or a fixed Liquid Crystal Display (LCD) text. Such fixed indicators are not generally descriptive so that a user, such as a homeowner, may be left wanting more information than is provided by the indicator. This may be the case when a "trouble" indicator such as a lighted or blinking Light Emitting Diode (LED) indicator is actuated, but no indication of the exact problem is available without consulting a user's manual. Further, because the indicators are in fixed positions on the display screen there is not a single place on the screen or other user interface that one can always look at to determine whether there are any problems. An indicator of system status could be located anywhere on the display screen making it difficult to review system status. Difficulty in reviewing system status may create a possibility of a critical message being inadvertently overlooked.

Providing a variable display area such as display area using a technology permitting variation of information presented permits a user to look to a particular area of display 10, such as display area 30, to quickly and assuredly determine whether the system is operating properly and, if not, what the nature of an extant problem may be.

Figure 2:
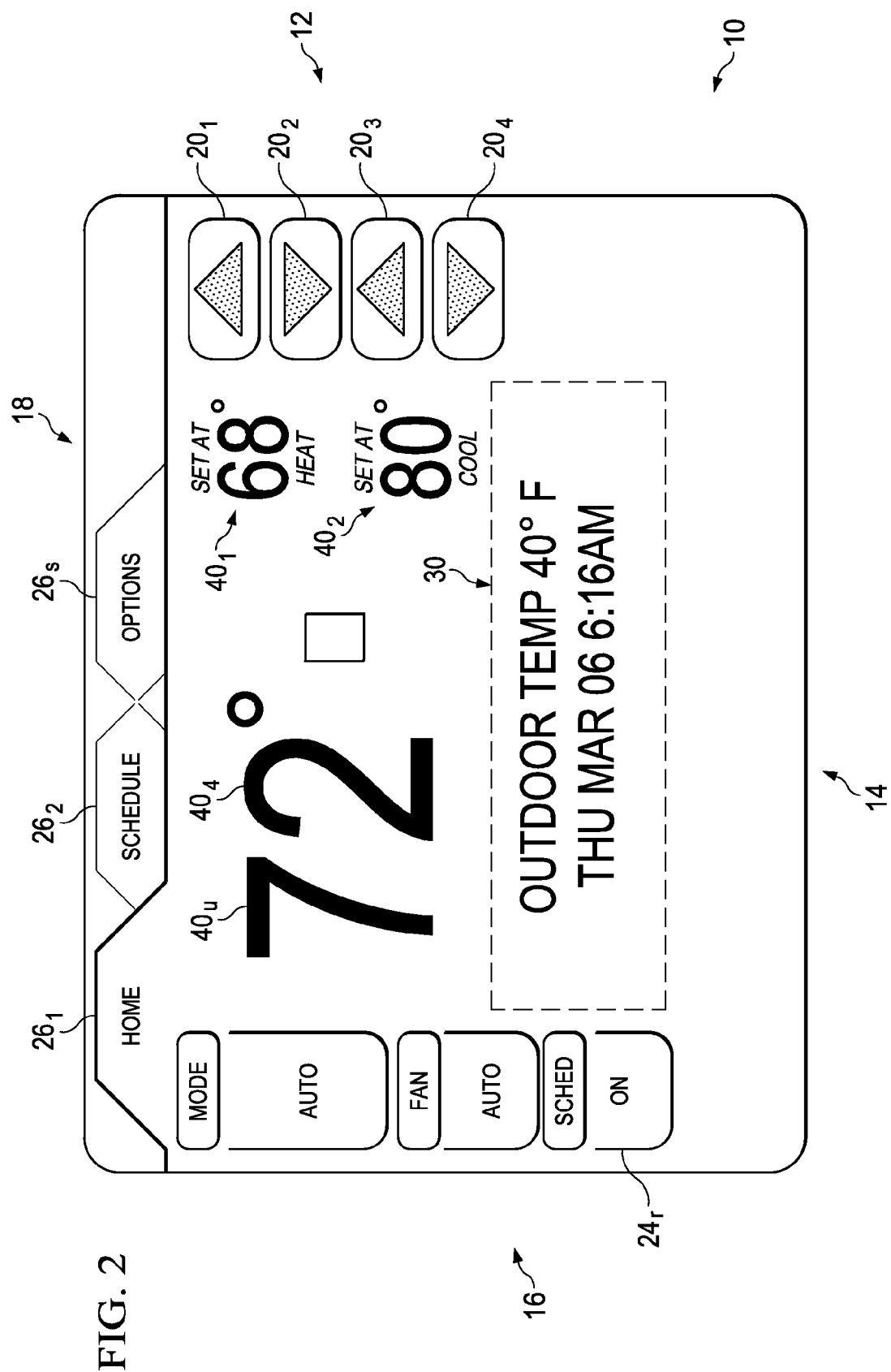
FIG. 2 is a first view of the display illustrating features associated with the HOME Tab.

FIG. 2 is a first view of the display illustrating features associated with the HOME Tab. In FIG. 2, HOME tab selecting area $26_1$ is depressed or otherwise actuated to orient display 10 in an exemplary "HOME" configuration. Display 10 is preferably configured with a backlit screen with adjustable brightness and presents large graphics so as to be easy to read and easy to use.

A user's depressing or otherwise actuating HOME tab selecting area $26_1$ configures display 10 for displaying current system operations including, by way of example and not by way of limitation, display of indoor temperature (display only areas $40_4$, $40_u$) and heating and cooling set points (display only areas $40_1$, $40_2$) and permits a user to make adjustments to system operation. The HOME tab may be actuated automatically pursuant to satisfying predetermined conditions. By way of example and not by way of limitation, the HOME tab may be actuated when there is a period of inactivity (e.g., 60 seconds) while a user is on either the SCHEDULE tab or the OPTIONS tab In the "HOME" configuration illustrated in FIG. 2, touch responsive loci 12 are partially presented to provide directional areas $20_1$, $20_2$, $20_3$, $20_4$; touch responsive loci 14 are generally not presented to a user; touch responsive loci 16 are generally fully presented (touch responsive loci 16 are represented in FIG. 2 as having experienced selection by a user to establish an AUTO Mode with Fan in AUTO and Schedule ON); and touch responsive loci 18 are generally fully presented as having experienced selection by a user to establish the HOME configuration.

Providing a "file folder" type of display organization using TABS selectable by depressing or otherwise activating tab selecting areas $26_1$, $26_2$, $26_s$ avoids cluttering display 10 with menu selections that are not relevant to an extant selection task. As prior art thermostat control displays added more and more capability to control an associated HVAC system, the number of buttons and menu screens became more and more complicated. A result was complex control or programming procedures that were cumbersome to execute, even with the aid of an associated user's manual. Providing TABS improves intuitive easy navigating among functions programmable or selectable using display 10. Grouping configuration and control options on logical TABS on the user interface, i.e., display 10, provides a user with displays familiar to users, especially to users having experience dealing with such software programs as MS Excel® (a trademark of Microsoft Corporation) and various web browser programs. Tabbed interface permits users to quickly navigate to and control features of a system.

If an outdoor temperature sensor is installed (not shown in FIG. 2), display area 30 may display outdoor temperature, or relative humidity, or both outdoor temperature and relative humidity (only outdoor temperature is illustrated as displayed in FIG. 2), along with accompanying information such as, by way of example and not by way of limitation, date and time.

By way of example and not by way of limitation, display 10 may be operated in the HOME configuration illustrated in FIG. 2 to permit a user to actuate the SCHED button $24_r$ to select SCHED ON so that the controlled system (not shown in FIG. 2) will follow a pre-programmed schedule. A user may again depress or otherwise actuate the SCHED button to select SCHED OFF for non-programmed, manual system operation.

Prior art thermostat controls generally always have a pre-programmed operation running so that heating and cooling set points are changed according to pre-programmed settings when a predetermined time is reached. If a user wished to disable the pre-programmed operation using a prior art thermostat control the user was required to put the thermostat in a "permanent hold" state. The term "permanent hold" proved to be confusing to many users. Further, if a user wished to change temperature setting of a thermostat control there was a requirement that the user perform another permanent hold regarding the newly set temperature set point. In short, the process for changing a programmed temperature was sometimes cumbersome, frustrating and confusing to users. Providing a SCHED button permitting a user to easily press a single button for placing a system in a SCHED ON mode for following a pre-programmed schedule or in a SCHED OFF mode for non-programmed, manual operation is intuitively easy for a user to understand and carry out.

Figure 3:
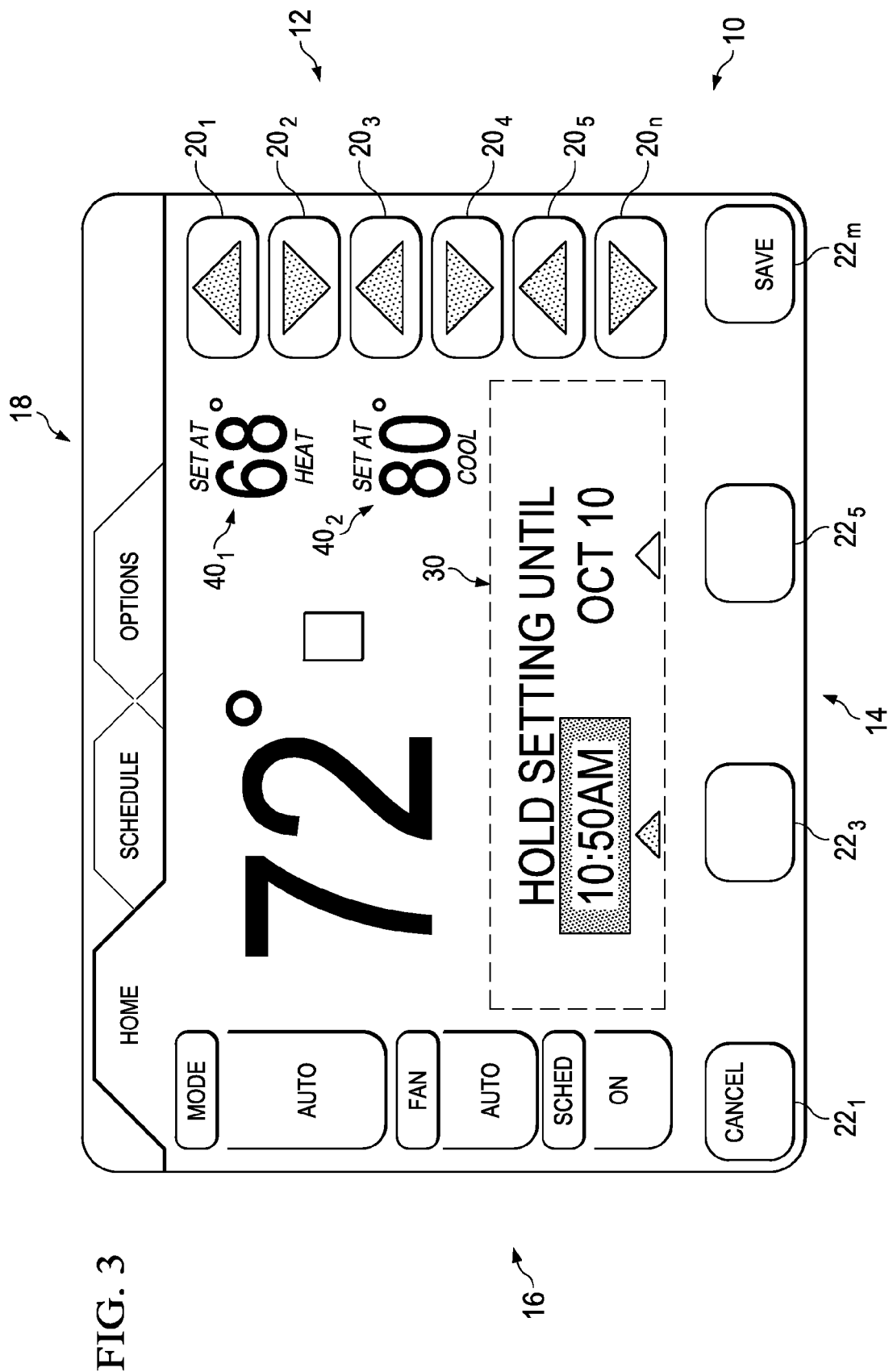
FIG. 3 is a second view of the display illustrating features associated with the HOME Tab.

FIG. 3 is a second view of the display illustrating features associated with the HOME Tab. In FIG. 3, display 10 remains in the HOME tab but is additionally configured for effecting a Temporary Schedule Hold setting. Display 10 may be configured so that while in the HOME tab, anytime a temperature set point (displayed at display-only areas $40_1$, $40_2$ is changed, a display is presented in display area 30 relating to setting a Temperature Schedule Hold mode of operation. In the Temporary Schedule Hold mode the HOME tab display is altered somewhat to provide selection buttons within display area 30 for effecting a Temporary Schedule Hold entry. Specifically, touch responsive loci are oriented to present a CANCEL button $22_1$, a Time Selecting button $22_3$ (labeled in cooperation with display area 30), a Date Selecting button $22_5$ (labeled in cooperation with display area 30), an UP arrow $20_5$, a DOWN arrow $20_n$ and a SAVE button $22_m$.

Additionally, in the Temporary Schedule Hold mode, display area 30 displays a time and date until which a temporary hold is to be maintained. Selectively actuating Time Selecting button $22_3$ or Date Selecting button $22_5$ permits a user to pause a pre-programmed schedule for a time set using Time Selecting button $22_3$ or Date Selecting button $22_5$ to set the time and date it is desired that the pre-programmed schedule is to resume. By way of example and not by way of limitation, a temporary schedule hold may be imposed for a time interval ranging from a few hours up to forty-five days.

Figure 4:
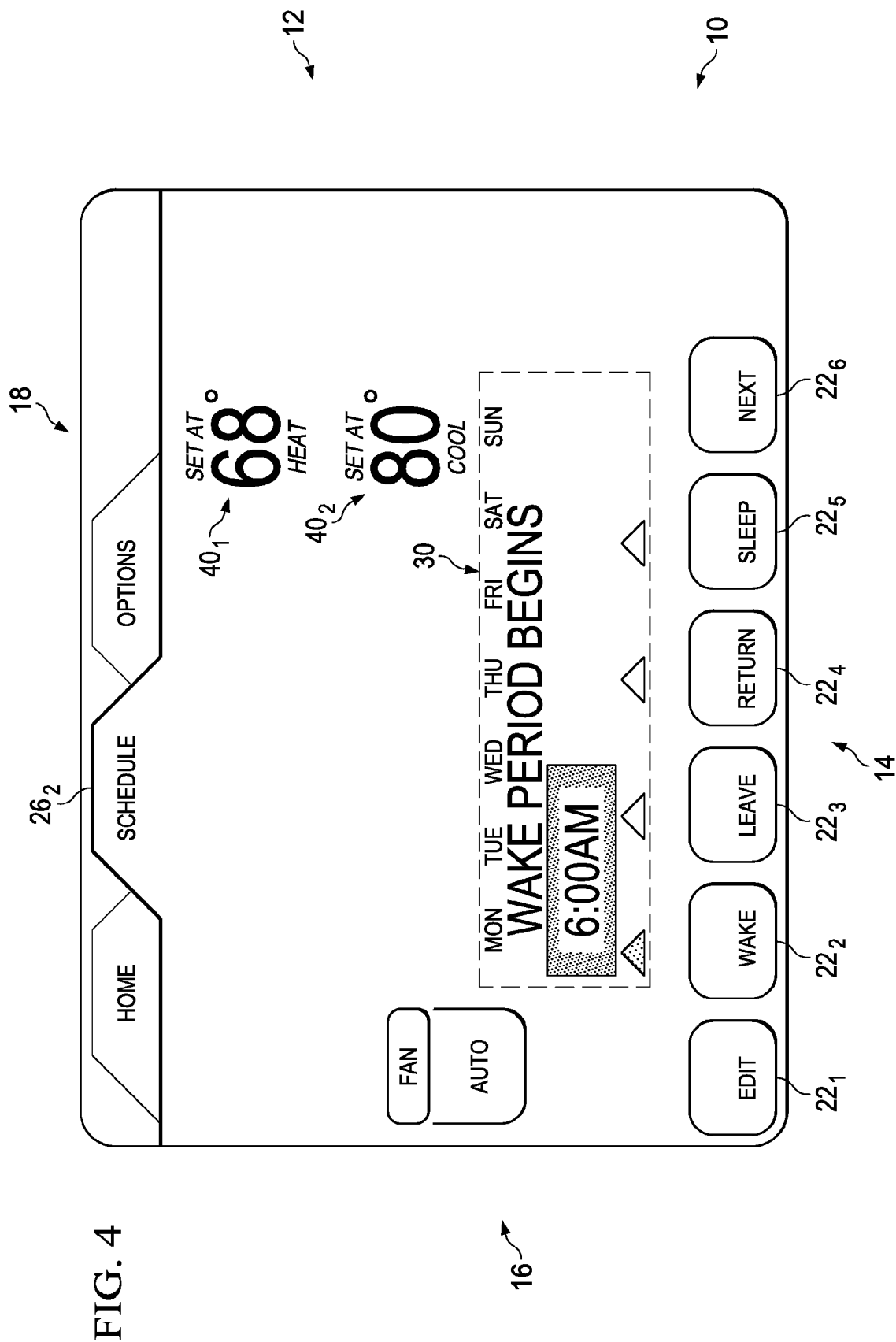
FIG. 4 is a view of the display illustrating features associated with the SCHEDULE Tab.

FIG. 4 is a view of the display illustrating features associated with the SCHEDULE Tab. In FIG. 4, SCHEDULE tab selecting area $26_2$ is depressed or otherwise actuated to orient display 10 in an exemplary "SCHEDULE" configuration. A user's depressing or otherwise actuating SCHEDULE tab selecting area $26_2$ configures display 10 for displaying a programming screen to permit a user to select temperatures for certain times of day such as, by way of example and not by way of limitation, time of waking (WAKE time), time of leaving one's house for work (LEAVE time), time returning to house after work (RETURN time) and time of going to sleep (SLEEP time).

Display 10 may permit a user to schedule or program events for an entire week, as indicated by inclusion of all days of the week in display area 30. Alternately, selected subsets of the week may be programmed separately such as, by way of example and not by way of limitation, scheduling events according to the same schedule for a Monday-Friday work-week with a different schedule set for weekends. Another choice may be for a user to schedule events for each individual day of the week. Opting among subsets of a week for scheduling may be effected by depressing or otherwise actuating the NEXT button $22_6$ among touch responsive loci 14.

In the "SCHEDULE" configuration illustrated in FIG. 4, touch responsive loci 12 are generally not presented to a user;

touch responsive loci 14 are generally presented to a user as described in connection with FIG. 1 (functional action areas $22_1$, $22_2$, $22_3$, $22_4$, $22_5$, $22_6$) with no SAVE button ($22_m$) presented. In this SCHEDULE configuration functional action areas are as labeled in the bottom portion of areas illustrated in FIG. 1. Thus, functional action area $22_1$ affects an EDIT function, functional action area $22_2$ affects a WAKE time setting; functional action area $22_3$ affects a LEAVE time setting, functional action area $22_4$ affects a RETURN time setting; functional action area $22_5$ affects a SLEEP time setting and functional action area $22_6$ affects a NEXT function. Touch responsive loci 16 are generally presented only in terms of a FAN mode selection button with the Fan in AUTO in FIG. 4. Touch responsive loci 18 are generally fully presented as having experienced selection by a user to establish the SCHEDULE configuration.

Figure 5:
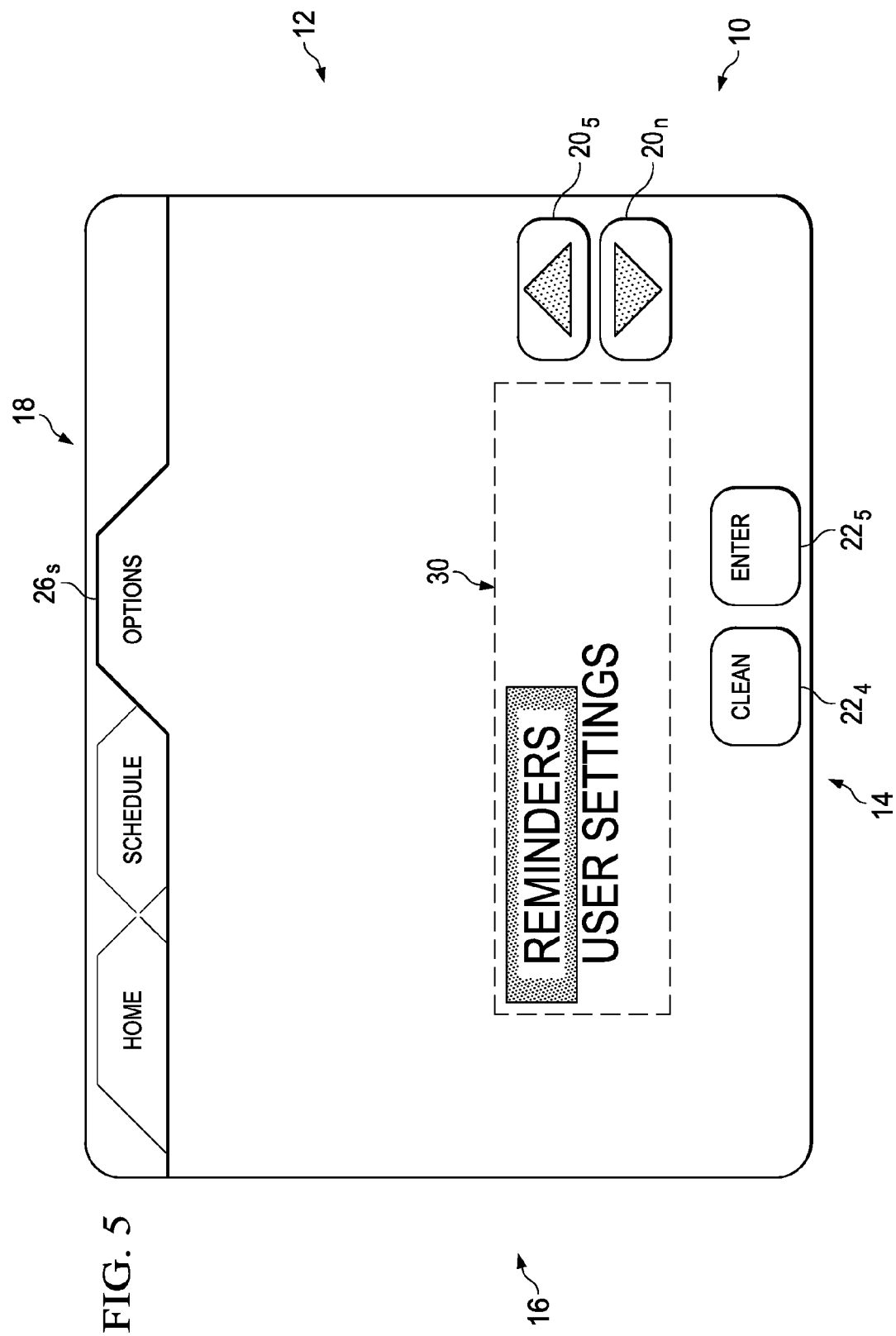
FIG. 5 is a first view of the display illustrating features associated with the OPTIONS Tab.
Figure 6:
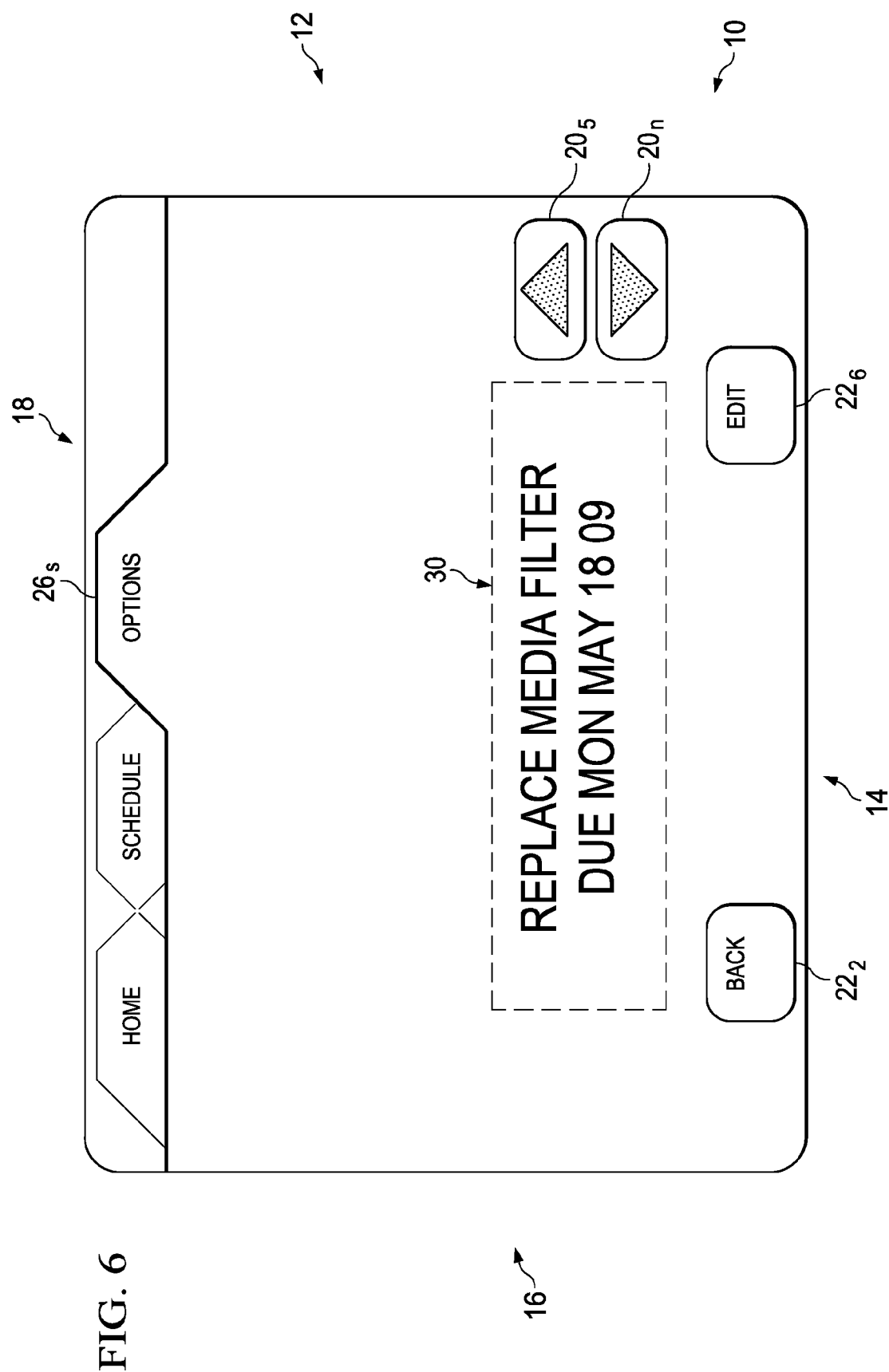
FIG. 6 is a second view of the display illustrating features associated with the OPTIONS Tab.
Figure 7:
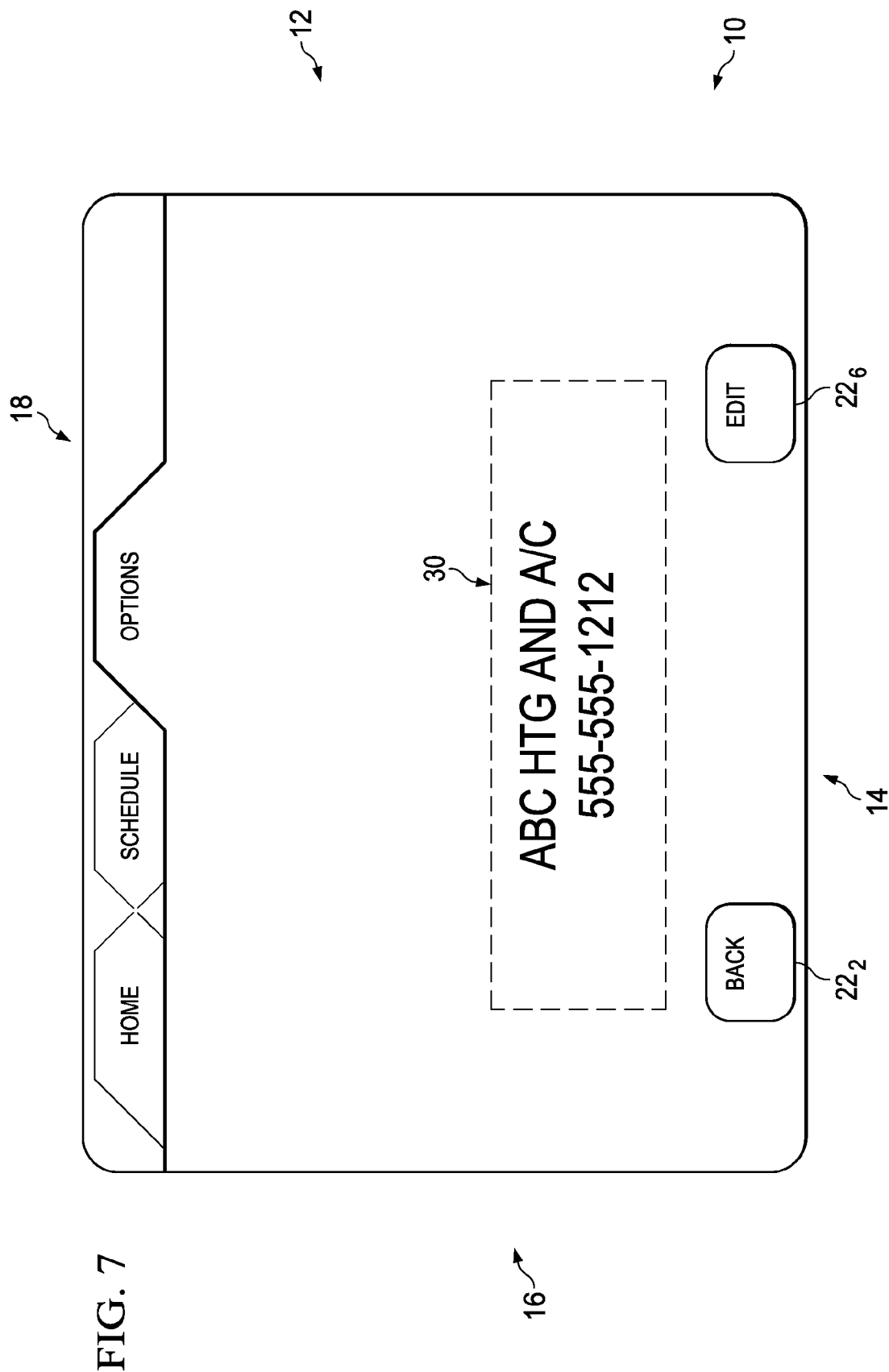
FIG. 7 is a third view of the display illustrating features associated with the OPTIONS Tab.

FIG. 5 is a first view of the display illustrating features associated with the OPTIONS Tab. FIG. 6 is a second view of the display illustrating features associated with the OPTIONS Tab. FIG. 7 is a third view of the display illustrating features associated with the OPTIONS Tab. Regarding FIGS. 5-7 together, OPTIONS tab selecting area $26_s$ is depressed or otherwise actuated to orient display 10 in an exemplary "OPTIONS" configuration. A user's depressing or otherwise actuating OPTIONS tab selecting area $26_s$ configures display 10 for displaying a scrolling list of adjustable settings.

In the "OPTIONS" configuration illustrated in FIGS. 5-7, touch responsive loci 12 are generally presented to a user as described in connection with FIG. 1 only in so far as two selecting or scrolling buttons are represented, such as delineated directional areas $20_5$, $20_n$. Touch responsive loci 14 are generally presented to a user as described in connection with FIG. 1 only in so far as two functional action areas $22_4$, $22_5$ are represented. In this OPTIONS configuration functional action areas are as labeled in the top portion of areas illustrated in FIG. 1. Thus, functional action area $22_4$ affects a CLEAN function, functional action area $22_5$ affects an ENTER function. Touch responsive loci 16 are generally not presented to a user. Touch responsive loci 18 are generally fully presented as having experienced selection by a user to establish the OPTIONS configuration.

By way of example and not by way of limitation, a user may employ delineated directional areas $20_5$, $20_n$ to scroll through a list of adjustable settings presented in display area (FIG. 5). Adjustable settings are highlighted or otherwise differentiated from other adjustable settings as each becomes available for selection. When a desired adjustable setting is highlighted or otherwise indicated as available for selection, a user may depress or otherwise actuate the ENTER button $22_5$ to select the adjustable setting to be adjusted. Other sub-lists may be displayed. Eventually a user will be able to indicate and select a particular setting for adjustment, the user may then depress or otherwise actuate the ENTER button $22_5$ to select the indicated setting for adjustment and then delineated directional areas $20_5$, $20_n$, may be employed to adjust the setting upward or downward until the desired setting level is achieved.

By way of example and not by way of limitation, one may scroll to a setting USER SETTINGS, select USER SETTINGS and be presented with a sub-list or sub-lists that ultimately permit a user to establish settings such as Date, Time, Events per Day, Backlight Intensity, Backlight Setting or Security Lock.

Similarly a user may scroll to a setting REMINDERS, select REMINDERS and ultimately select from a series of service, parts replacement, maintenance or custom reminders (FIG. 6). As the function of display 10 changes, (e.g., selecting an adjustable setting (FIG. 5) or displaying a reminder (FIG. 6)) the particular respective functional areas $22_m$ presented to a user may change. FIG. 6 illustrates that functional areas $22_2$ (BACK) and $22_6$ (EDIT) may be presented to a user while viewing reminder messages. The selected reminders may be displayed in display area 30 when display 10 is in the HOME configuration (FIG. 2).

As indicated in FIG. 7, contact information relating to one's HVAC dealer or repair facility may be selected while in the OPTIONS configuration and may appear on display 10 in the HOME configuration when a critical system error occurs. Prior art thermostat display units typically are provided with an adhesive sticker or decal for adhering to the housing of the thermostat with contact information relating to a HVAC dealer or repair facility. Homeowners sometimes regard such stickers as unsightly and remove them. If their system needs service, there is a problem determining how to contact the repair facility.

Entering appropriate service and repair contact information in memory of a thermostat permits its display of the information without requiring a sticker. Further, the system may be programmed to recognize circumstances under which it would be advisable to contact a repair facility and automatically display the contact information when such circumstances occur.

More than one message may be displayed in display area 30 using a "slide show" technique successively displaying each message for a predetermined time, using a "scrolling" display by which the message displays are rolled by for a viewer's perusal or using another multi-message display technique.

Figure 8:
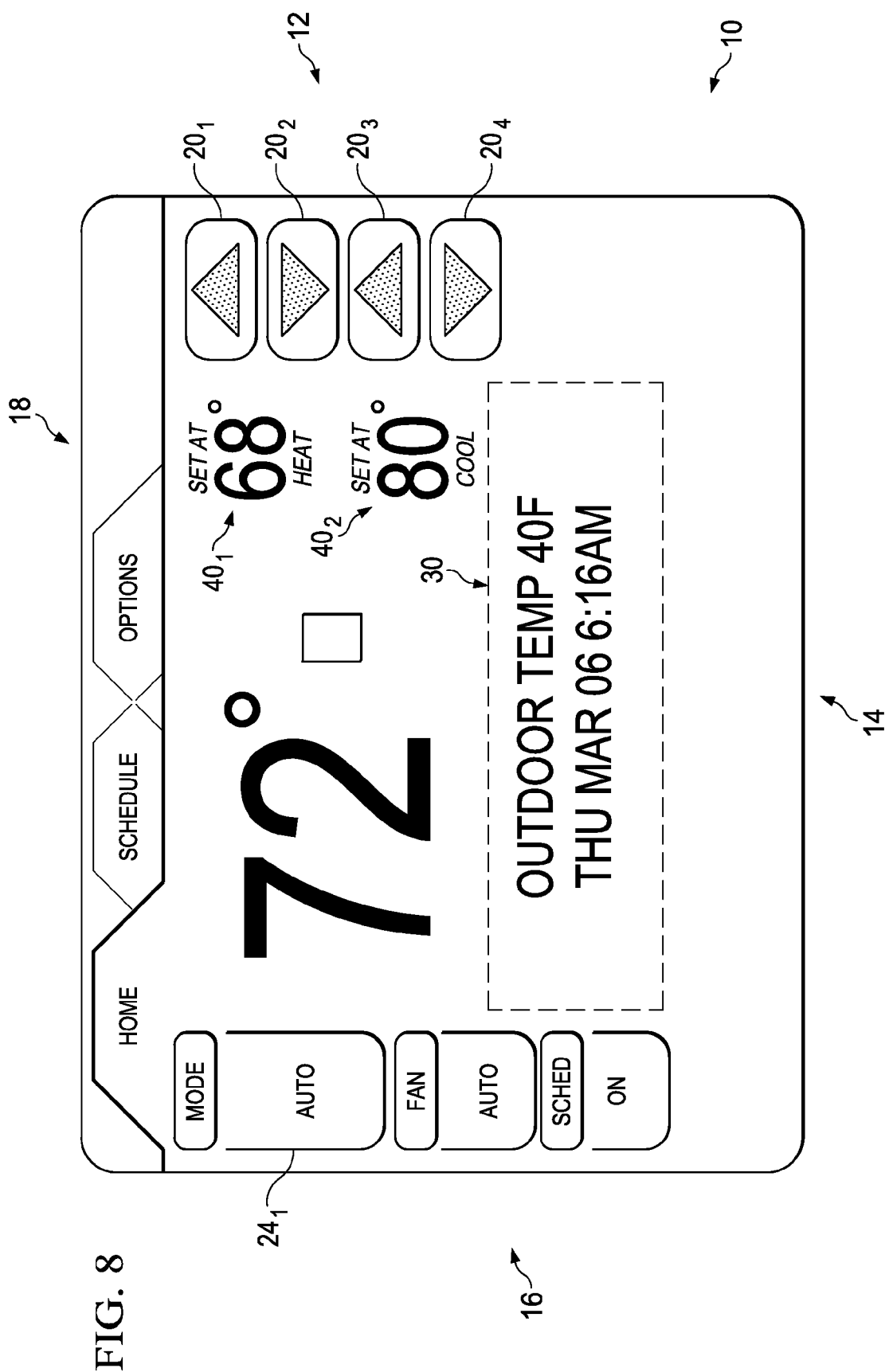
FIG. 8 is a first view of the display illustrating programming steps associated with Mode of operation.
Figure 9:
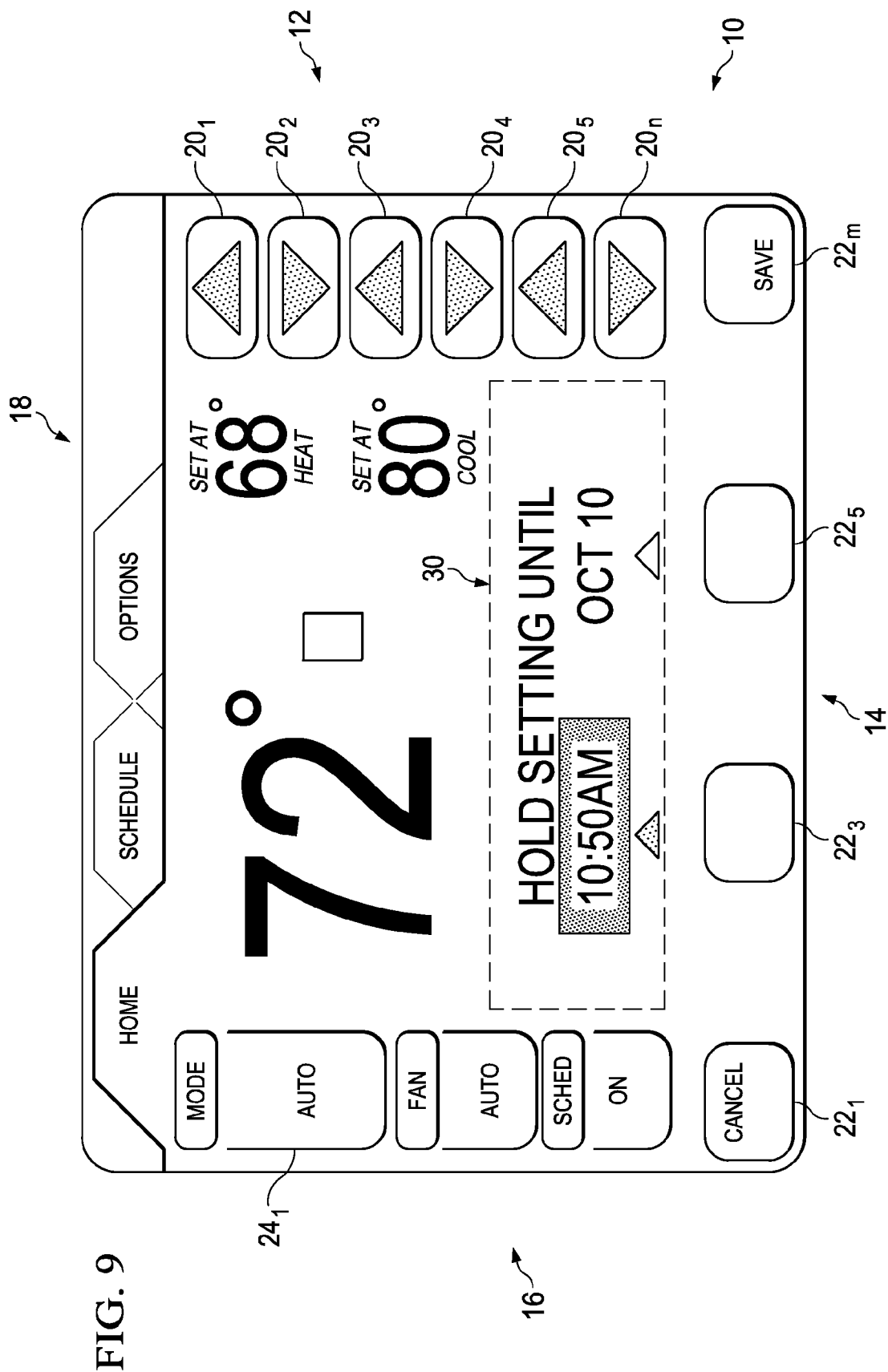
FIG. 9 is a second view of the display illustrating programming steps associated with Mode of operation.

FIG. 8 is a first view of the display illustrating programming steps associated with Mode of operation. FIG. 9 is a second view of the display illustrating programming steps associated with Mode of operation. Regarding FIGS. 8-9 together, a user may touch display 10 generally anywhere to activate the backlight and render display 10 easy to read.

In programming heating and cooling set point temperatures in a system using display 10, a user places display 10 in a HOME configuration substantially as described above in connection with FIG. 2. To set or program a temperature, a user may press the MODE button $24_1$ repeatedly to select a choice of system operation (i.e., HEAT, COOL, AUTO, OFF, EM HEAT). AUTO allows the thermostat unit to automatically switch between heating and cooling as dictated by the indoor temperature. EM HEAT (Emergency Heat) is used to disable heat pump operation on very cold days and use electric strip heating or fossil fuel heating instead.

A user may press UP arrow $20_1$ or DOWN arrow $20_2$ to program a desired heating set point (displayed at display-only area $40_1$). A user may press UP arrow $20_3$ or DOWN arrow $20_4$ to program a desired cooling set point (displayed at display-only area $40_2$). A user may press UP arrow $20_5$ or DOWN arrow $20_n$ to program a desired time (selected by time selection button $22_3$) and date (selected by date selection button $22_5$) the user desires that the schedule resume (displayed at display area 30).

Figure 10:
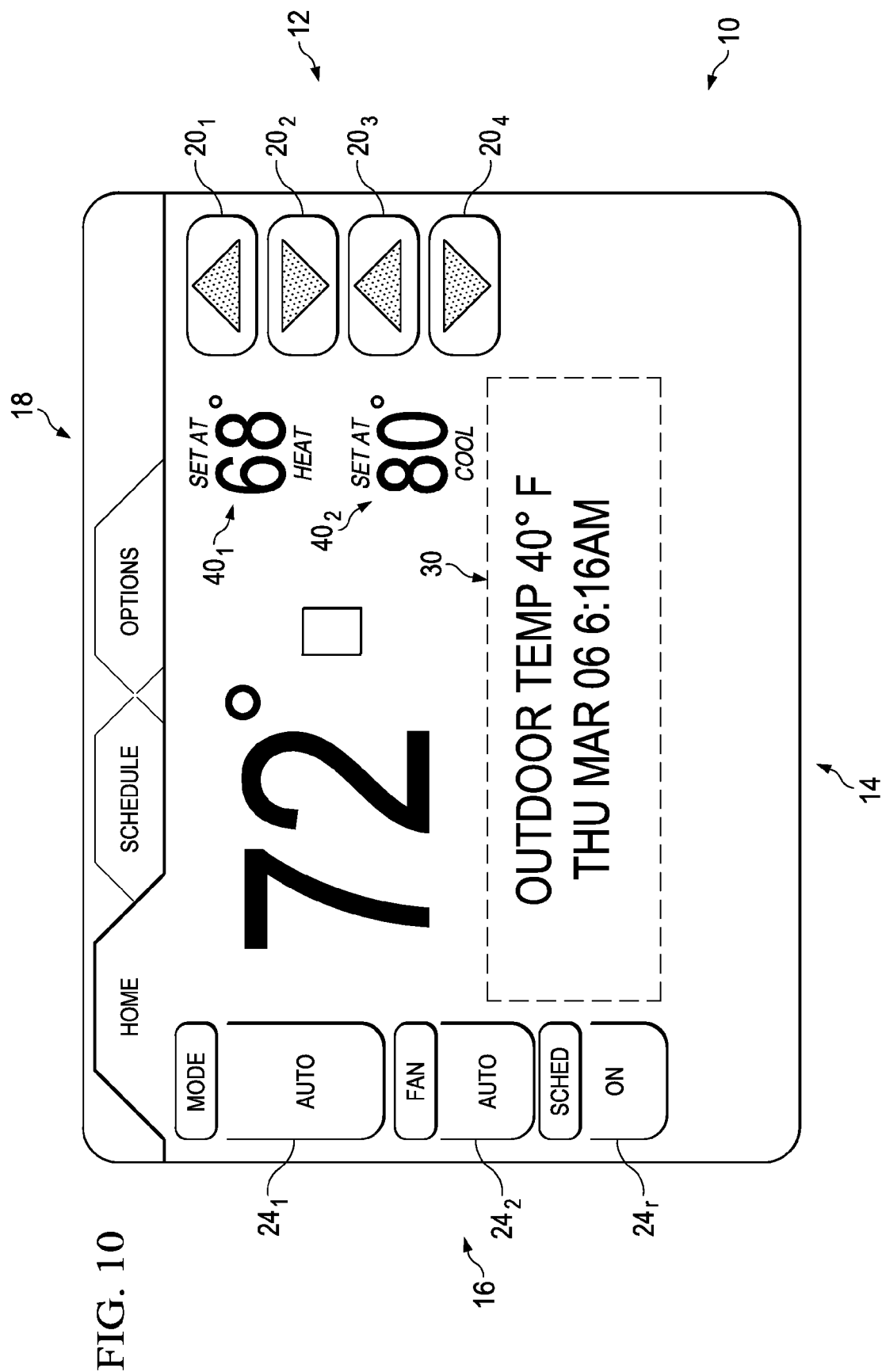
FIG. 10 is a first view of the display illustrating programming steps associated with operation Schedule.
Figure 11:
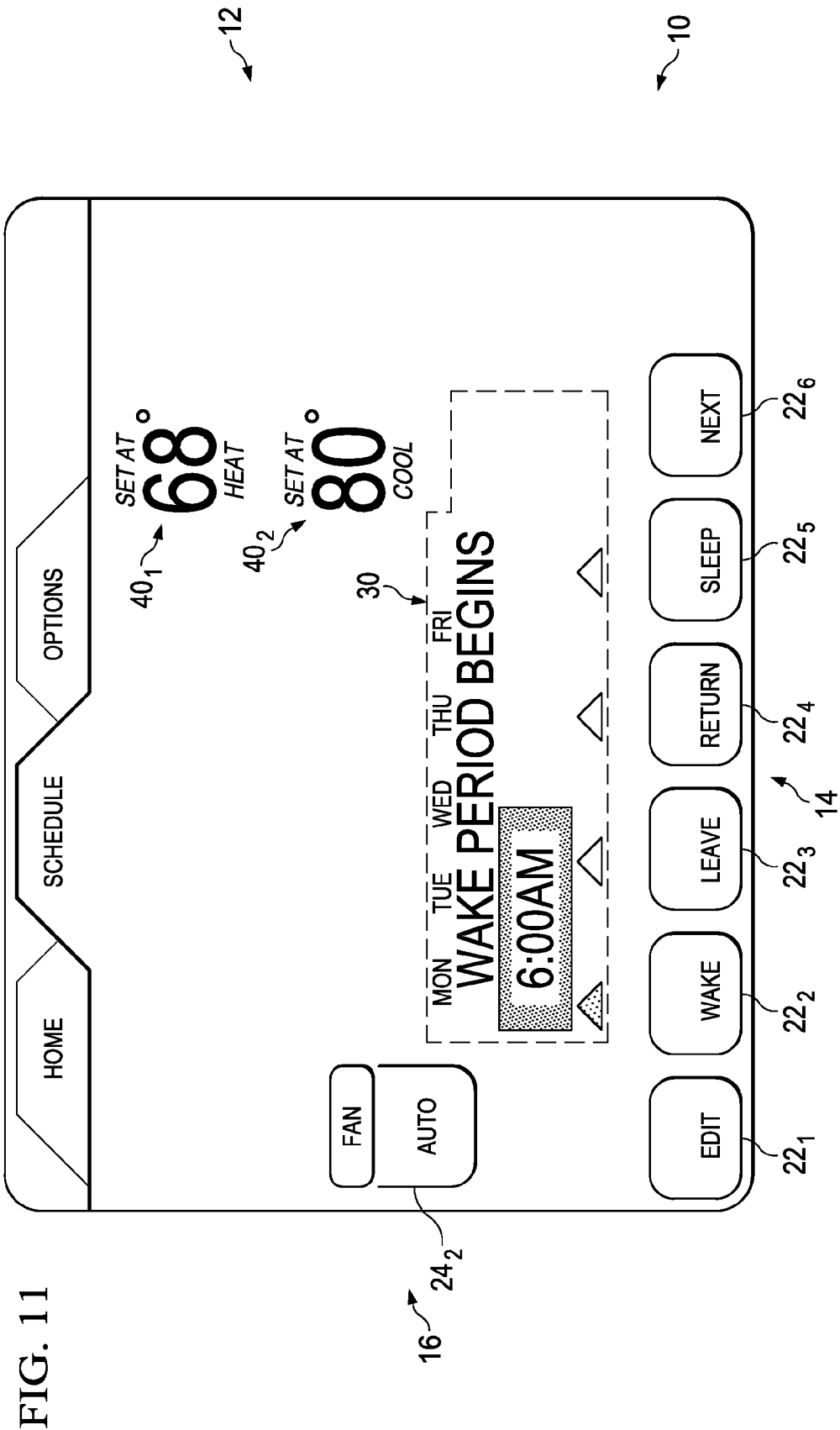
FIG. 11 is a second view of the display illustrating programming steps associated with operation Schedule.
Figure 12:
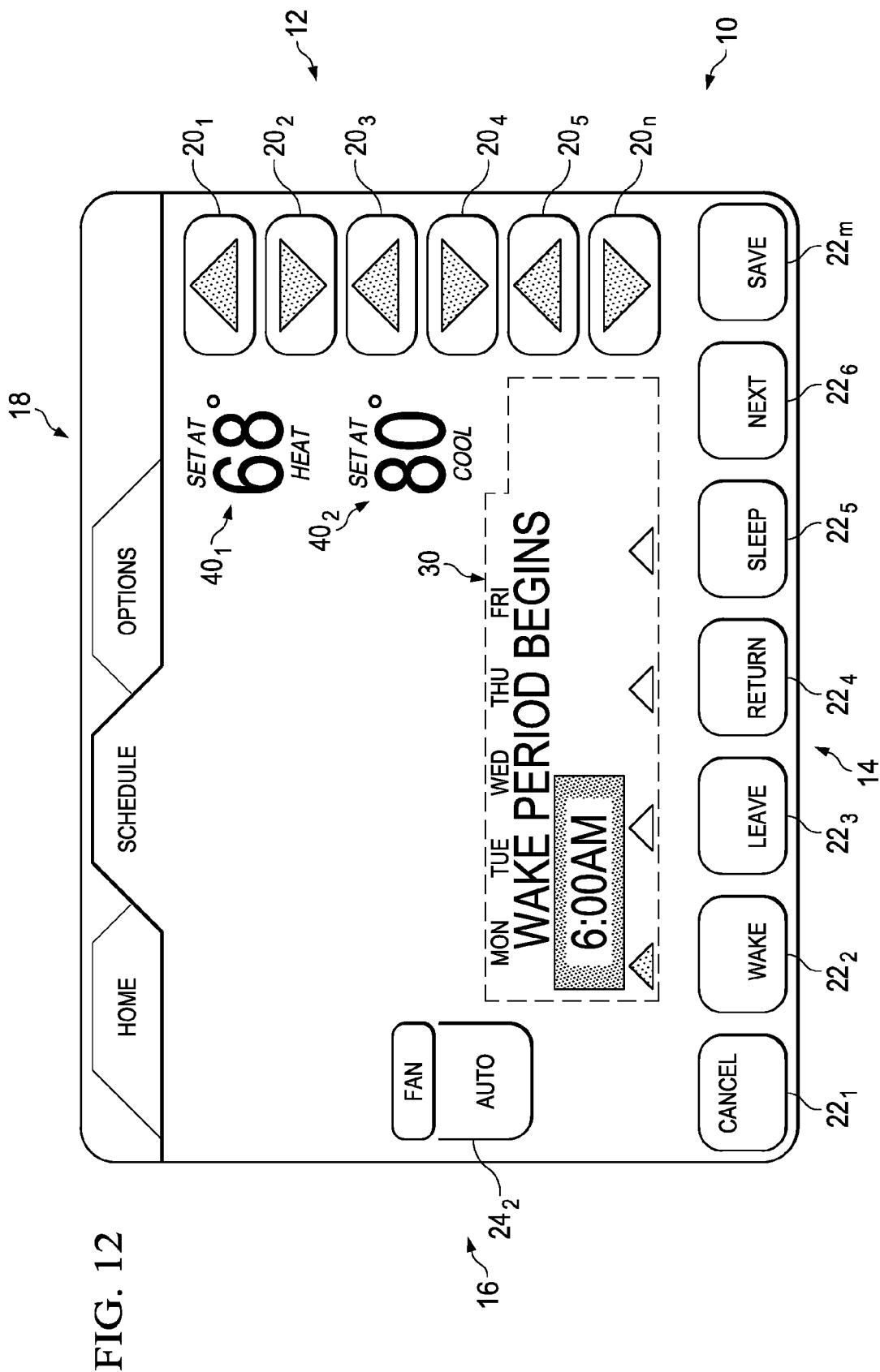
FIG. 12 is a third view of the display illustrating programming steps associated with operation Schedule.

FIG. 10 is a first view of the display illustrating programming steps associated with operation Schedule. FIG. 11 is a second view of the display illustrating programming steps associated with operation Schedule. FIG. 12 is a third view of the display illustrating programming steps associated with operation Schedule. Regarding FIGS. 10-12 together, a user may touch display 10 generally anywhere to activate the backlight and render display 10 easy to read.

In programming a schedule in a system using display 10, a user places display 10 in a SCHEDULE configuration substantially as described above in connection with FIG. 4. In the SCHEDULE configuration display 10 may appear substantially as presented in FIG. 11. To set or program a schedule, a user may press EDIT button $22_1$ and then press NEXT button $22_6$ repeatedly to select a grouping of days displayed in display area 30. When the desired grouping of days is displayed, a user may press WAKE button $22_2$, LEAVE button $22_3$, RETURN button $22_4$ or SLEEP button $22_5$ to select an event to be programmed. After selecting an event to be programmed and pressing EDIT button $22_1$, display 10 may appear substantially as presented in FIG. 12.

A user may thereafter use UP arrows $20_1$, $20_3$ or DOWN arrows $20_2$, $20_4$ to select a desired temperature set point for the selected event. A user may then press FAN button $24_2$ repeatedly to select a desired fan mode for the selected event. A user may then press UP arrow $20_5$ or DOWN arrow $20_n$ to set a start time for the selected event. Another event may be selected for programming by pressing or otherwise actuating an appropriate functional area: WAKE button $22_2$, LEAVE button $22_3$, RETURN button $22_4$ or SLEEP button $22_5$. A user may press SAVE button $22_m$ when all events and days are programmed as desired. Pressing HOME Tab $26_1$ returns display 10 to the main screen (see FIG. 2). A user must ensure that SCHED button $24_r$ is set to ON so that the system will follow the programmed events just entered.

Prior art thermostat control devices generally require a user to navigate through a menu of day groupings to program such as, by way of example and not by way of limitation, M-SUN (Monday-Sunday), M-F (Monday-Friday), SA (Saturday), SUN Sunday), and other similar day groupings. Some prior art thermostat control devices require a user to select multiple days on different buttons or select each day for separate programming treatment. Display 10 permits a user to select among predetermined day groupings using a single button (e.g., NEXT button $22_6$). Each press or other actuation of NEXT button $22_6$ presents a different group of days to be programmed in display area 30 offering a quick and easy way for a user to select which group of days is desired for programming without having to navigate confusing menus or make multiple selections on different buttons.

Figure 13:
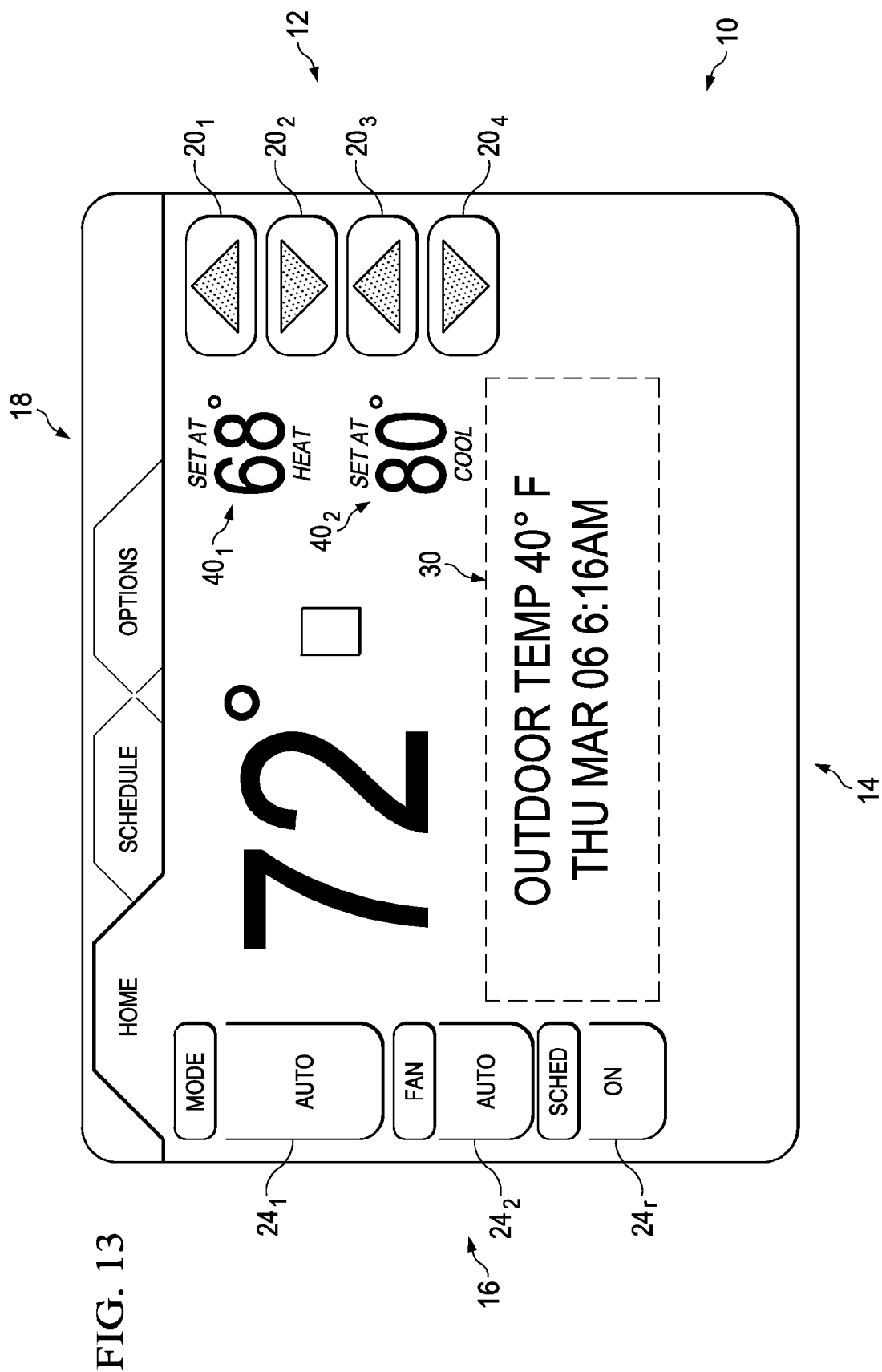
FIG. 13 is a first view of the display illustrating programming steps associated with Temporary/Vacation Hold.
Figure 14:
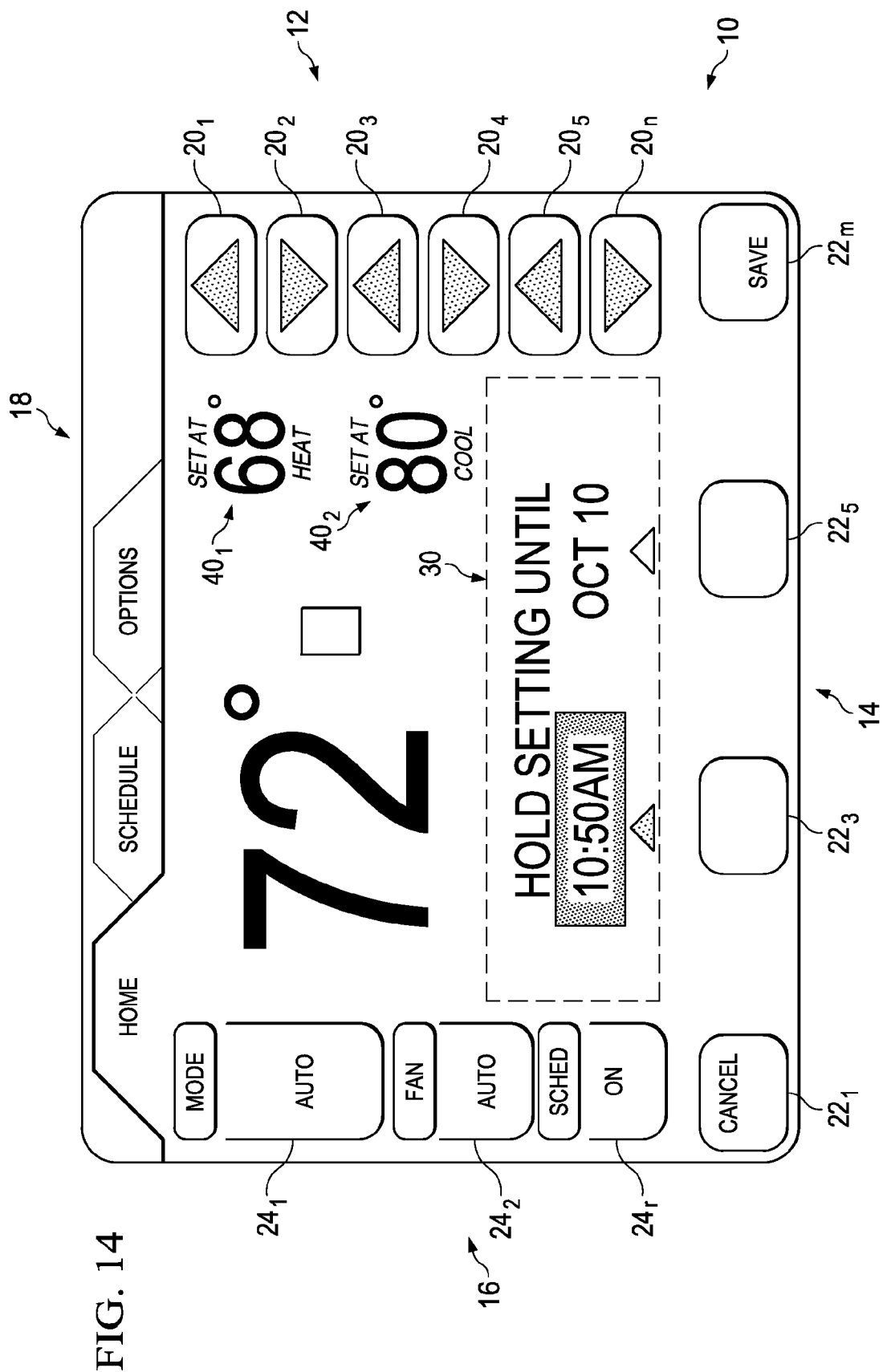
FIG. 14 is a second view of the display illustrating programming steps associated with Temporary/Vacation Hold.

FIG. 13 is a first view of the display illustrating programming steps associated with Temporary/Vacation Hold. FIG. 14 is a second view of the display illustrating programming steps associated with Temporary/Vacation Hold. Regarding FIGS. 13-14 together, a user may touch display 10 generally anywhere to activate the backlight and render display 10 easy to read.

In programming a Temporary/Vacation Hold in a system using display 10, a user places display 10 in a HOME configuration substantially as described above in connection with FIG. 2. In the HOME configuration display 10 may appear substantially as presented in FIG. 13. To set or program a Temporary/Vacation Hold, a user may press UP arrow $20_1$ or DOWN arrow $20_2$ to program a desired heating set point (displayed at display-only area $40_1$). A user may press UP arrow $20_3$ or DOWN arrow $20_4$ to program a desired cooling set point (displayed at display-only area $40_2$). Adjusting either of the heating set point or the cooling set point will cause display 10 to present display area 30 substantially as illustrated in FIG. 14. A user may then press UP arrow $20_5$ or DOWN arrow $20_n$ to program a desired time (selected by time selection button $22_3$) and date (selected by date selection button $22_5$) the user desires that the programmed schedule will resume (displayed at display area 30). Display 10 may be configured so that skipping the step of programming a desired date a time for desired resumption of the programmed schedule may result in the set point temperatures entered above for Temporary/Vacation Hold will hold for a predetermined time such as, by way of example and not by way of limitation, three hours before resuming the programmed schedule. A user may press SAVE button $22_m$ to save the set point temperatures, time and date to resume, entered above for Temporary/Vacation Hold. The Temporary/Vacation Hold may be cancelled at any time by pressing SCHED button $24_r$.

Figure 15:
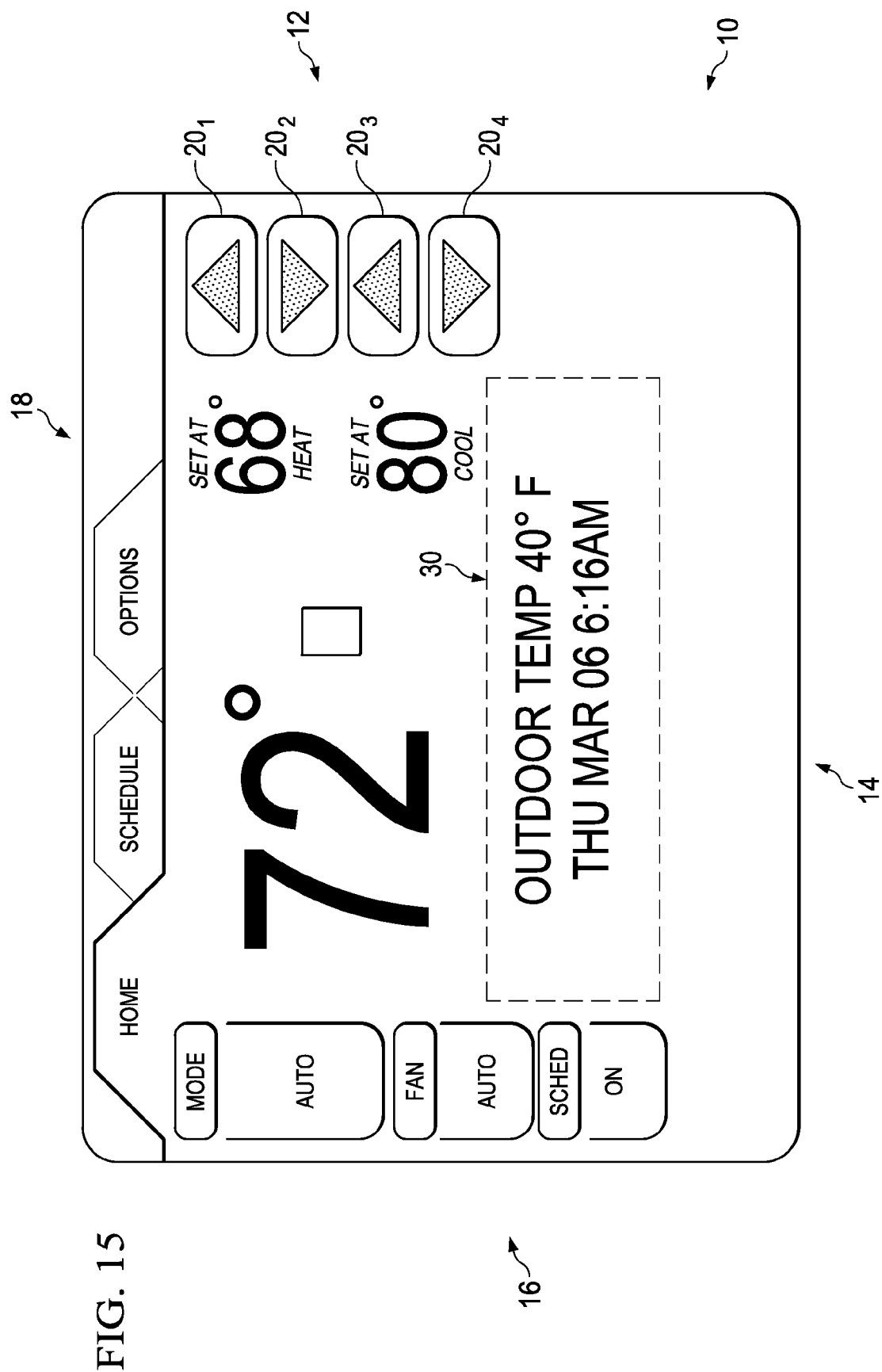
FIG. 15 is a first view of the display illustrating programming steps associated with Humidity Settings.
Figure 16:
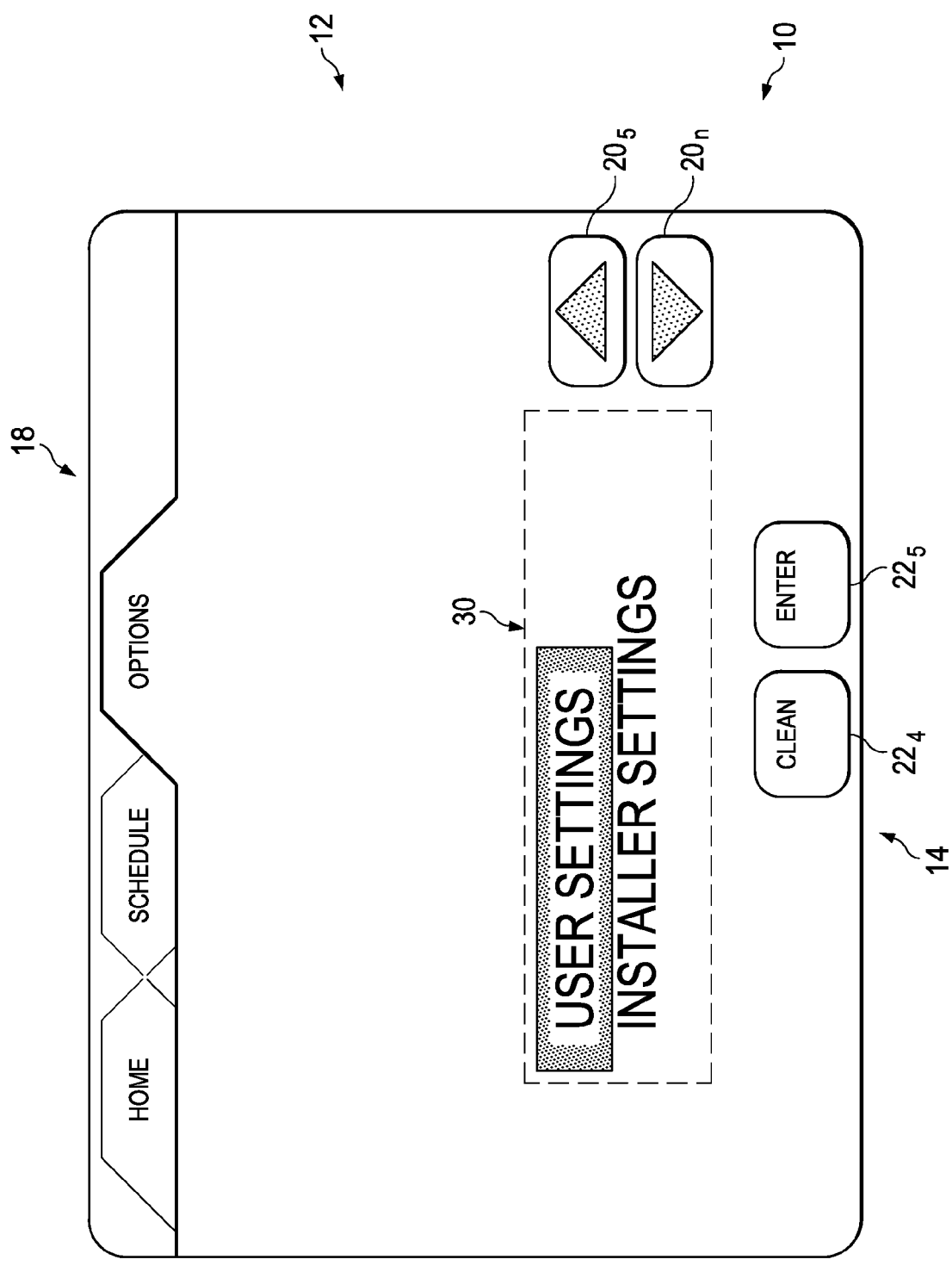
FIG. 16 is a second view of the display illustrating programming steps associated with Humidity Settings.
Figure 17:
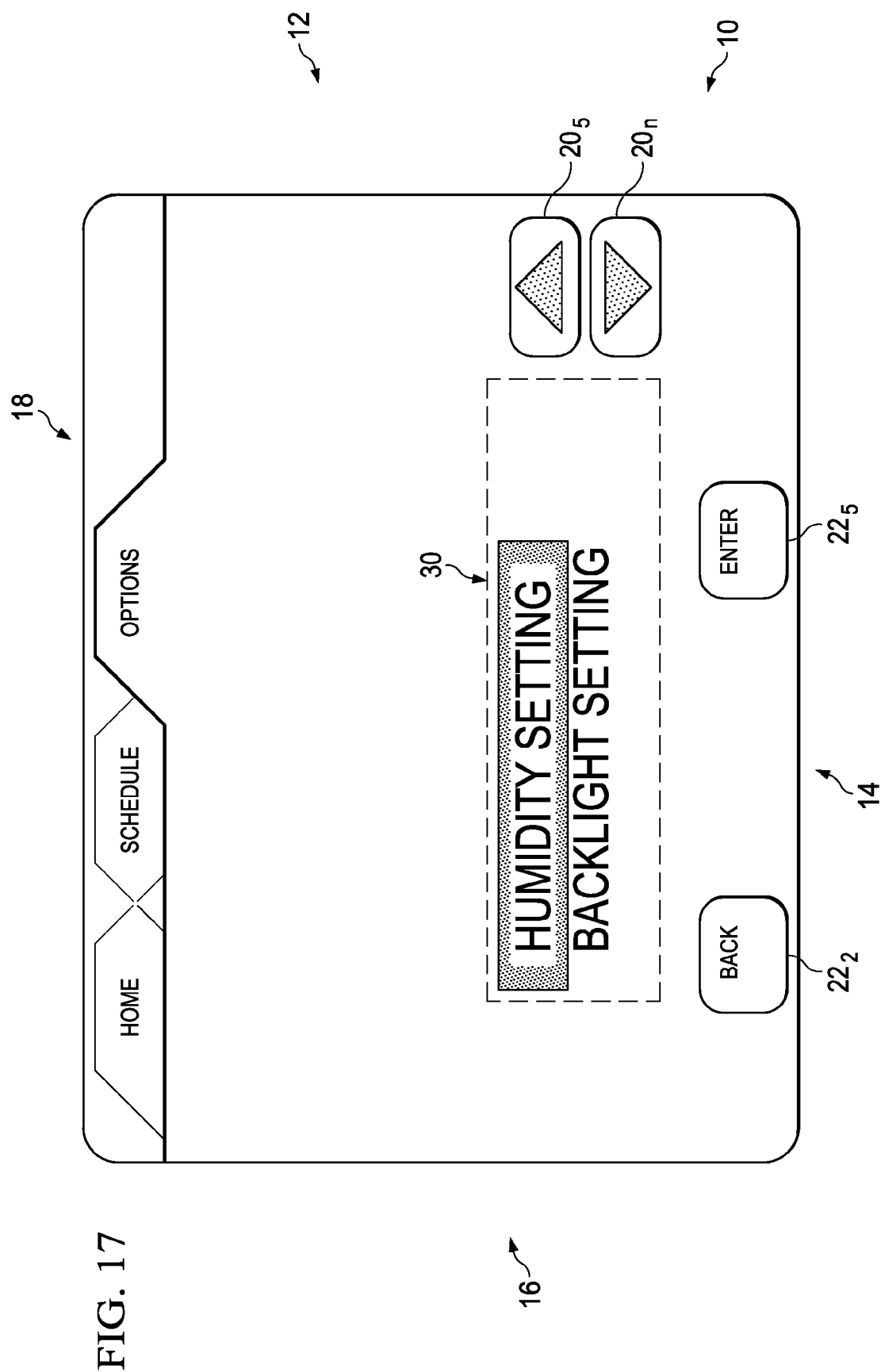
FIG. 17 is a third view of the display illustrating programming steps associated with Humidity Settings.
Figure 18:
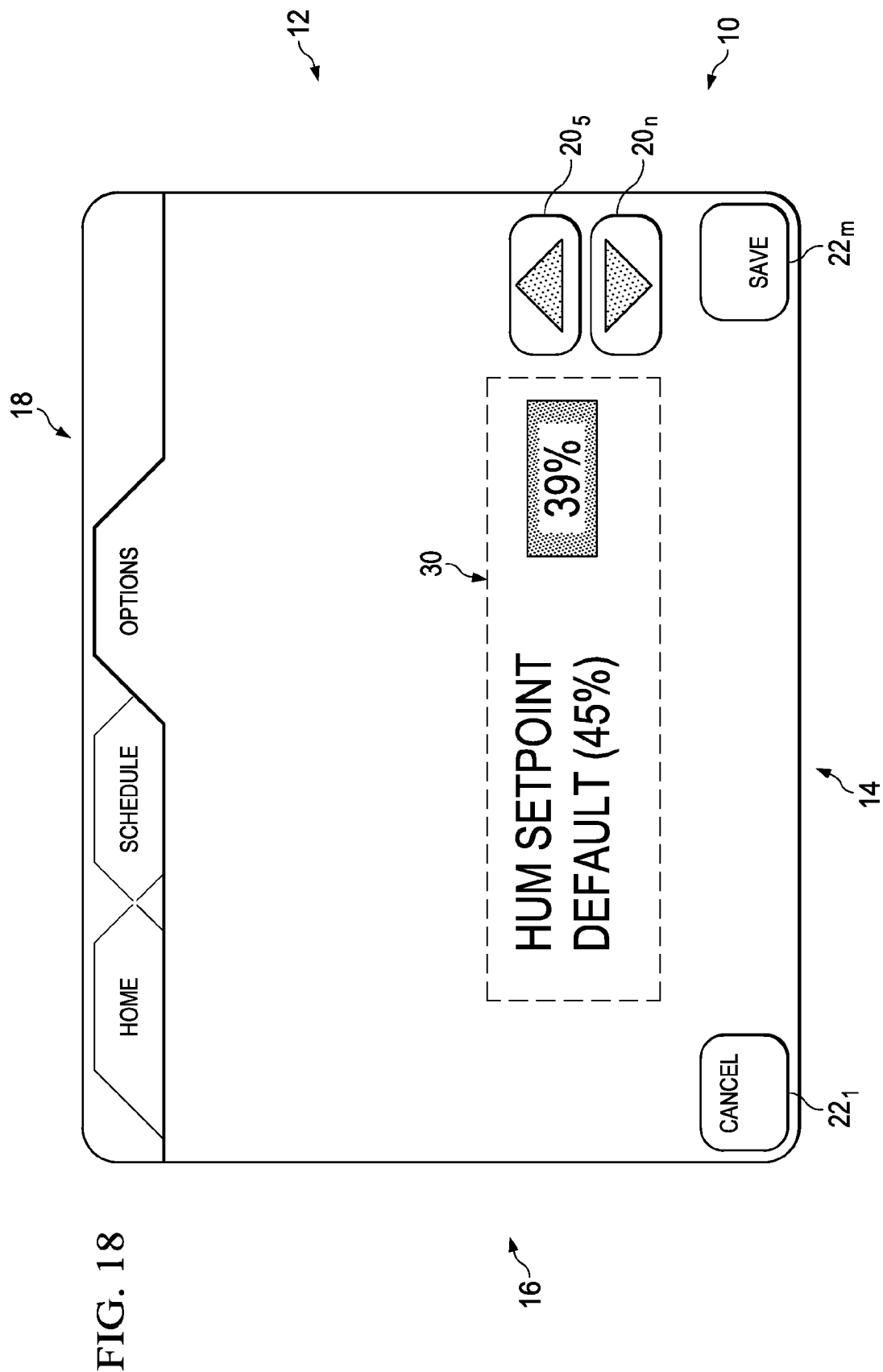
FIG. 18 is a fourth view of the display illustrating programming steps associated with Humidity Settings.
Figure 19:
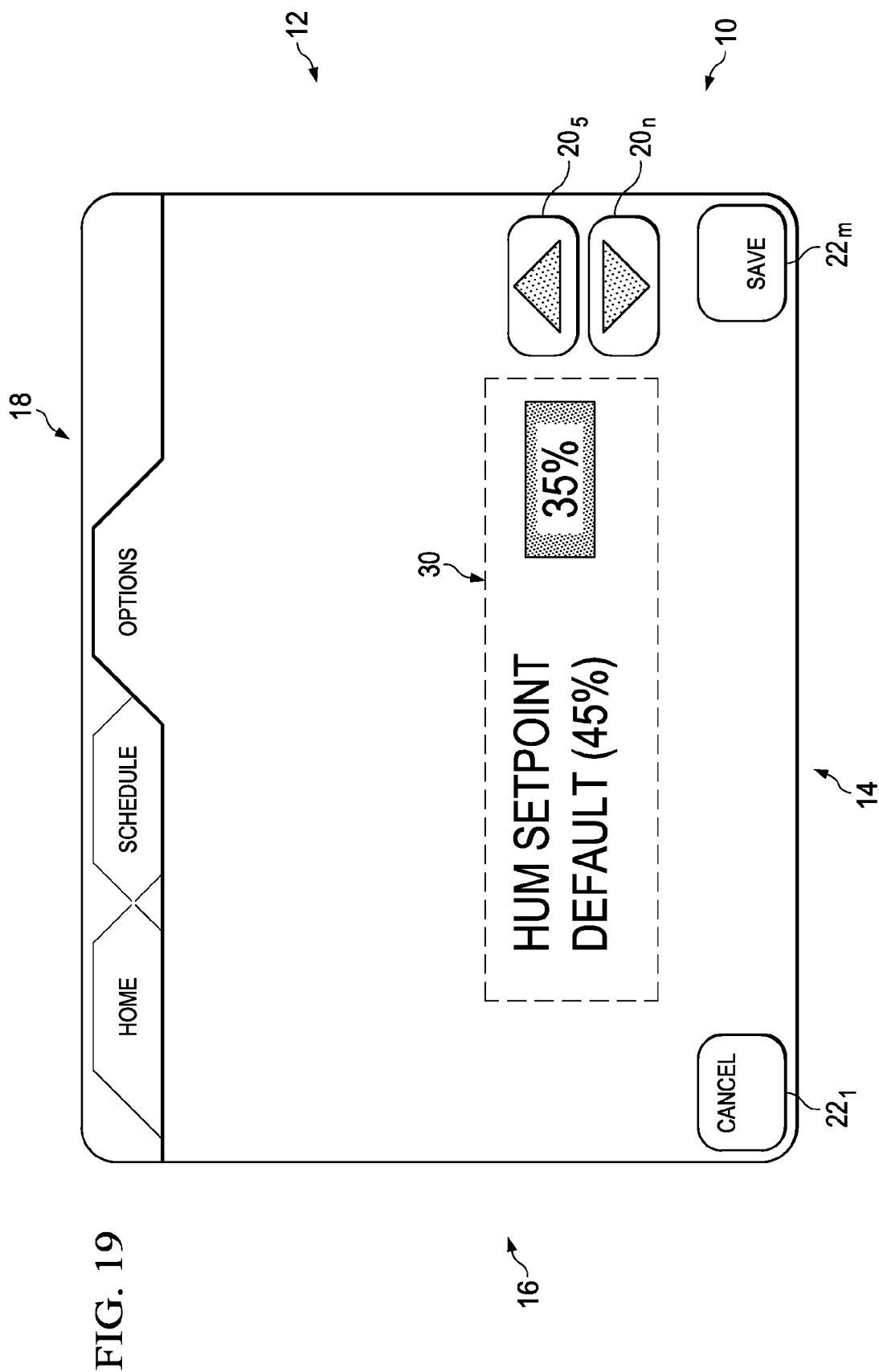
FIG. 19 is a fifth view of the display illustrating programming steps associated with Humidity Settings.

FIG. 15 is a first view of the display illustrating programming steps associated with Humidity Settings. FIG. 16 is a second view of the display illustrating programming steps associated with Humidity Settings. FIG. 17 is a third view of the display illustrating programming steps associated with Humidity Settings. FIG. 18 is a fourth view of the display illustrating programming steps associated with Humidity Settings. FIG. 19 is a fifth view of the display illustrating programming steps associated with Humidity Settings. Regarding FIGS. 15-19 together, a user may touch display 10 generally anywhere to activate the backlight and render display 10 easy to read (FIG. 15).

In programming Humidity Settings in a system using display 10, a user places display 10 in an OPTION configuration substantially as described above in connection with FIGS. 5-7. In the OPTIONS configuration display 10 may appear substantially as presented in FIG. 16. To set or program Humidity Settings, a user may press UP arrow $20_5$ or DOWN arrow $20_n$ to scroll through a list of adjustable settings presented in display area 30 (FIG. 16). Adjustable settings are highlighted or otherwise differentiated from other adjustable settings as each becomes available for selection. A user may be presented with a plurality of displayed settings for selection, may scroll among the displayed settings using UP arrow $20_5$ or DOWN arrow $20_n$ and may select USER SETTINGS by pressing or otherwise actuating ENTER button $22_5$ when USER SETTINGS is highlighted. A user may then press UP arrow $20_5$ or DOWN arrow $20_n$ to scroll through a list of user setting alternatives presented in display area 30 (FIG. 17). A user may then select HUMIDITY SETTING by pressing or otherwise actuating ENTER button $22_5$ when HUMIDITY SETTING is highlighted. Thereafter, a user may press UP arrow $20_5$ or DOWN arrow $20_n$ to select a desired relative humidity set point (FIG. 18). A user may press or otherwise actuate SAVE button $22_m$ to save the selected relative humidity set point (FIG. 19).

Figure 20:
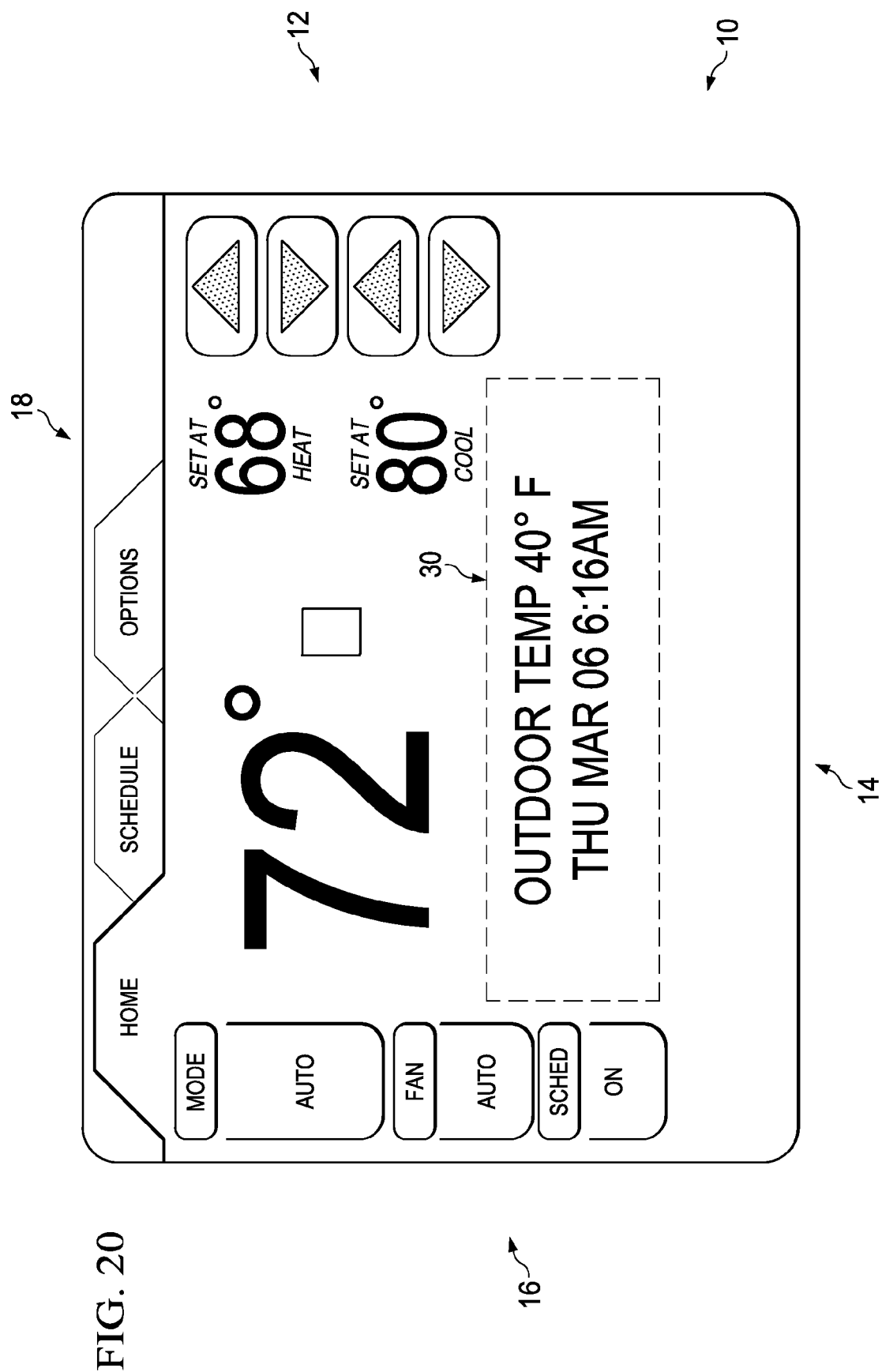
FIG. 20 is a first view of the display illustrating programming steps associated with Setting Service Reminders.
Figure 21:
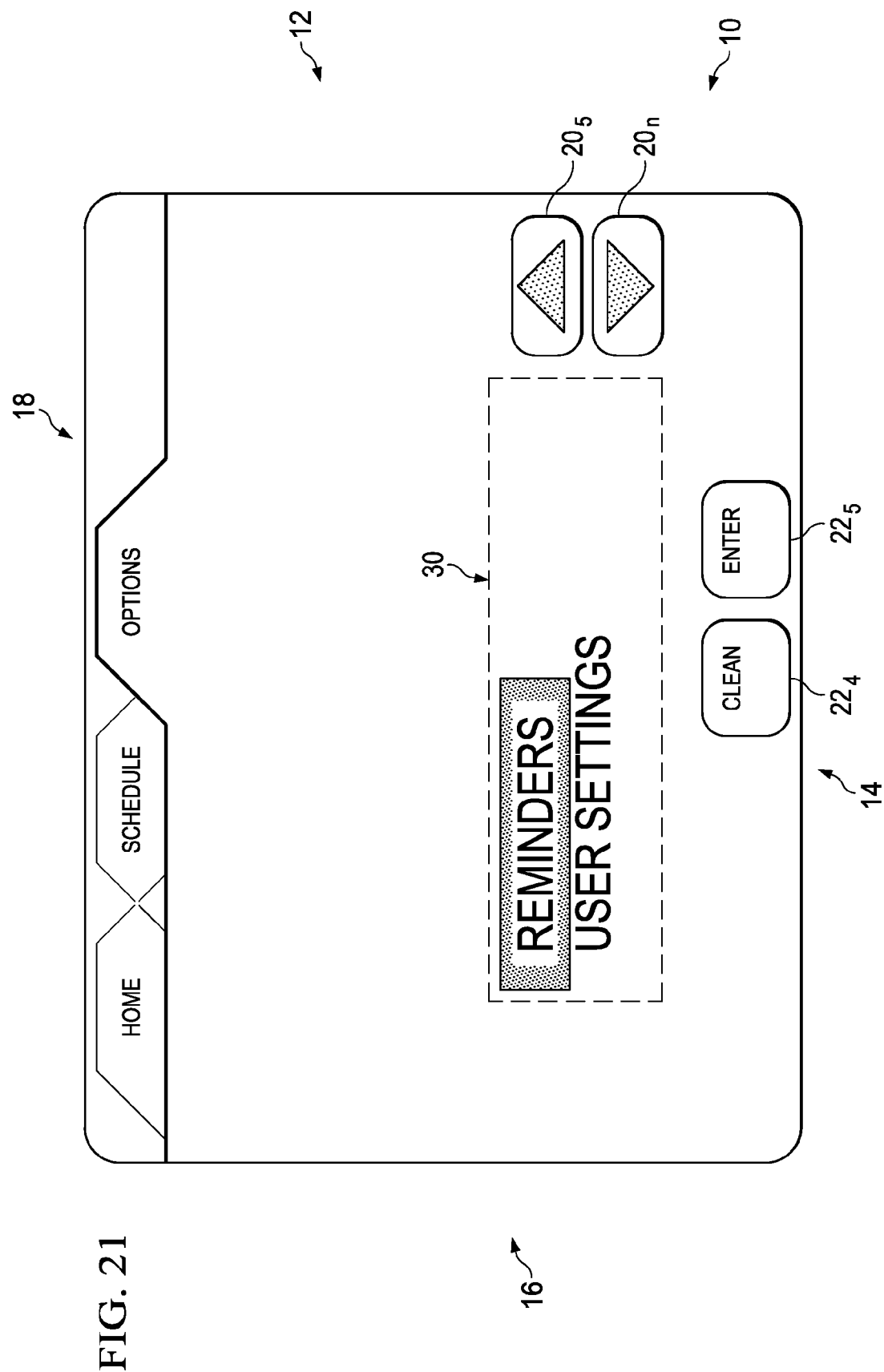
FIG. 21 is a second view of the display illustrating programming steps associated with Setting Service Reminders.
Figure 22:
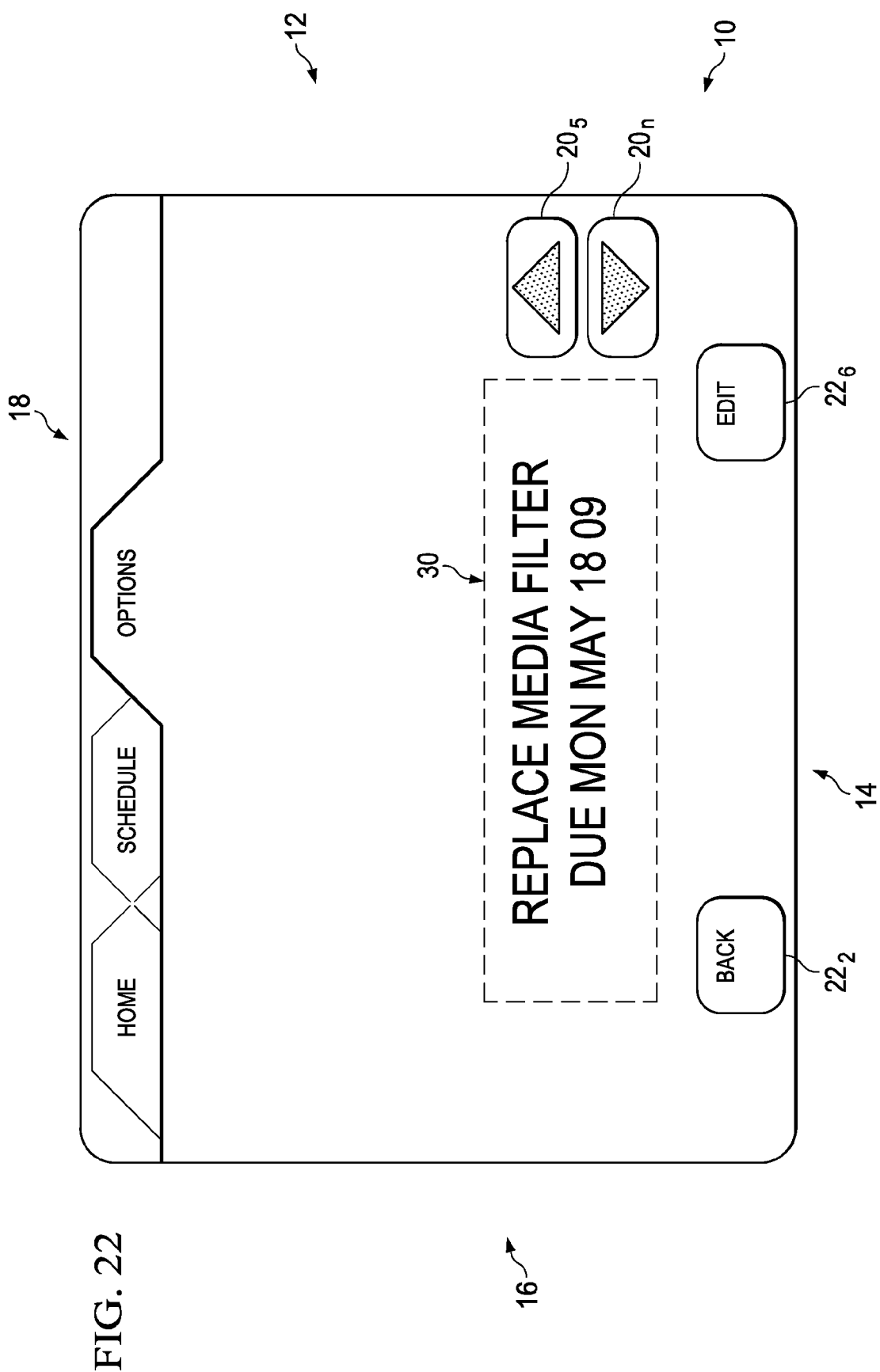
FIG. 22 is a third view of the display illustrating programming steps associated with Setting Service Reminders.
Figure 23:
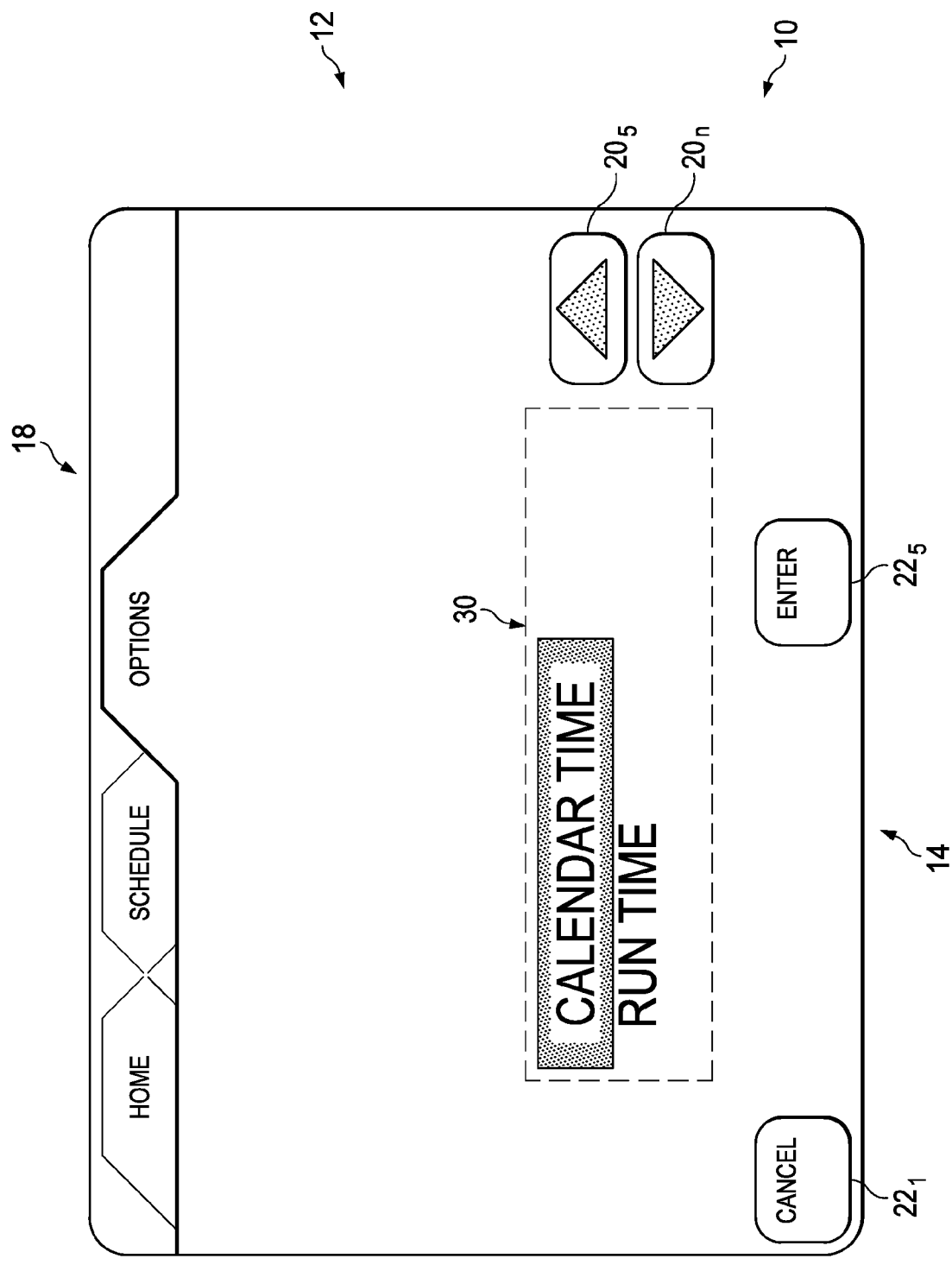
FIG. 23 is a fourth view of the display illustrating programming steps associated with Setting Service Reminders.
Figure 24:
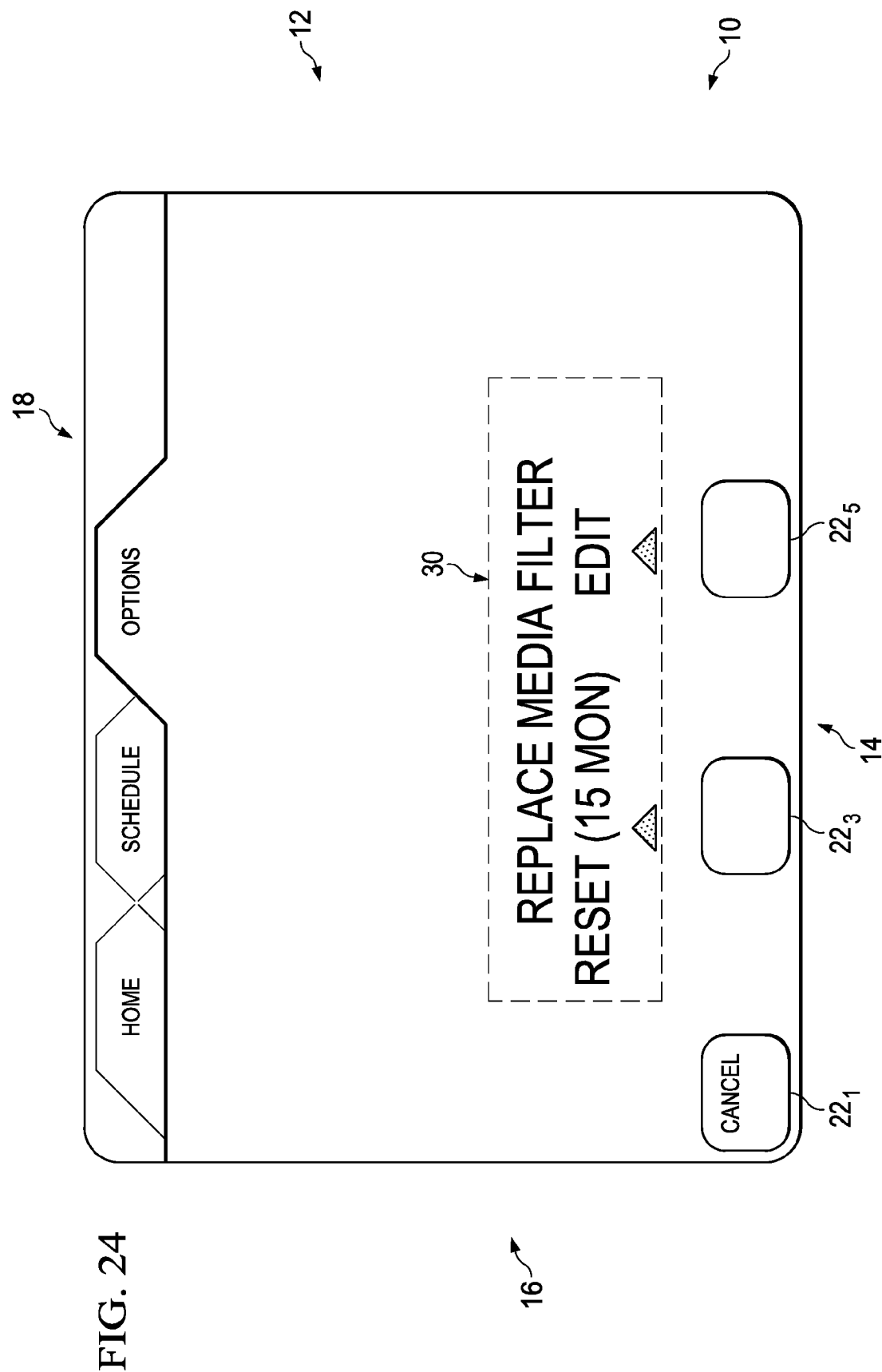
FIG. 24 is a fifth view of the display illustrating programming steps associated with Setting Service Reminders.
Figure 25:
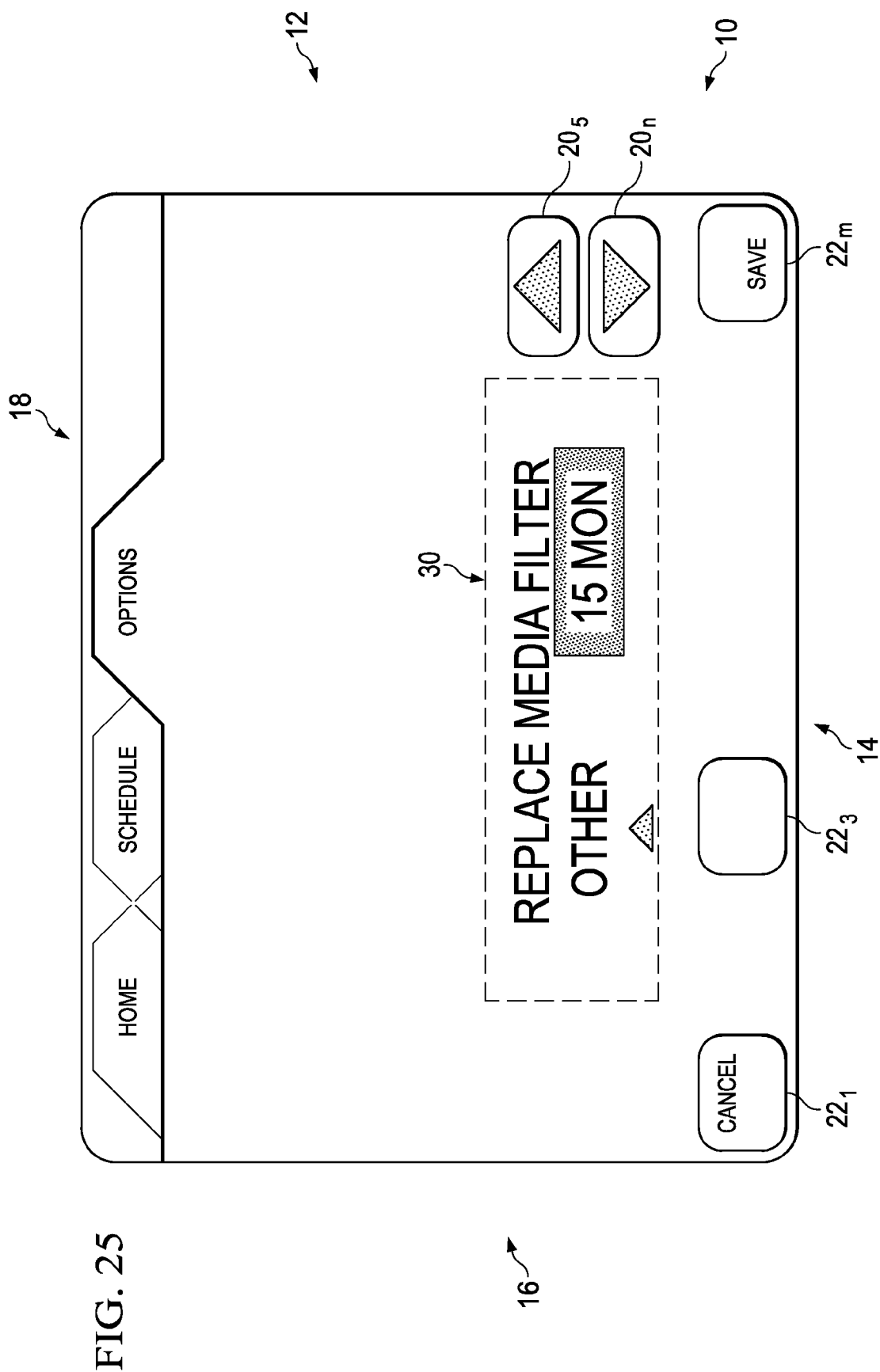
FIG. 25 is a sixth view of the display illustrating programming steps associated with Setting Service Reminders.
Figure 26:
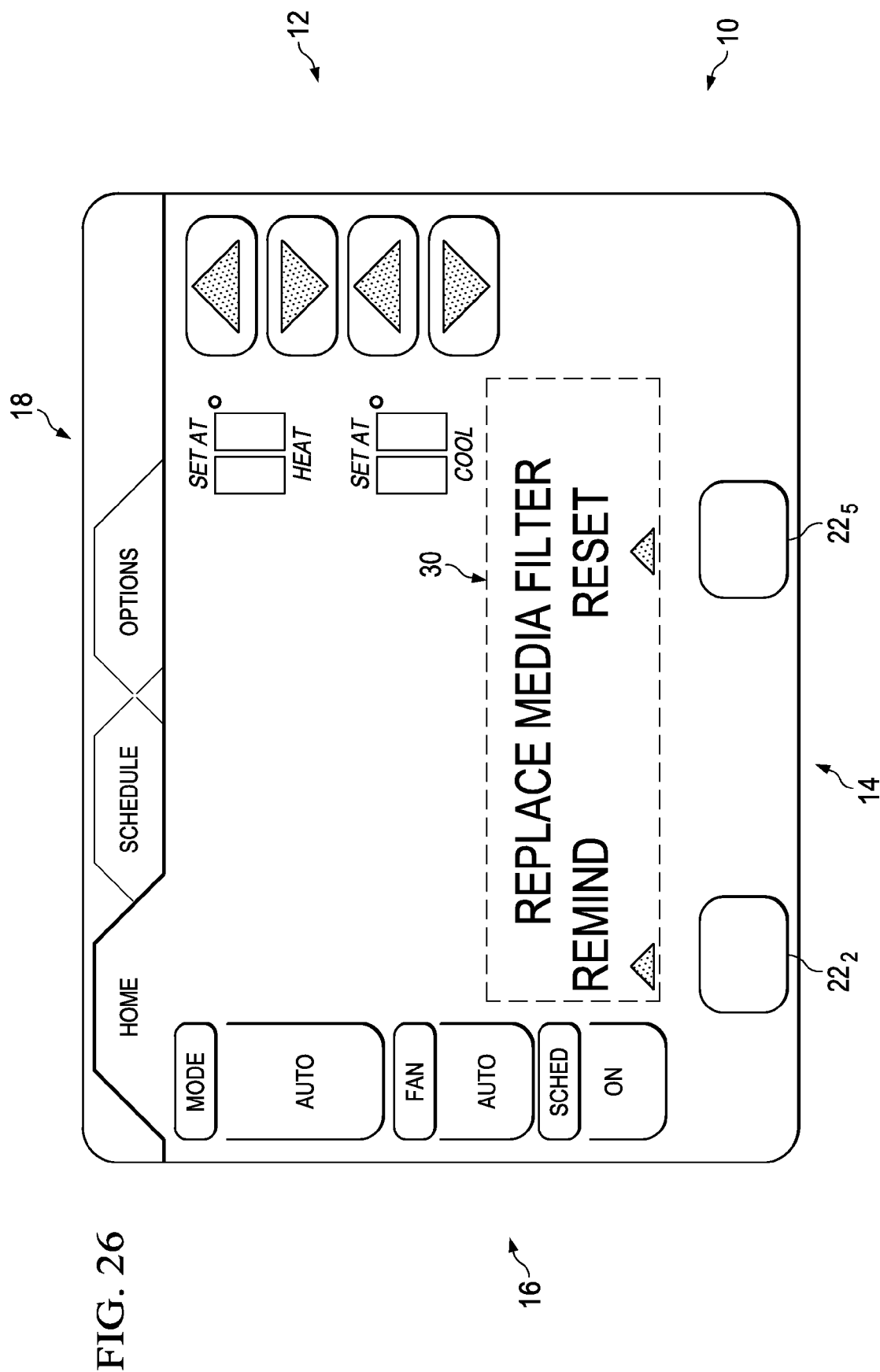
FIG. 26 is a seventh view of the display illustrating programming steps associated with Setting Service Reminders.

FIG. 20 is a first view of the display illustrating programming steps associated with Setting Service Reminders. FIG. 21 is a second view of the display illustrating programming steps associated with Setting Service Reminders. FIG. 22 is a third view of the display illustrating programming steps associated with Setting Service Reminders. FIG. 23 is a fourth view of the display illustrating programming steps associated with Setting Service Reminders. FIG. 24 is a fifth view of the display illustrating programming steps associated with Setting Service Reminders. FIG. 25 is a sixth view of the display illustrating programming steps associated with Setting Service Reminders. FIG. 26 is a seventh view of the display illustrating programming steps associated with Setting Service Reminders. Regarding FIGS. 20-26 together, a user may touch display 10 generally anywhere to activate the backlight and render display 10 easy to read (FIG. 20).

In programming a Service Reminder in a system using display 10, a user places display 10 in an OPTION configuration substantially as described above in connection with FIGS. 5-7. In the OPTIONS configuration display 10 may appear substantially as presented in FIG. 21. To set or program a Service Reminder, a user may press UP arrow $20_5$ or DOWN arrow $20_n$ to scroll through a list of adjustable settings presented in display area 30 (FIG. 21). Adjustable settings are highlighted or otherwise differentiated from other adjustable settings as each becomes available for selection. A user may select REMINDERS by pressing or otherwise actuating ENTER button $22_5$ when REMINDERS is highlighted. A user may then press UP arrow $20_5$ or DOWN arrow $20_n$ to scroll through a list of reminder alternatives presented in display area 30 (FIG. 22). By way of example and not by way of limitation, a user may then select REPLACE MEDIA FILTER by pressing or otherwise actuating ENTER button $22_5$ when REPLACE MEDIA FILTER is displayed in display area 30 (FIG. 22).

Thereafter, a user may press EDIT button $22_6$ to select a first editable element associated with REPLACE MEDIA FILTER. A user may use arrows $20_5$, $20_n$ to select whether it is desired to modify or edit CALENDAR TIME or RUN TIME, and press ENTER button $22_5$ to complete the selection of CALENDAR TIME or RUN TIME (FIG. 23).

A user may thereafter press or otherwise actuate RESET button $22_3$ or EDIT button $22_5$ (labeled in cooperation with display area 30) and use arrows $20_5$, $20_n$ to set time for the service reminder being programmed (FIG. 24). By way of example and not by way of limitation one may set the time for a reminder for a period ranging from one month to twenty-four months (FIG. 25). A user may thereafter press SAVE button to save the programming steps entered. Pressing or otherwise actuating HOME tab $26_1$ returns display 10 to its HOME configuration (FIG. 26). Service reminders are displayed in display area 30 in the HOME configuration at the programmed date.

Display 10 permits resetting a reminder, such as a service reminder, directly from display screen 10 without having to go to a special set-up or configuration screen. With many prior art thermostat devices one must dismiss and reset (or at least reset) the reminder using a special set-up or configuration screen requiring a user manual to know how to perform the operation. Often a homeowner does not know how to carry out this programming evolution so the service reminder message is never reset and the feature is rendered substantially useless. Display 10 permits resetting the reminder time interval directly when it appears on display 30 using a reset button $22_5$ (FIG. 26; labeled in cooperation with display area 30) without having to go to little used and unfamiliar special set-up or configuration screen. This direct reset capability increases usability of the feature.

A reminder button $22_2$ (FIG. 26; labeled in connection with display area 30) permits a user to direct the system served by a thermostat using display 10 to remind the user at a later time of the need for a service such as, by way of example and not by way of limitation, redisplaying the reminder message, displaying the reminder message in a flashing mode, emitting an audible alert or another reminder technique. This "Remind Later" feature may be useful when a homeowner does not have a replacement filter handy when the reminder is first displayed. The "Remind Later" feature permits a user to dismiss a reminder temporarily without having to reset the reminder or having to see the reminder displayed continuously until reset. The remind period may be a predetermined maximum time such as, by way of example and not by way of limitation, seven days.

Prior art thermostat control devices generally require a user to enter a reminder interval or delay using a code corresponding to a time, such as a number of days. The time code is commonly provided in a user manual and is likely not something the user remembers. The capability to enter reminder delay interval or other time in terms of a number of months (or other predetermined time interval) in display 10 is a significant improvement in convenience and ease of use for a user.

Display 10 could be provided with access to a stored calendar. Such a stored calendar could be contained within a processor device associated with a control device operating with display 10 (not shown in detail in FIGS. 1-51). In such an arrangement, a user could select a "calendar function" and scroll through calendars to select a particular date for a reminder to be displayed.

Figure 27:
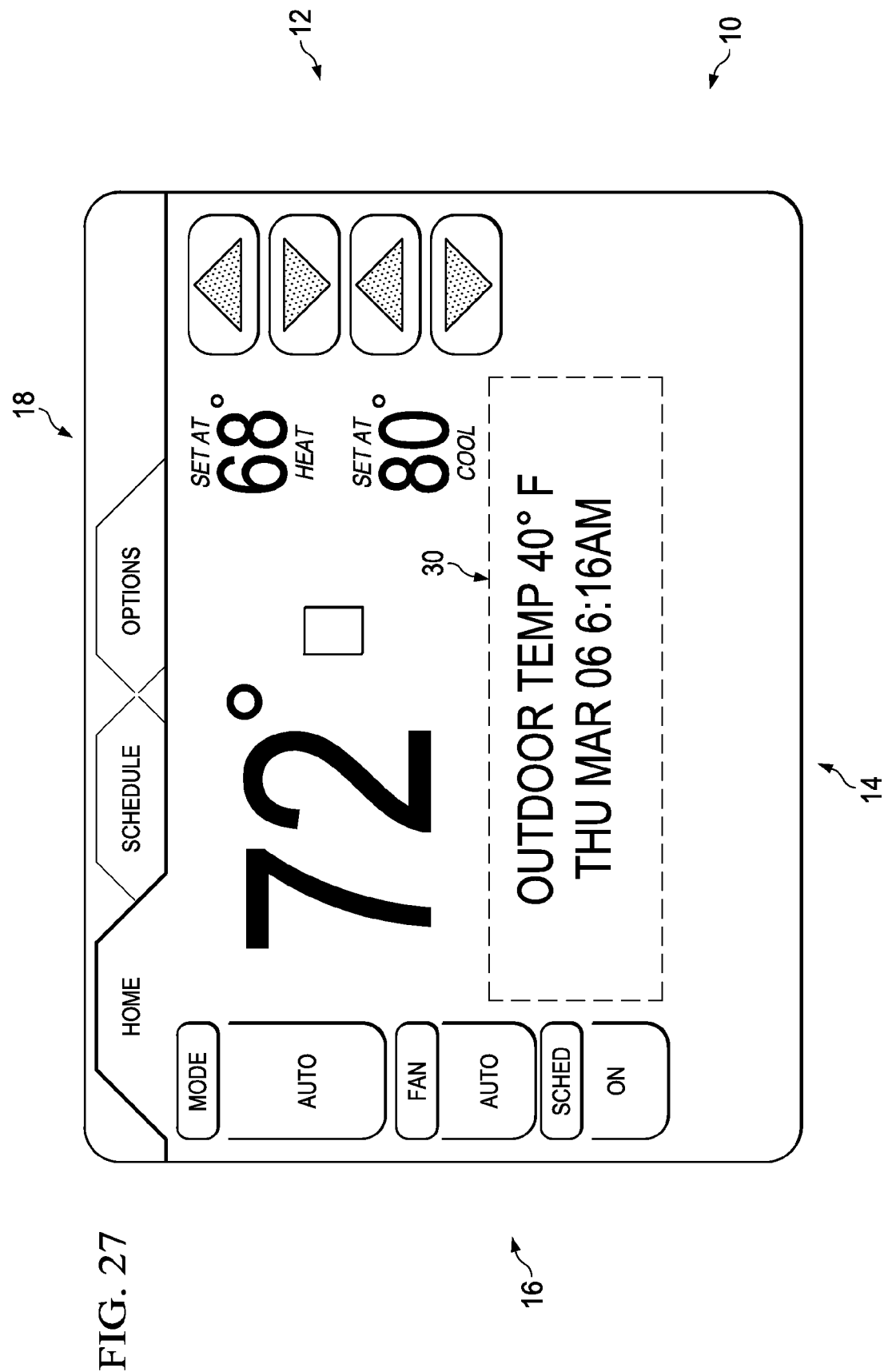
FIG. 27 is a first view of the display illustrating programming steps associated with the Clean Screen Feature.
Figure 28:
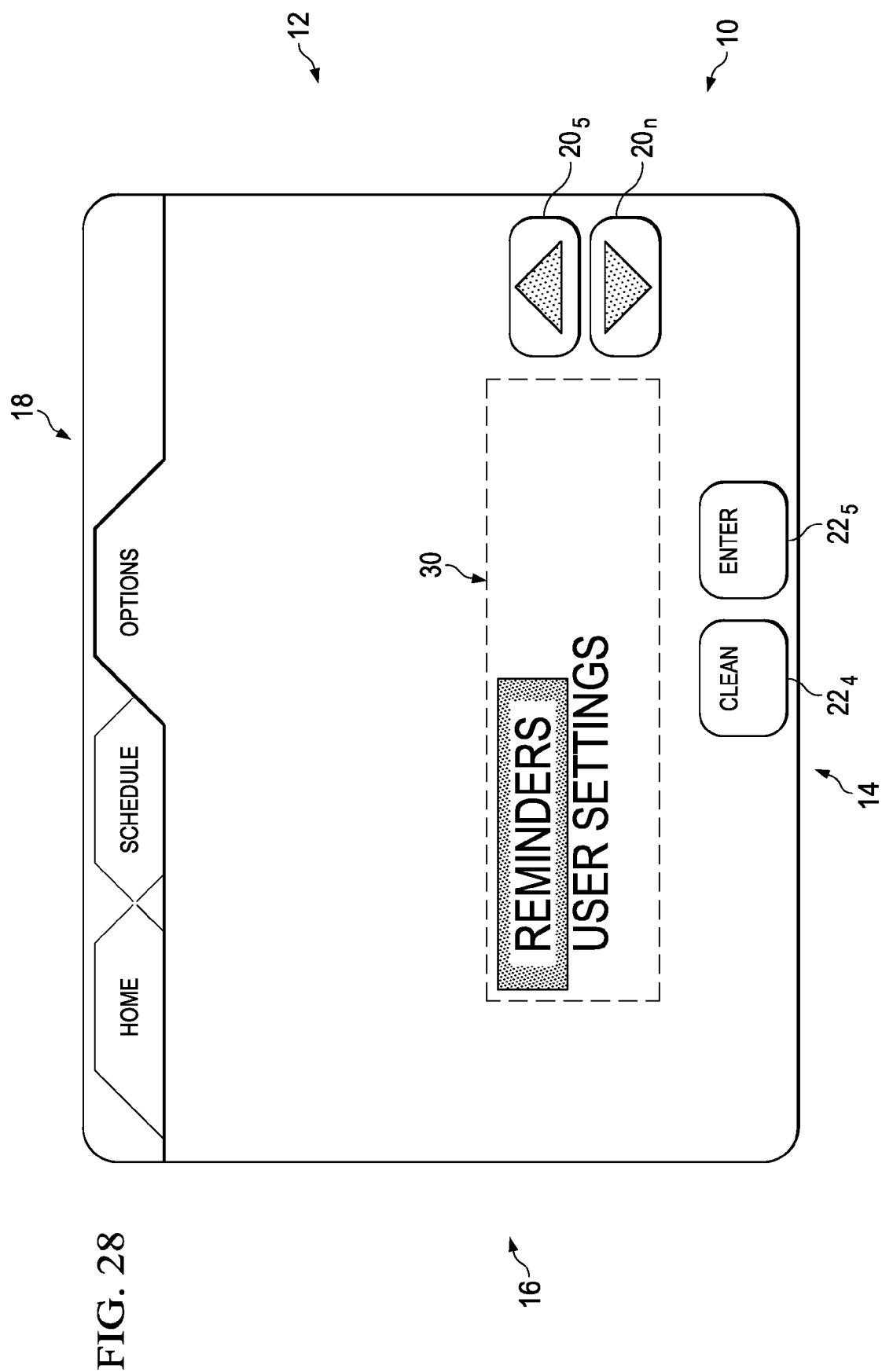
FIG. 28 is a second view of the display illustrating programming steps associated with the Clean Screen Feature.
Figure 29:
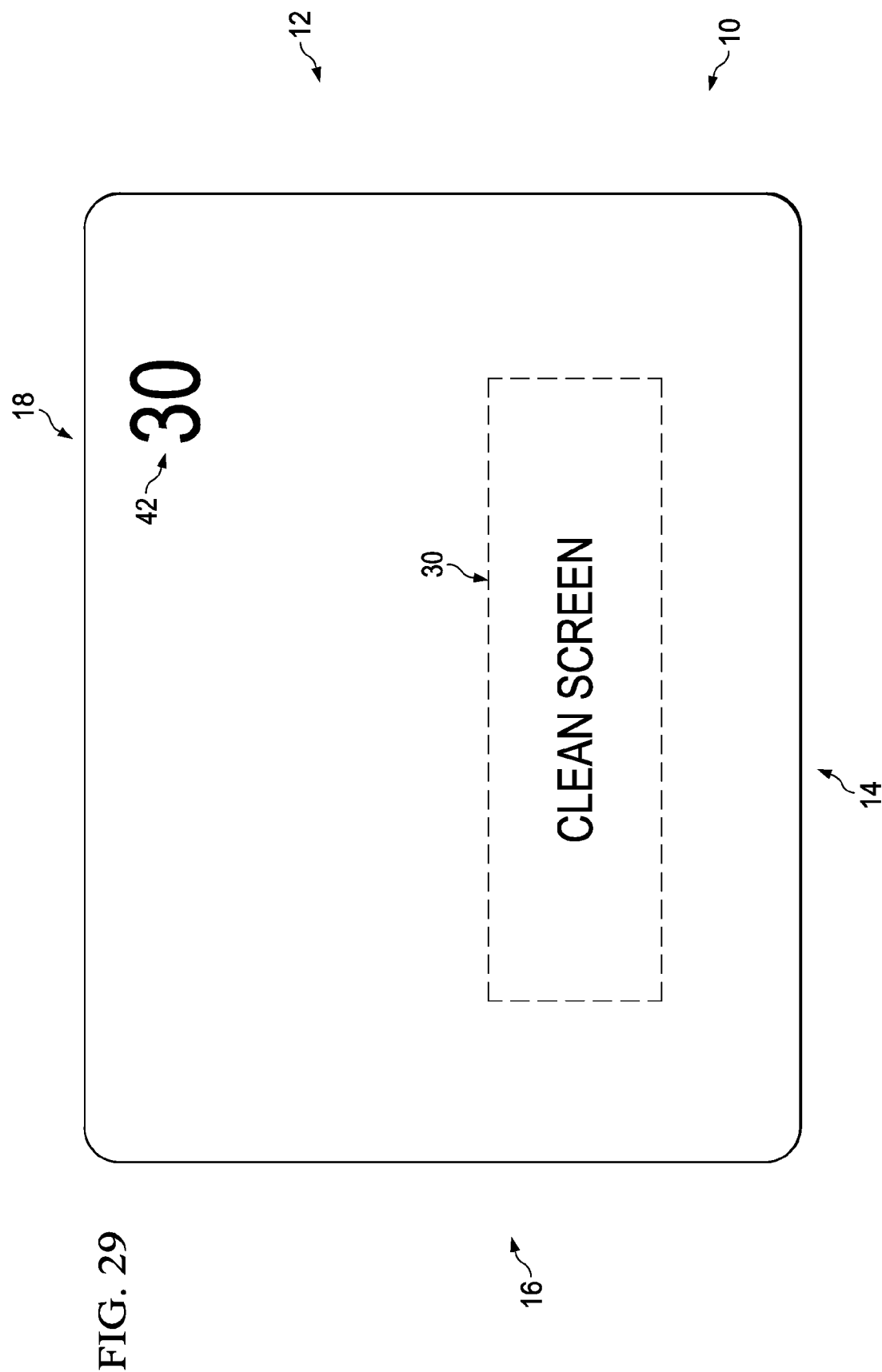
FIG. 29 is a third view of the display illustrating programming steps associated with the Clean Screen Feature.

FIG. 27 is a first view of the display illustrating programming steps associated with the Clean Screen Feature. FIG. 28 is a second view of the display illustrating programming steps associated with the Clean Screen Feature. FIG. 29 is a third view of the display illustrating programming steps associated with the Clean Screen Feature. Regarding FIGS. 27-29 together, a user may touch display 10 generally anywhere to activate the backlight and render display 10 easy to read (FIG. 27).

In setting up a CLEAN SCREEN configuration in a system using display 10, a user places display 10 in an OPTION configuration substantially as described above in connection with FIGS. 5-7. In the OPTIONS configuration display 10 may appear substantially as presented in FIG. 28. To set up a CLEAN SCREEN configuration, a user may press CLEAN button $22_4$. The CLEAN SCREEN configuration thus set up deactivates all touch responsive loci for touch screen entry to display 10 for a predetermined period such as, by way of example and not by way of limitation, thirty seconds. By deactivating the touch responsive loci of display 10 one may be able to clean the screen without inadvertently providing input signals to the system supported and controlled by the thermostat device using display 10 (not shown in FIG. 27-29). Pressing or otherwise activating CLEAN button $22_4$ again may provide additional time for cleaning the screen. Display 10 may indicate remaining time for duration of the CLEAN SCREEN configuration as at locus 42 (FIG. 29).

Figure 30:
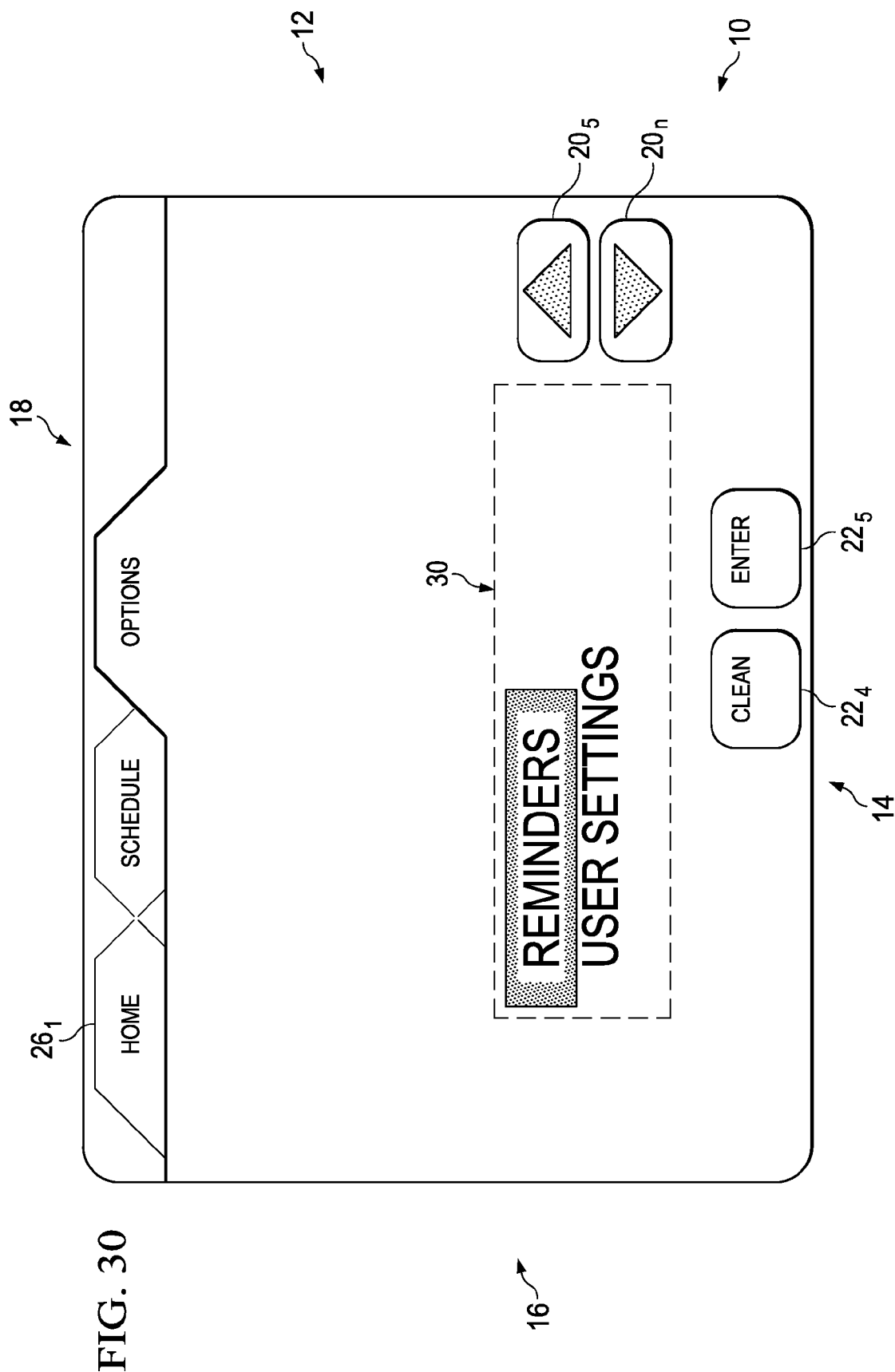
FIG. 30 is a first view of the display illustrating programming steps associated with turning ON or OFF of display of certain parameters.
Figure 31:
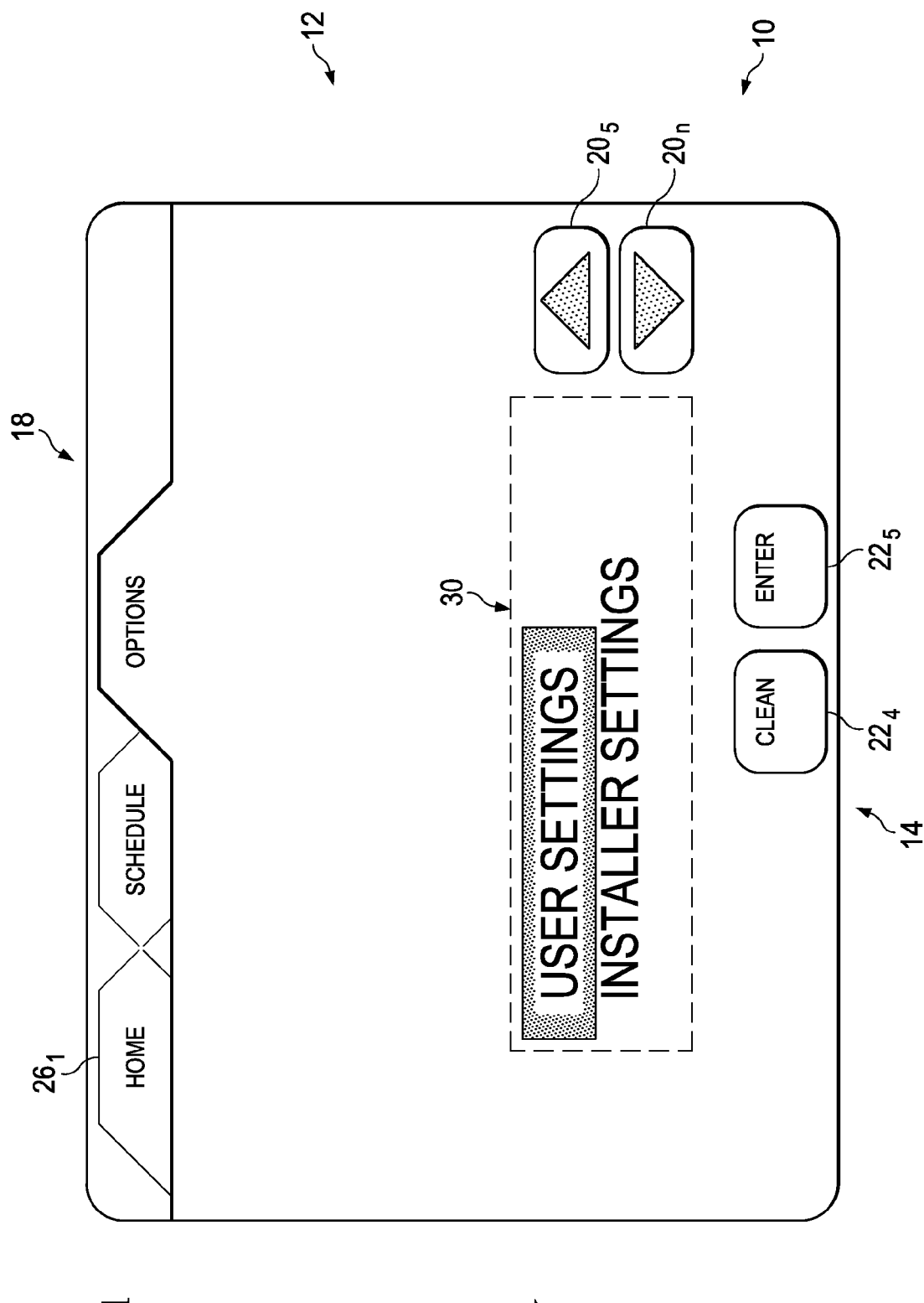
FIG. 31 is a second view of the display illustrating programming steps associated with turning ON or OFF of display of certain parameters.
Figure 32:
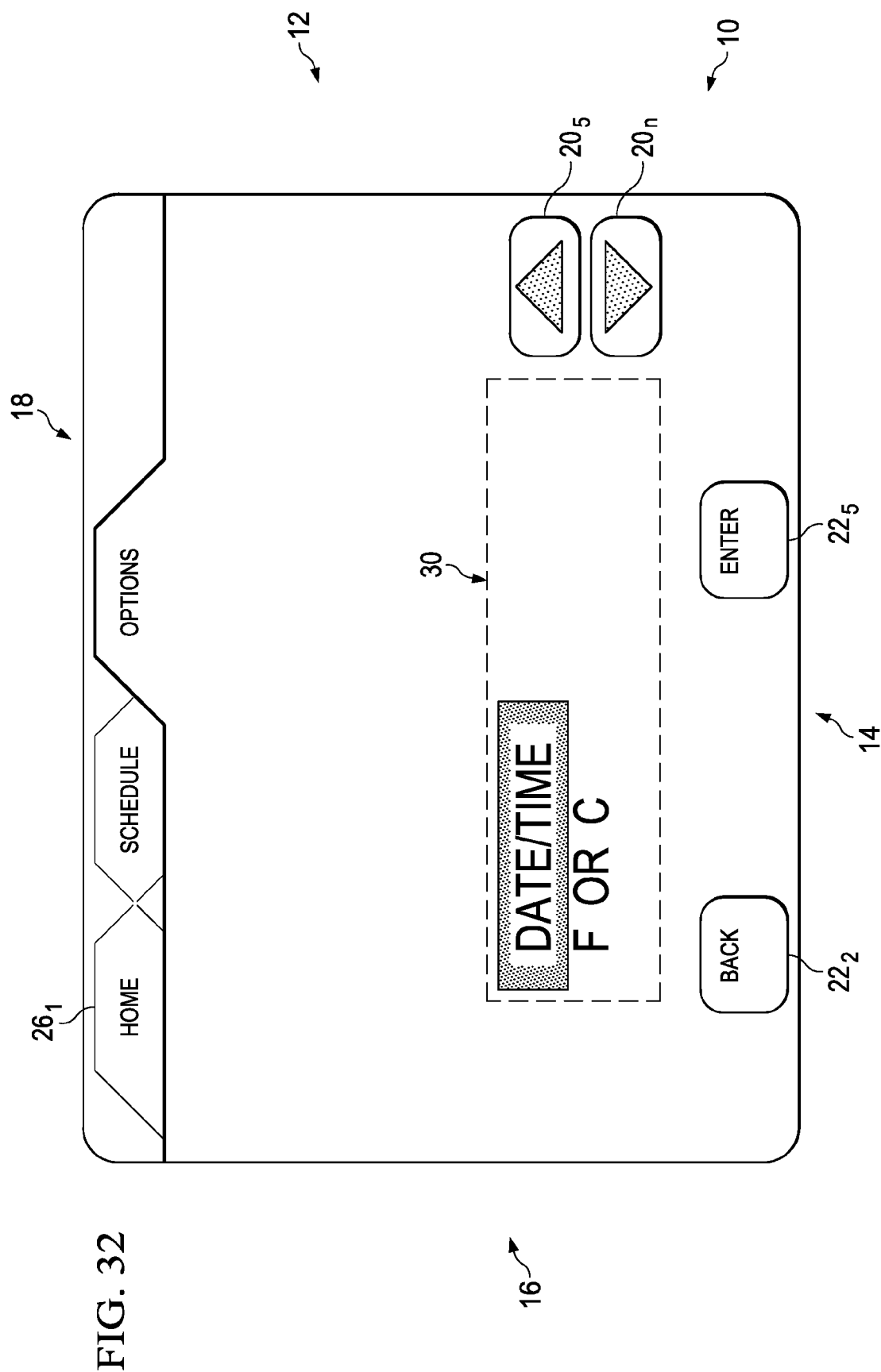
FIG. 32 is a third view of the display illustrating programming steps associated with turning ON or OFF of display of certain parameters.
Figure 33:
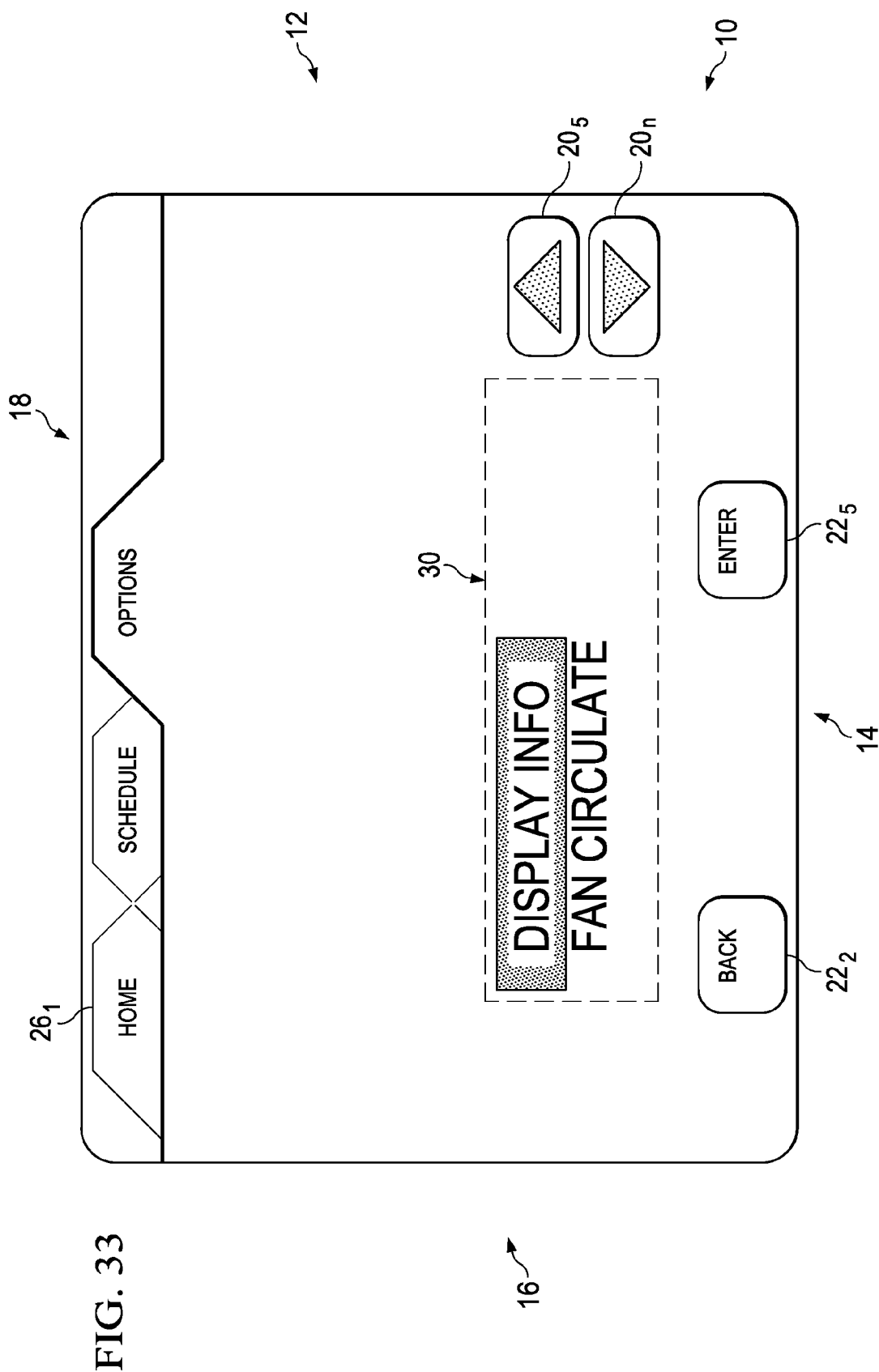
FIG. 33 is a fourth view of the display illustrating programming steps associated with turning ON or OFF of display of certain parameters.
Figure 34:
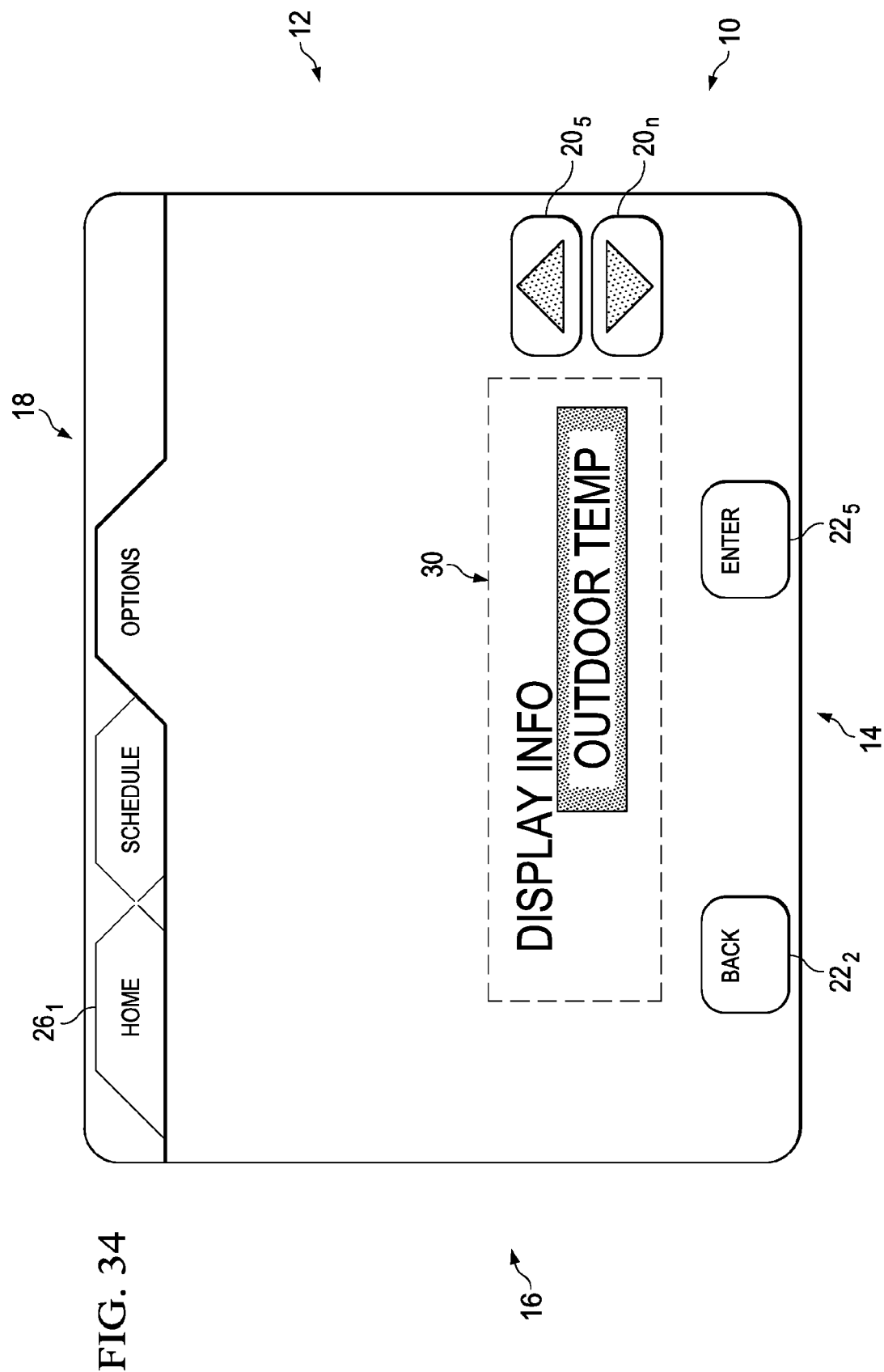
FIG. 34 is a fifth view of the display illustrating programming steps associated with turning ON or OFF of display of certain parameters.
Figure 35:
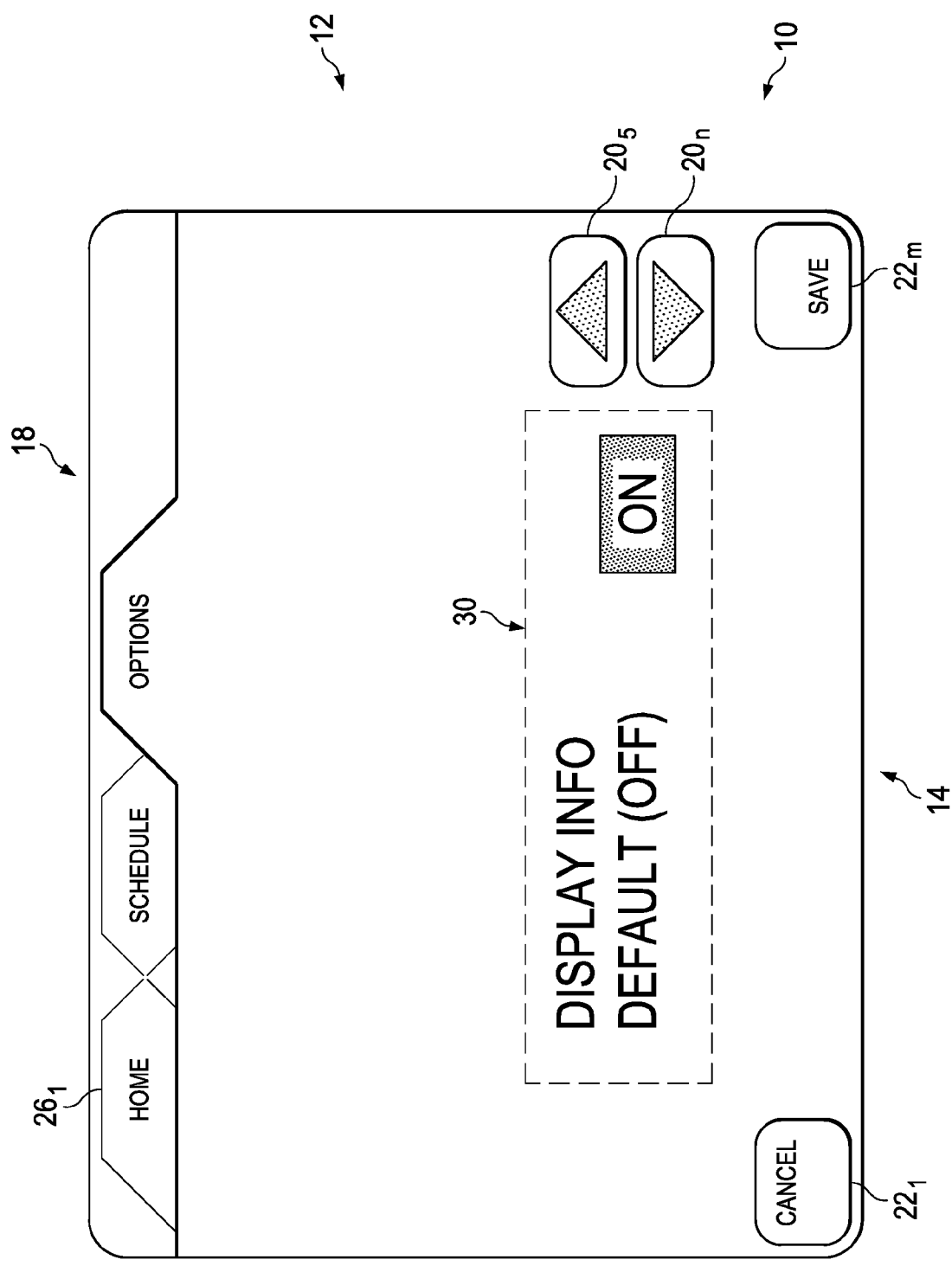
FIG. 35 is a sixth view of the display illustrating programming steps associated with turning ON or OFF of display of certain parameters.

FIG. 30 is a first view of the display illustrating programming steps associated with turning ON or OFF of display of certain parameters. FIG. 31 is a second view of the display illustrating programming steps associated with turning ON or OFF of display of certain parameters. FIG. 32 is a third view of the display illustrating programming steps associated with turning ON or OFF of display of certain parameters. FIG. 33 is a fourth view of the display illustrating programming steps associated with turning ON or OFF of display of certain parameters. FIG. 34 is a fifth view of the display illustrating programming steps associated with turning ON or OFF of display of certain parameters. FIG. 35 is a sixth view of the display illustrating programming steps associated with turning ON or OFF of display of certain parameters. Regarding FIGS. 30-35 together, in programming display 10 to turn ON or OFF the display of certain parameters, a user places display 10 in an OPTION configuration substantially as described above in connection with FIGS. 5-7. In the OPTIONS configuration display 10 may appear substantially as presented in FIG. 30. A user may press UP arrow $20_5$ or DOWN arrow $20_n$ to scroll through a list of adjustable settings presented in display area 30 (FIG. 30). Adjustable settings are highlighted or otherwise differentiated from other adjustable settings as each becomes available for selection. A user may select USER SETTINGS by pressing or otherwise actuating ENTER button $22_5$ when USER SETTINGS is highlighted. A user may then press UP arrow $20_5$ or DOWN arrow $20_n$ to scroll through a list of USER SETTINGS alternatives presented in display area 30 (FIG. 32). A user may then select DISPLAY INFO by pressing or otherwise actuating ENTER button $22_5$ when DISPLAY INFO is displayed in display area 30 (FIG. 33). A user may then press UP arrow $20_5$ or DOWN arrow $20_n$ to scroll through a list of DISPLAY INFO alternatives presented in display area 30 (FIG. 34). A user may then select OUTDOOR TEMP (by way of example and not by way of limitation) by pressing or otherwise actuating ENTER button $22_5$ when OUTDOOR TEMP is displayed in display area 30 (FIG. 34). A user may then press UP arrow $20_5$ or DOWN arrow $20_n$ to scroll through an ON alternative and an OFF alternative presented in display area 30 (FIG. 35). A user may then select ON (by way of example and not by way of limitation) by pressing or otherwise actuating SAVE button $22_m$ when ON is displayed in display area 30 (FIG. 35).

If no outdoor sensor is installed in the system controlled by a thermostat employing display 10, a message "OUTDOOR SENSOR REQUIRED" may be displayed when the ON alternative is selected.

A user may select which parameters are displayed on the screen of display 10. This capability may reduce the amount of clutter on the screen and may make display 10 more readable. By way of example and not by way of limitation, a user can select whether or not to display indoor relative humidity or outside temperature.

Figure 36:
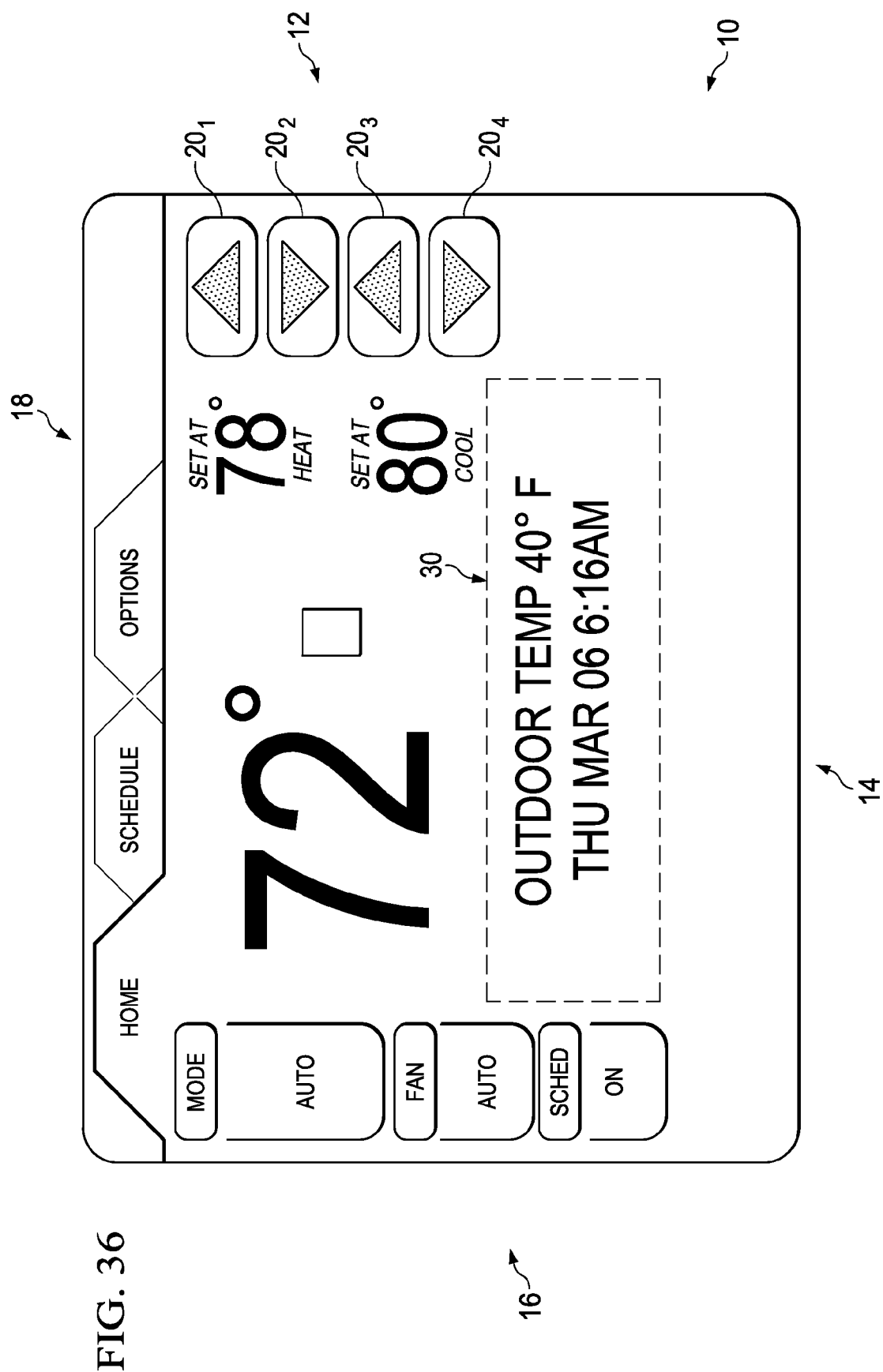
FIG. 36 is a first view of the display illustrating toggling among displays of certain parameters.
Figure 37:
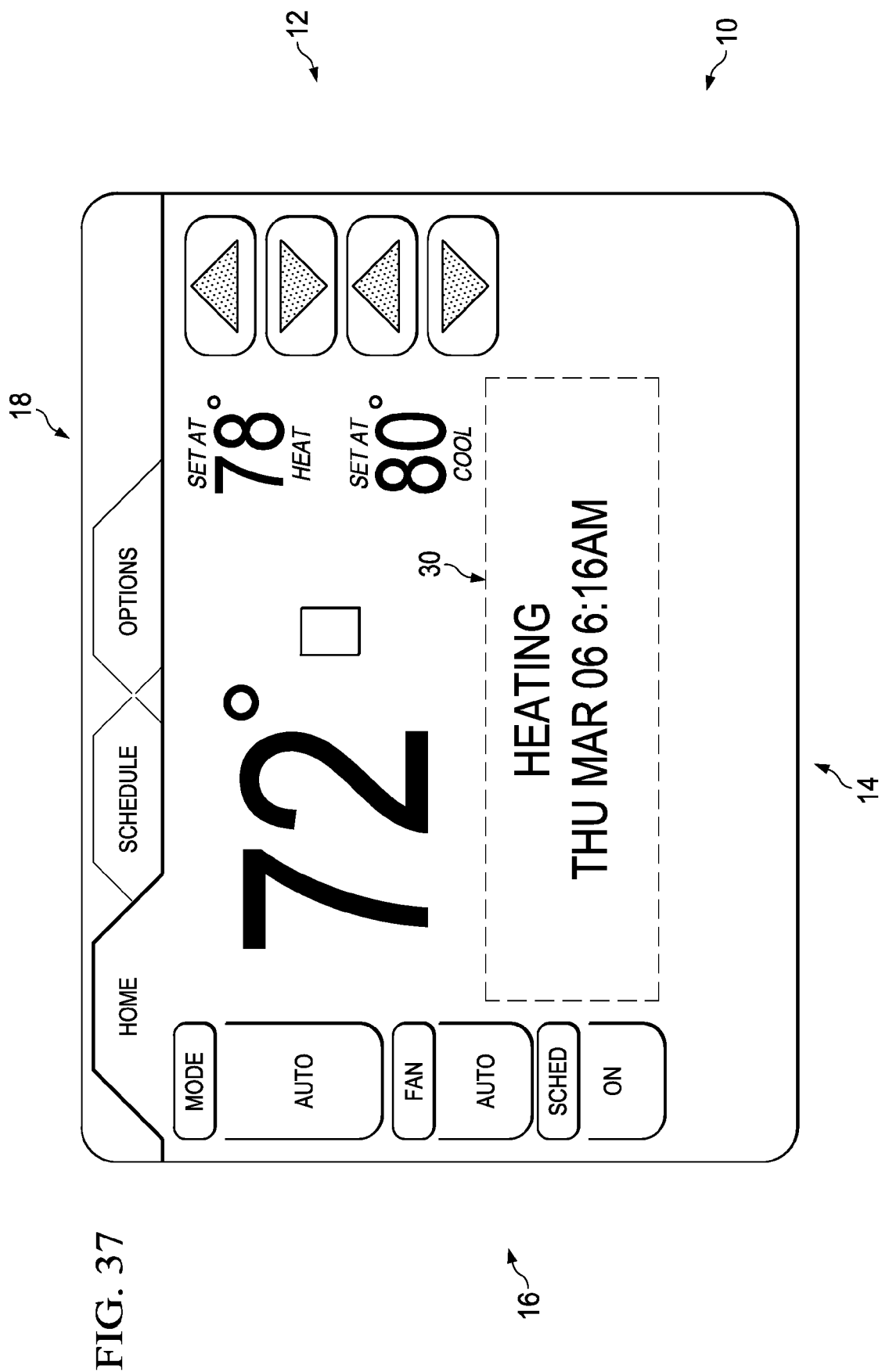
FIG. 37 is a second view of the display illustrating toggling among displays of certain parameters.
Figure 38:
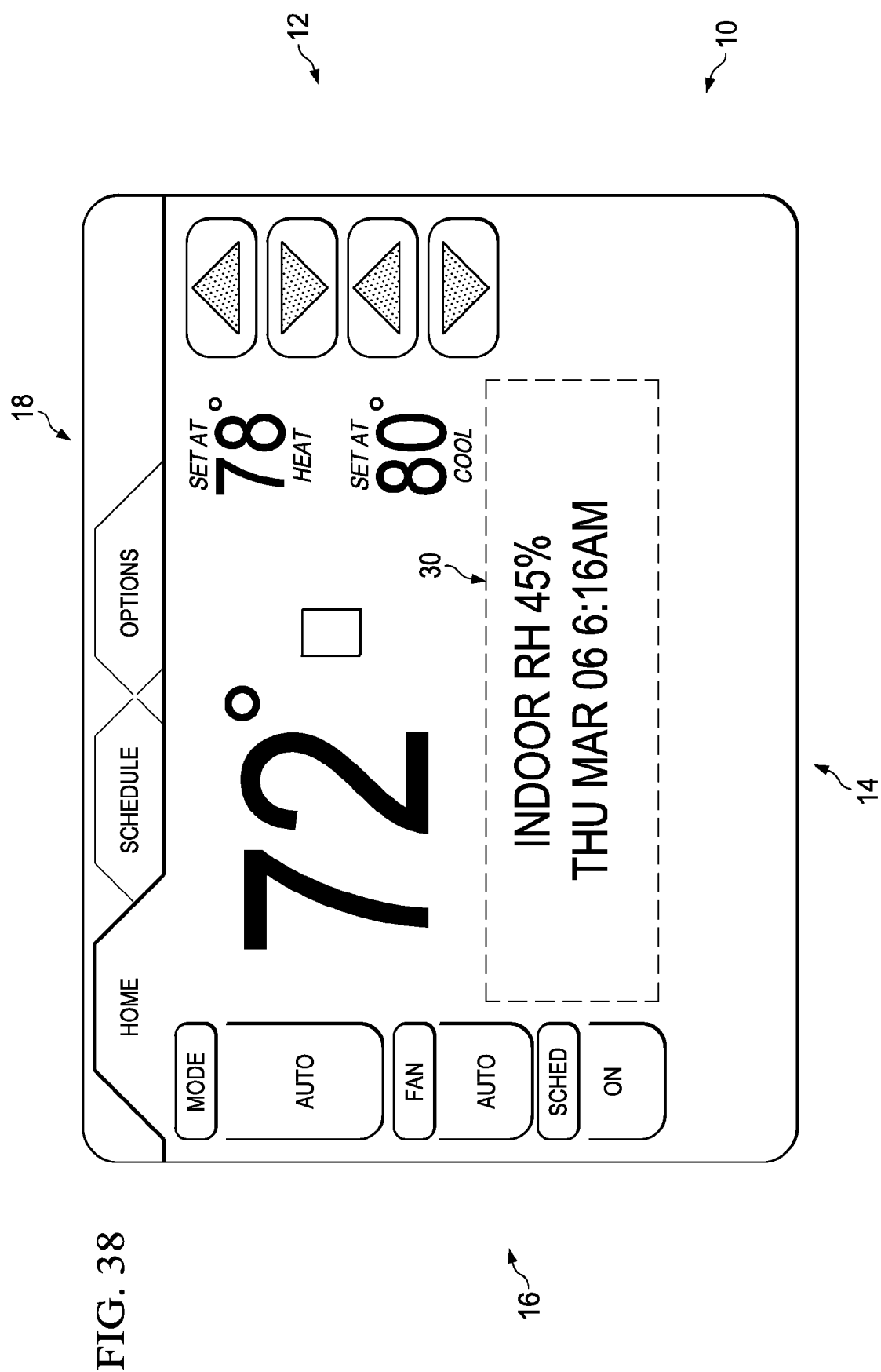
FIG. 38 is a third view of the display illustrating toggling among displays of certain parameters.

FIG. 36 is a first view of the display illustrating toggling among displays of certain parameters. FIG. 37 is a second view of the display illustrating toggling among displays of certain parameters. FIG. 38 is a third view of the display illustrating toggling among displays of certain parameters. FIGS. 30-35 illustrate programming steps associated with turning ON or OFF of display of certain parameters, as discussed above. FIGS. 36-38 illustrate the result of programming steps carried out to effect toggling among displays of certain parameters.

Regarding FIGS. 30-38 together, in turning on toggling among displays of certain parameters, a user places display 10 in an OPTION configuration substantially as described above in connection with FIGS. 5-7. In the OPTIONS configuration display 10 may appear substantially as presented in FIG. 30. A user may press UP arrow $20_5$ or DOWN arrow $20_n$ to scroll through a list of adjustable settings presented in display area 30 (FIG. 30). Adjustable settings are highlighted or otherwise differentiated from other adjustable settings as each becomes available for selection. A user may select USER SETTINGS by pressing or otherwise actuating ENTER button $22_5$ when USER SETTINGS is highlighted. A user may then press UP arrow $20_5$ or DOWN arrow $20_n$ to scroll through a list of USER SETTINGS alternatives presented in display area 30 (FIG. 32). A user may then select DISPLAY INFO by pressing or otherwise actuating ENTER button $22_5$ when DISPLAY INFO is displayed in display area 30 (FIG. 33). A user may then press UP arrow $20_5$ or DOWN arrow $20_n$ to scroll through a list of DISPLAY INFO alternatives presented in display area 30 (FIG. 34). A user may then select OUTDOOR TEMP (by way of example and not by way of limitation) by pressing or otherwise actuating ENTER button $22_5$ when OUTDOOR TEMP is displayed in display area 30 (FIG. 34). A user may then press UP arrow $20_5$ or DOWN arrow $20_n$ to scroll through an ON alternative and an OFF alternative presented in display area 30 (FIG. 35). A user may then select ON (by way of example and not by way of limitation) by pressing or otherwise actuating ENTER button $22_5$ when ON is displayed in display area 30 (FIG. 35) and press SAVE (button $22_m$; see FIG. 1). If no outdoor sensor is installed in the system controlled by a thermostat employing display 10, a message "OUTDOOR SENSOR REQUIRED" may be displayed when the ON alternative is selected.

A user may then press UP arrow $20_5$ or DOWN arrow $20_n$ to again select DISPLAY INFO by pressing or otherwise actuating ENTER button $22_5$ when DISPLAY INFO is displayed in display area (FIG. 33). A user may then press UP arrow $20_5$ or DOWN arrow $20_n$ to scroll through a list of DISPLAY INFO alternatives presented in display area 30 (FIG. 34). A user may then select INDOOR RH (by way of further example and not by way of limitation) by pressing or otherwise actuating ENTER button $22_5$ when INDOOR RH is displayed in display area 30. A user may then press UP arrow $20_5$ or DOWN arrow $20_n$ to scroll through an ON alternative and an OFF alternative presented in display area 30 (FIG. 35). A user may then select ON (by way of example and not by way of limitation) by pressing or otherwise actuating ENTER button $22_5$ when ON is displayed in display area 30 (FIG. 35) and press SAVE (button $22_m$).

A user may thereafter press or otherwise activate HOME tab $26_1$ and observe display area 30 presenting messages as illustrated in FIGS. 36-38 in a repeating sequence, or toggling, display.

With the variable display capability of display area 30, fixed portions of display 10 need not be dedicated to displaying information. Information can be programmed to rotate or toggle automatically in display area 30.

Figure 39:
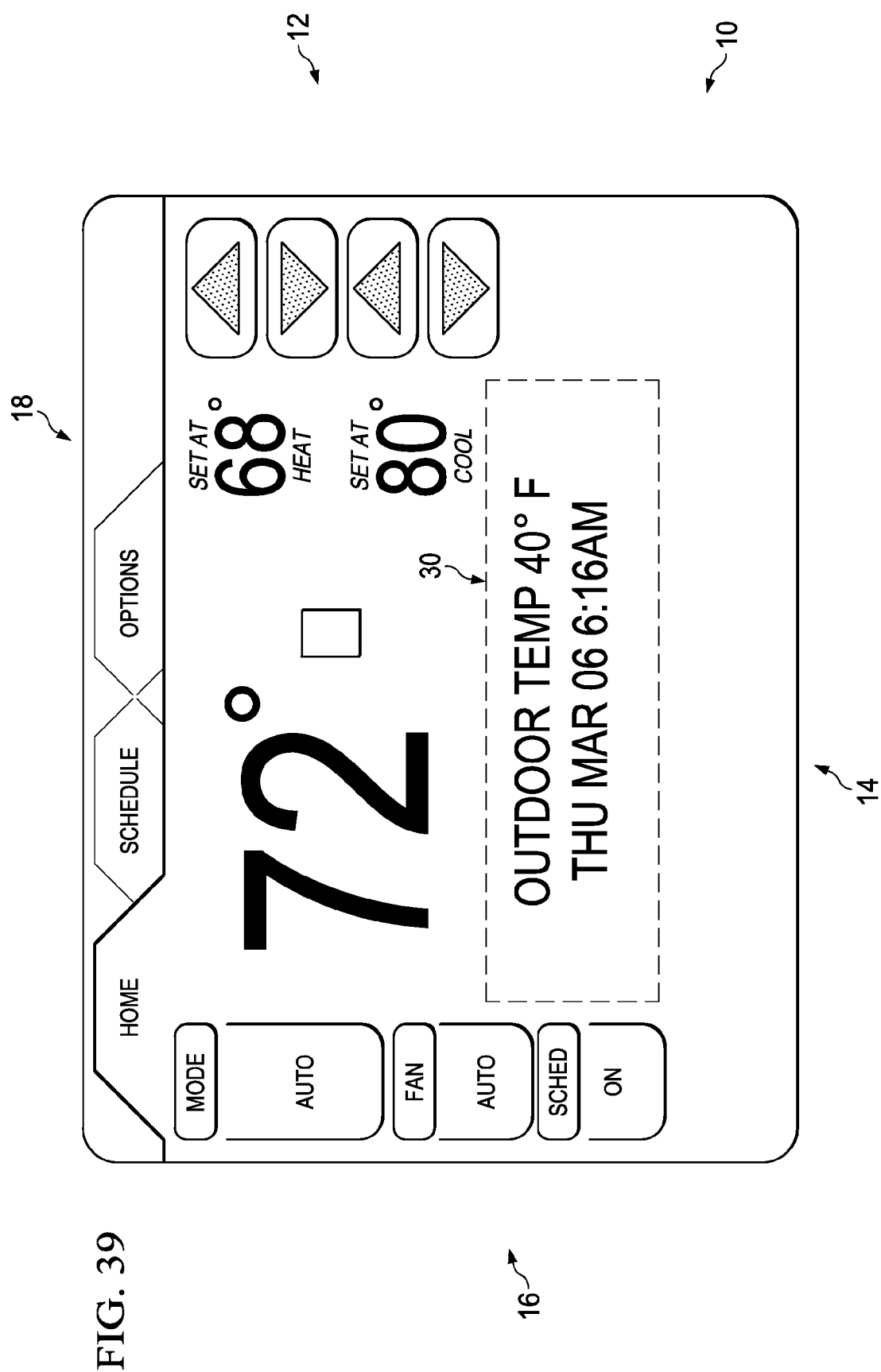
FIG. 39 is a first view of the display illustrating programming steps associated with displays of custom reminders.
Figure 40:
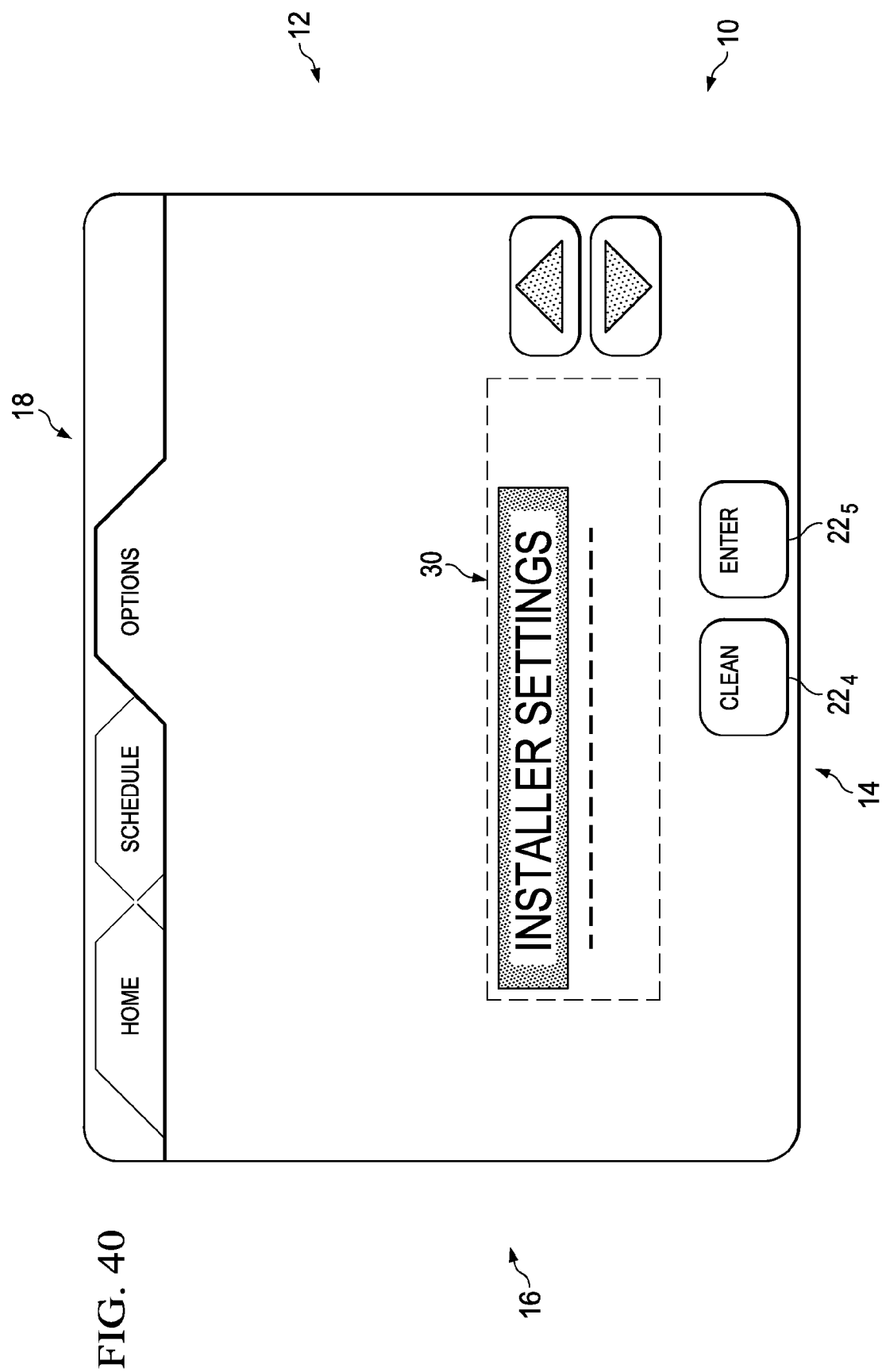
FIG. 40 is a second view of the display illustrating programming steps associated with displays of custom reminders.
Figure 41:
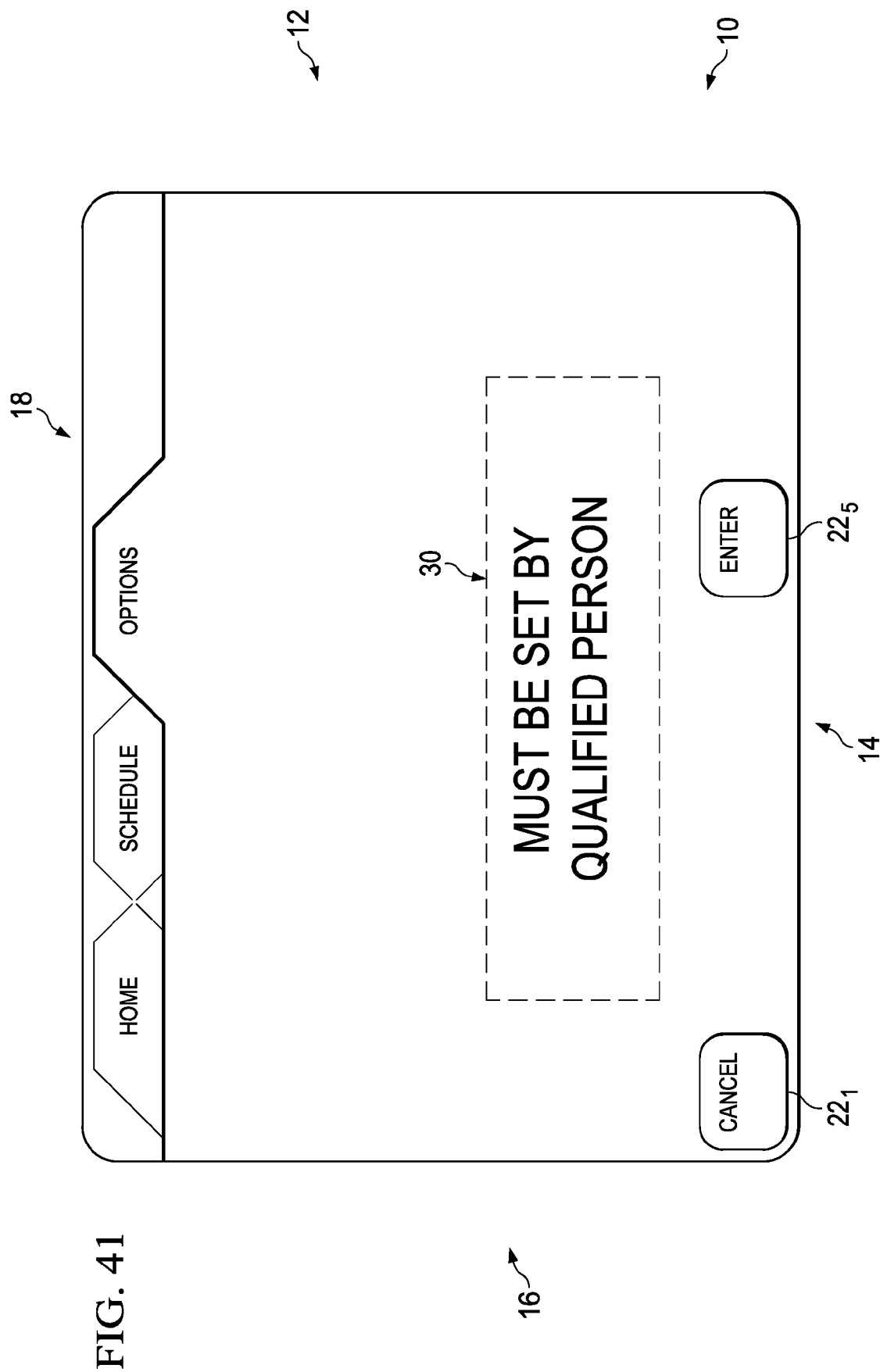
FIG. 41 is a third view of the display illustrating programming steps associated with displays of custom reminders.
Figure 42:
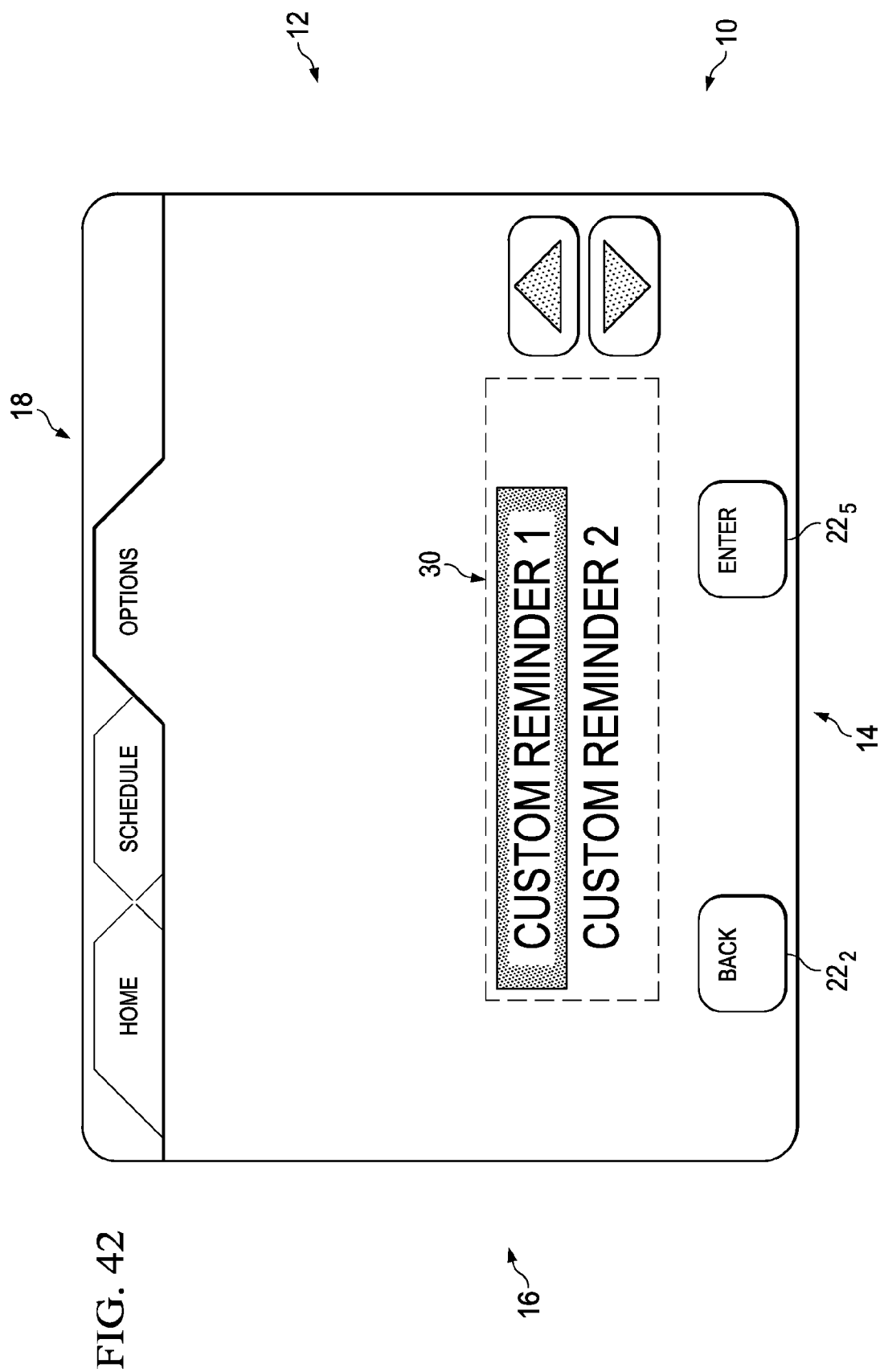
FIG. 42 is a fourth view of the display illustrating programming steps associated with displays of custom reminders.
Figure 43:
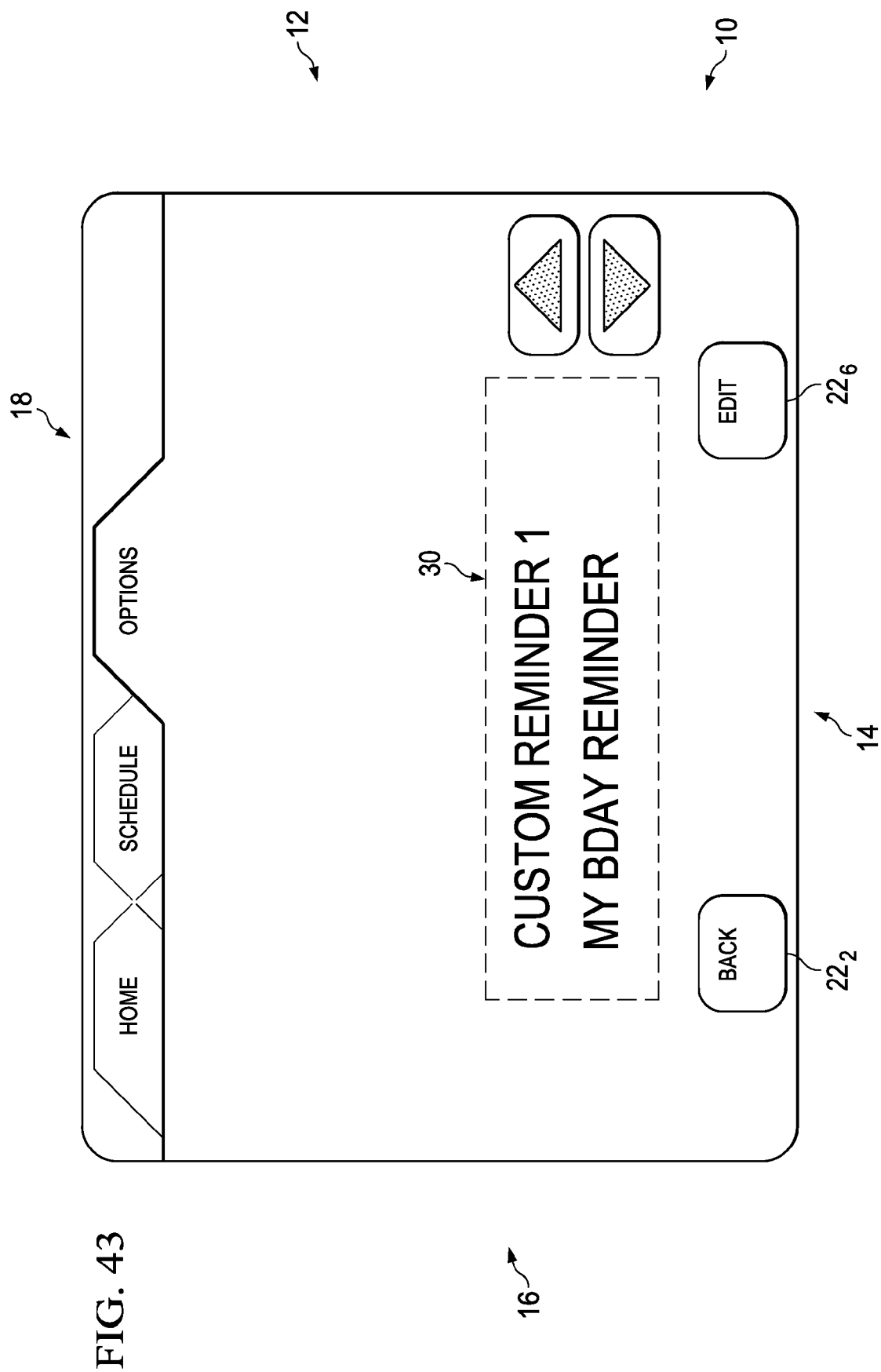
FIG. 43 is a fifth view of the display illustrating programming steps associated with displays of custom reminders.
Figure 44:
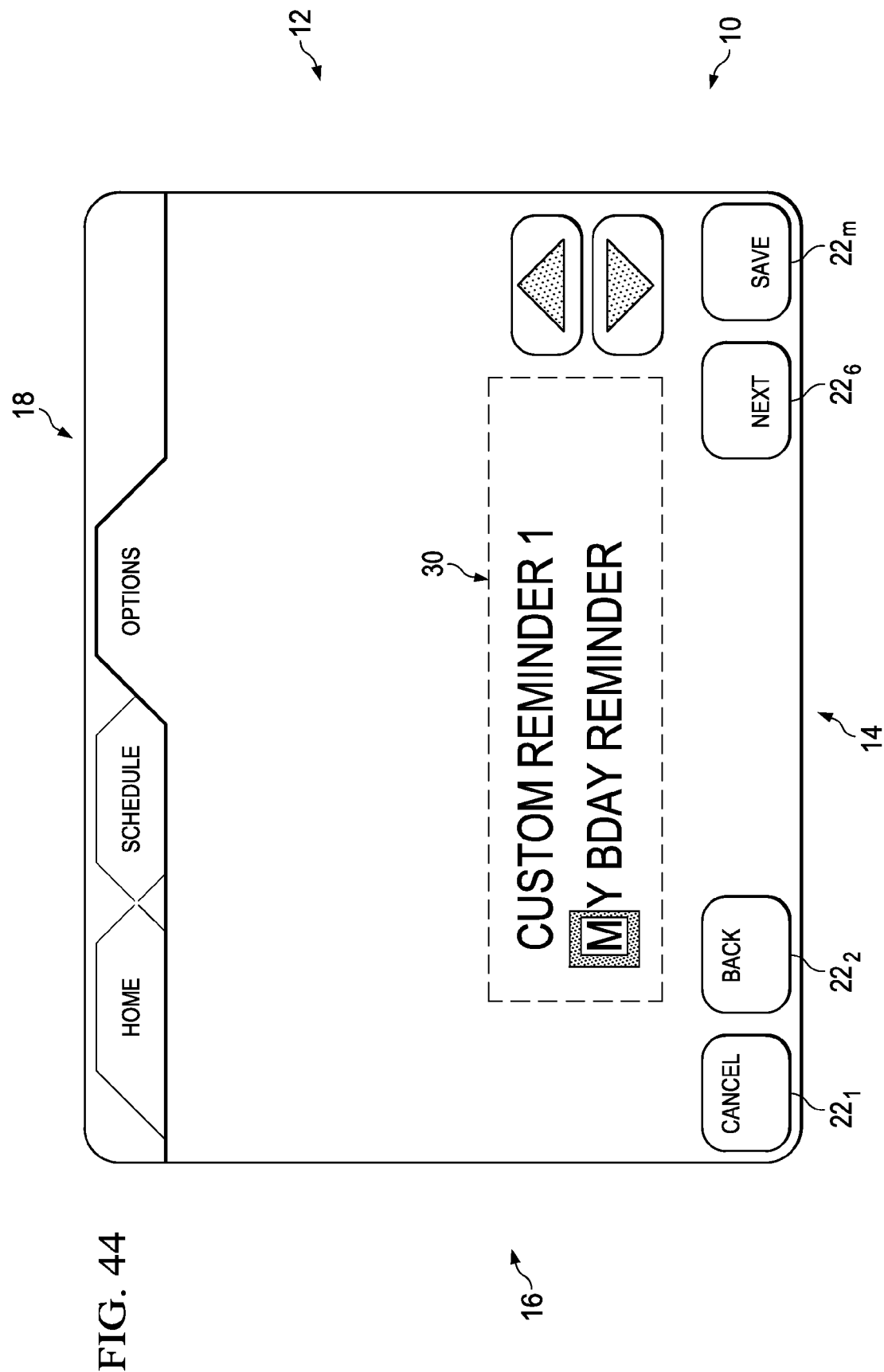
FIG. 44 is a sixth view of the display illustrating programming steps associated with displays of custom reminders.

FIG. 39 is a first view of the display illustrating programming steps associated with displays of custom reminders. FIG. 40 is a second view of the display illustrating programming steps associated with displays of custom reminders. FIG. 41 is a third view of the display illustrating programming steps associated with displays of custom reminders. FIG. 42 is a fourth view of the display illustrating programming steps associated with displays of custom reminders. FIG. 43 is a fifth view of the display illustrating programming steps associated with displays of custom reminders. FIG. 44 is a sixth view of the display illustrating programming steps associated with displays of custom reminders. Regarding FIGS. 39-44 together, a user may touch display 10 generally anywhere to activate the backlight and render display 10 easy to read (FIG. 39).

In programming a Custom Reminder in a system using display 10, a user places display 10 in an OPTION configuration substantially as described above in connection with FIGS. 5-7. In the OPTIONS configuration display 10 may appear substantially as presented in FIG. 40. To set or program a Custom Reminder, a user may press UP arrow $20_5$ or DOWN arrow $20_n$ to scroll through a list of adjustable settings presented in display area 30 (FIG. 40). Adjustable settings are highlighted or otherwise differentiated from other adjustable settings as each becomes available for selection. A user may be presented with a plurality of displayed settings for selection, may scroll among the displayed settings using UP arrow $20_5$ or DOWN arrow $20_n$ and may select INSTALLER SETTINGS by pressing or otherwise actuating ENTER button $22_5$ when INSTALLER SETTINGS is highlighted. FIG. 41 is presented to warn a user that installer settings must be set by a qualified user. A user may then press ENTER button $22_5$ to advance to installer settings. A user may be presented with a plurality of displayed INSTALLER SETTINGS for selection, may scroll among the displayed INSTALLER SETTINGS to scroll to a list of reminder alternatives presented in display area 30 (FIG. 42). A user may then select CUSTOM REMINDER 1 by pressing or otherwise actuating ENTER button $22_5$ when CUSTOM REMINDER 1 is displayed in display area 30 (FIG. 42).

Thereafter, a user may press EDIT button $22_6$ and press UP arrow $20_5$ or DOWN arrow $20_n$ to scroll through alphanumeric characters displayed (FIGS. 43, 44). When a desired alphanumeric character is displayed in display area 30, a user may press or otherwise activate NEXT button $22_6$ to select a subsequent character. BACK button $22_2$ may be employed to return to a previously selected character if desired (FIG. 43).

When the desired annotation has been selected for CUSTOM REMINDER 1, a user may press or otherwise activate SAVE button $22_m$ to save the Custom Reminder for display. Date and time for display may be entered as selectable characters in response to prompting by display 10 (not shown in detail in FIGS. 39-44).

Installing HVAC contractors, dealers or other installing personnel typically offer users such as homeowners various routine services such as, by way of example and not by way of limitation, duct cleaning, cleaning outside portions of HVAC units, system checkups and similar services. Prior art HVAC system control displays do not provide users with reminders of such services other than the installer or dealer calling the user when the scheduled service is due or sending a reminder post card. Display 10 permits programming reminders so that a contractor, installer or dealer can add a custom reminder that is specific to the service offered. Once set up, display 10 may display the reminder message in a manner similar to other reminders, such as a reminder to check filters.

Figure 45:
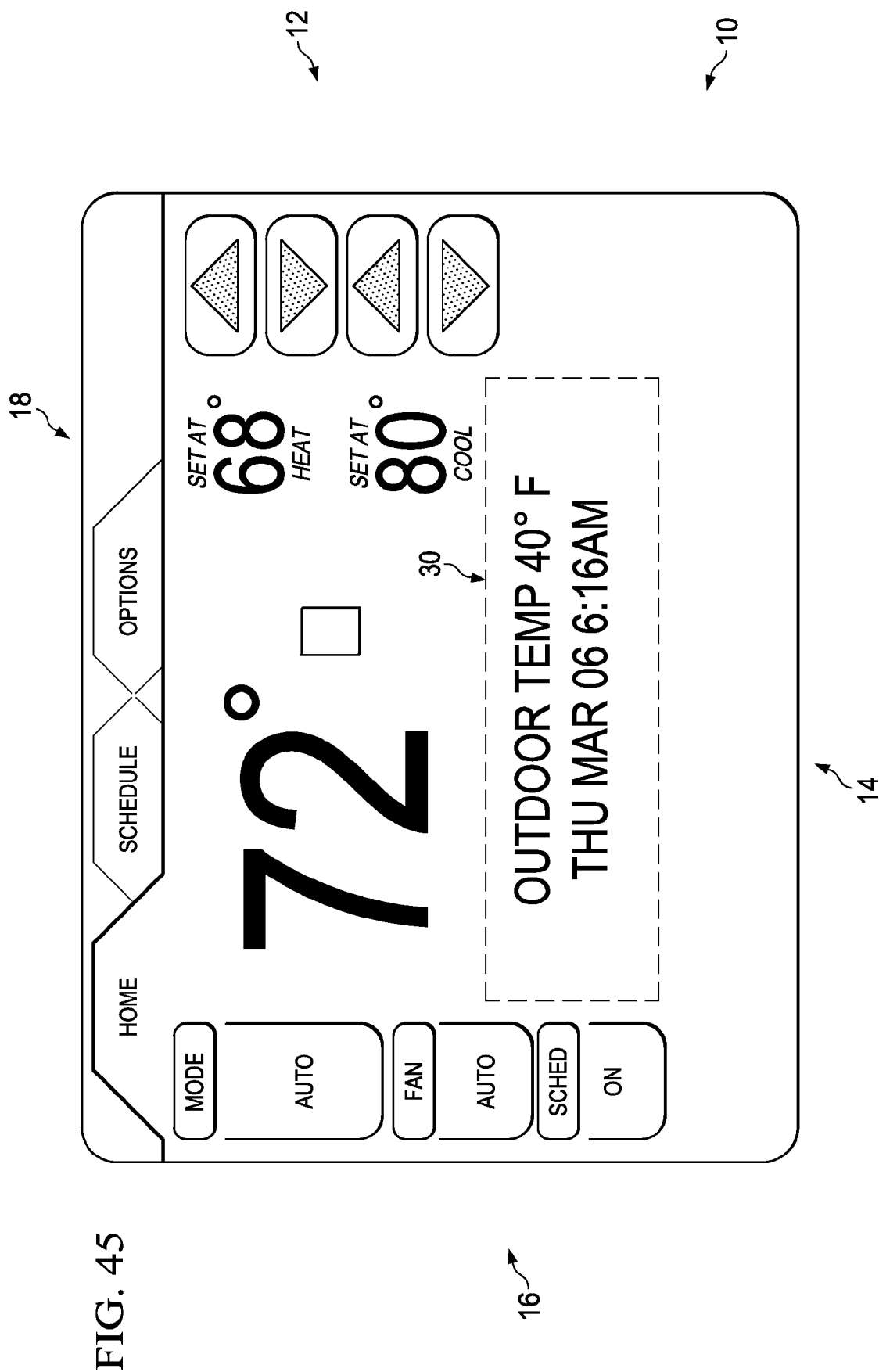
FIG. 45 is a first view of the display illustrating programming steps associated with hiding display of menu items not relevant to a user's extant system.
Figure 46:
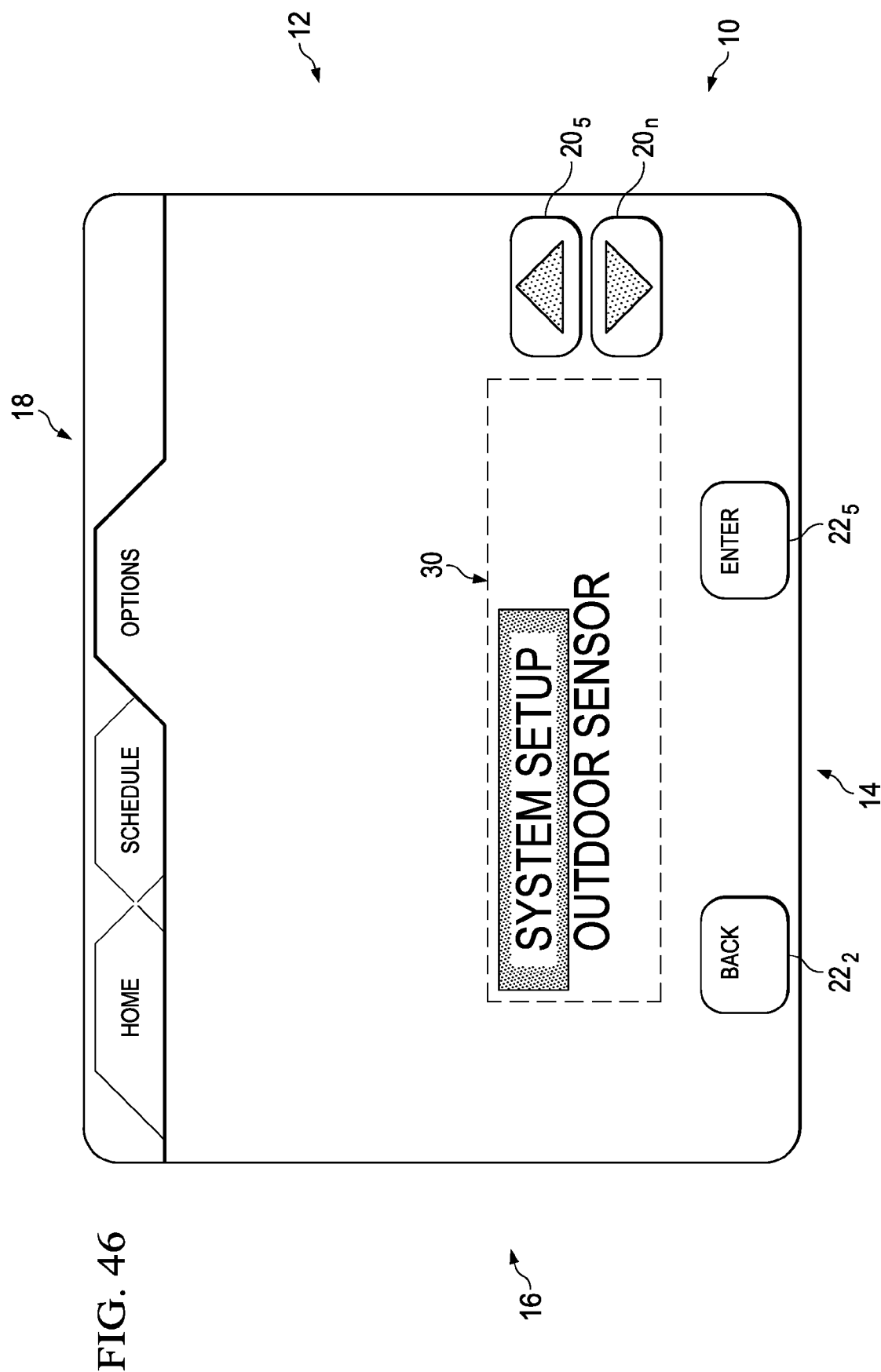
FIG. 46 is a second view of the display illustrating programming steps associated with hiding display of menu items not relevant to a user's extant system.
Figure 47:
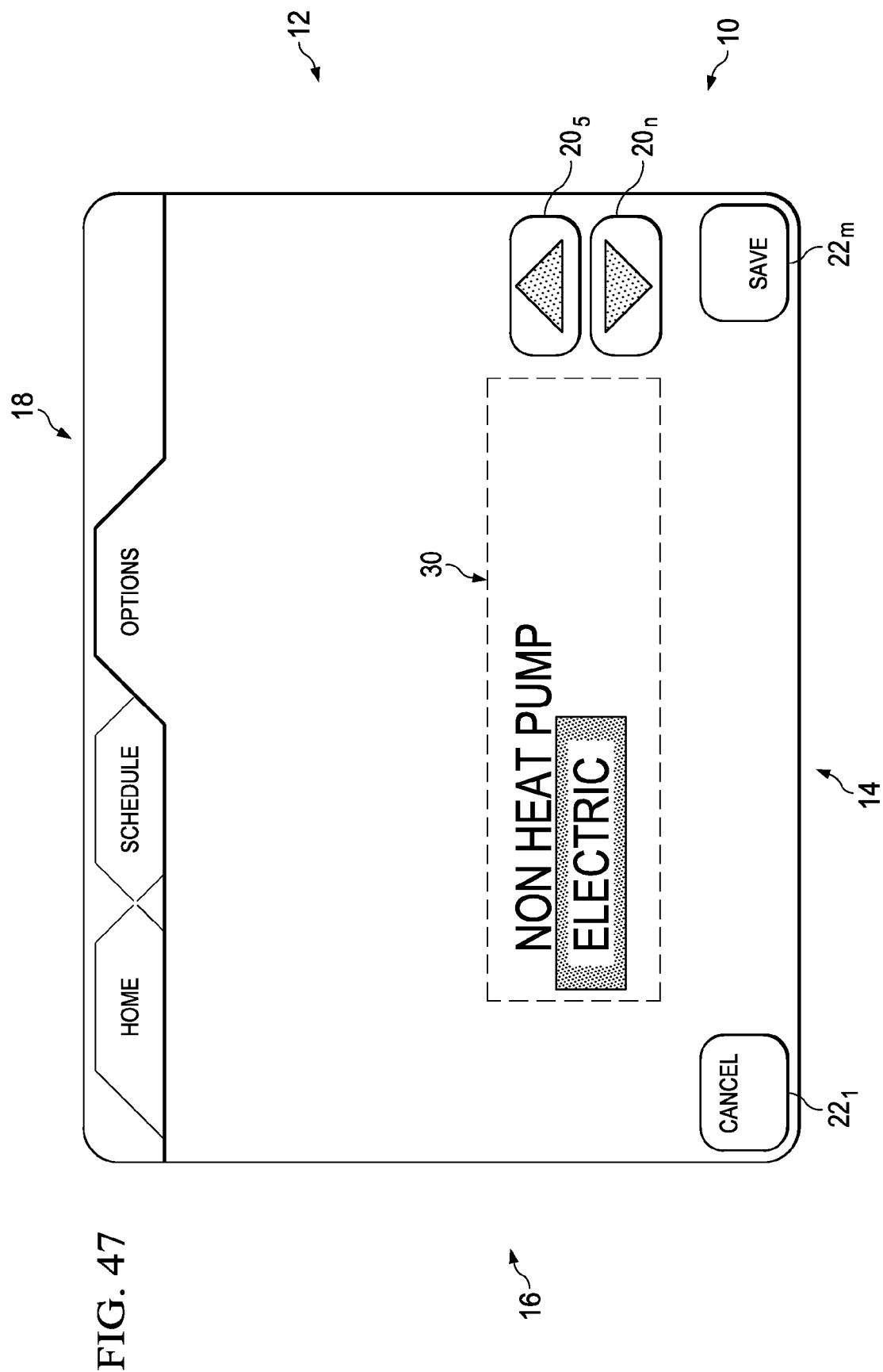
FIG. 47 is a third view of the display illustrating programming steps associated with hiding display of menu items not relevant to a user's extant system.
Figure 48:
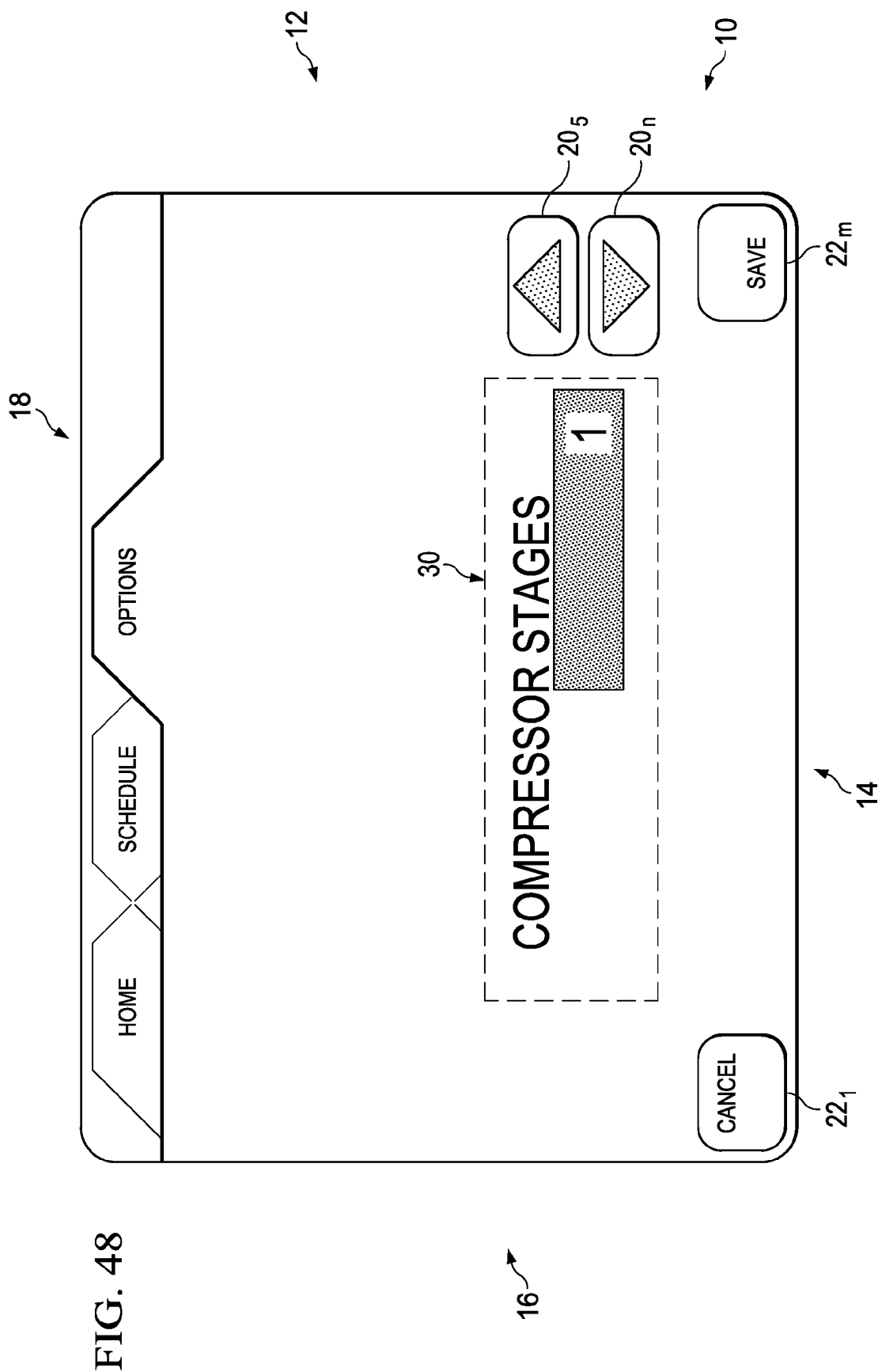
FIG. 48 is a fourth view of the display illustrating programming steps associated with hiding display of menu items not relevant to a user's extant system.
Figure 49:
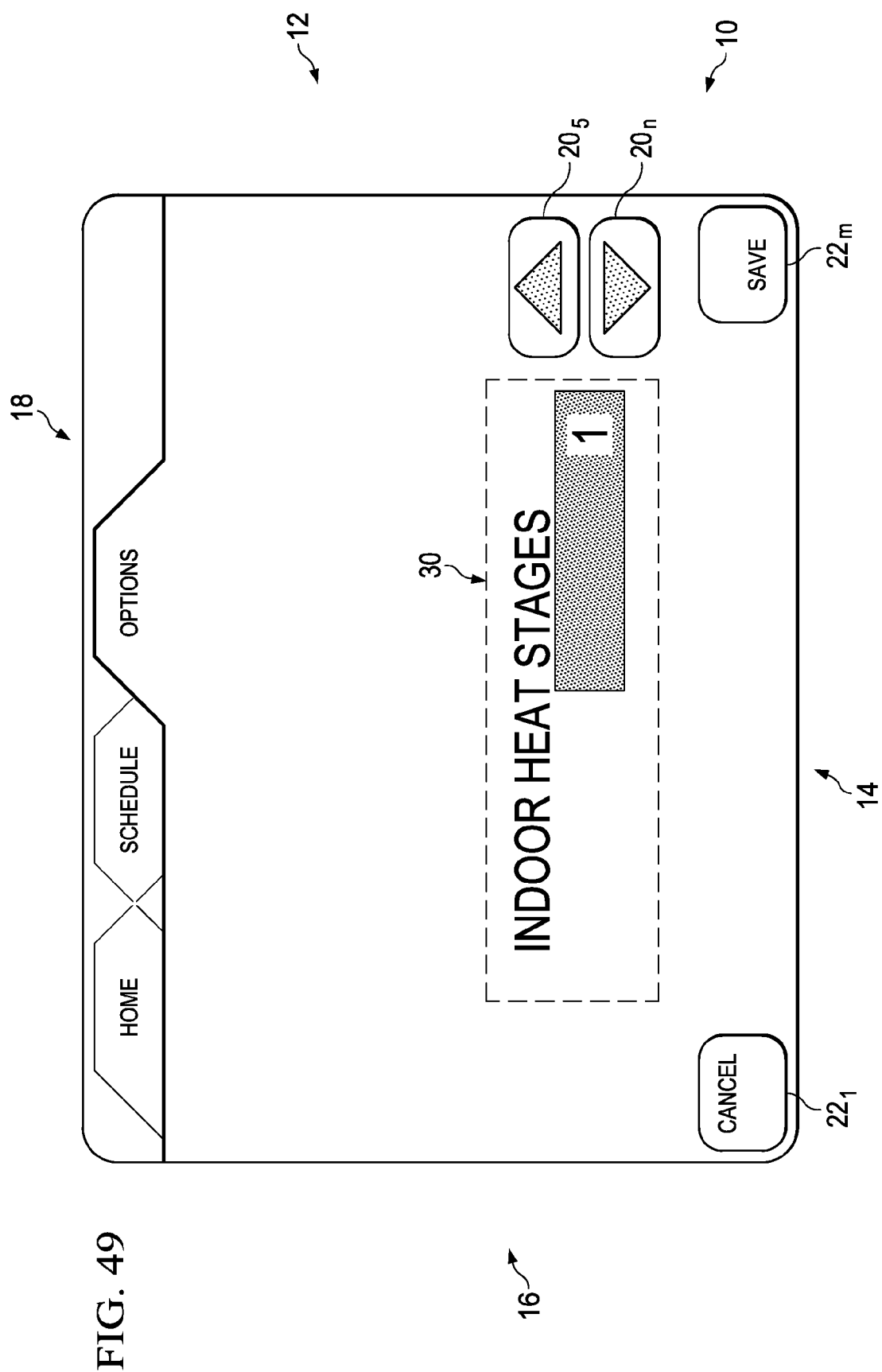
FIG. 49 is a fifth view of the display illustrating programming steps associated with hiding display of menu items not relevant to a user's extant system.
Figure 50:
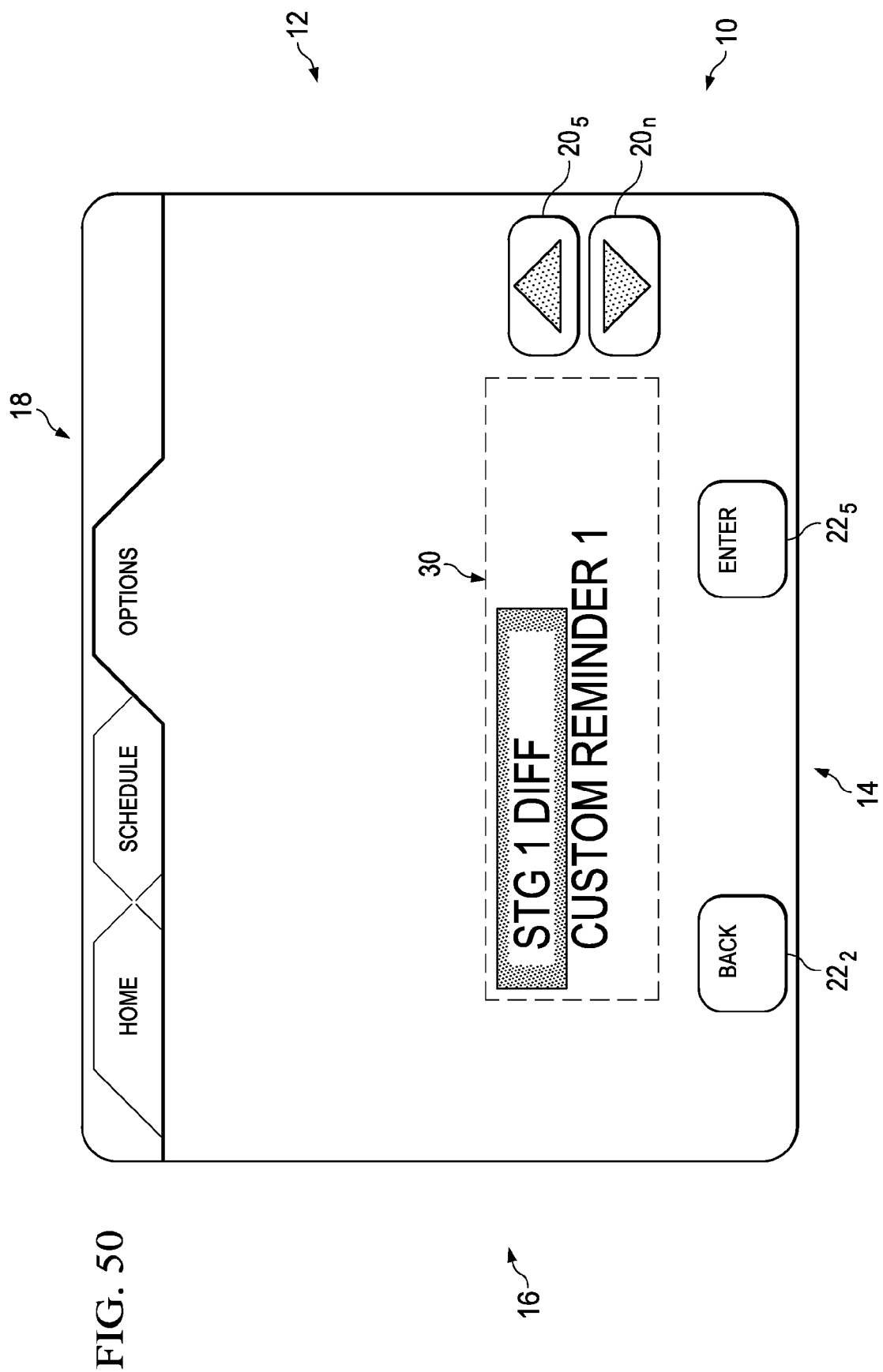
FIG. 50 is a sixth view of the display illustrating programming steps associated with hiding display of menu items not relevant to a user's extant system.

FIG. 45 is a first view of the display illustrating programming steps associated with hiding display of menu items not relevant to a user's extant system. FIG. 46 is a second view of the display illustrating programming steps associated with hiding display of menu items not relevant to a user's extant system. FIG. 47 is a third view of the display illustrating programming steps associated with hiding display of menu items not relevant to a user's extant system. FIG. 48 is a fourth view of the display illustrating programming steps associated with hiding display of menu items not relevant to a user's extant system. FIG. 49 is a fifth view of the display illustrating programming steps associated with hiding display of menu items not relevant to a user's extant system. FIG. 50 is a sixth view of the display illustrating programming steps associated with hiding display of menu items not relevant to a user's extant system. Regarding FIGS. 45-50 together, a user may touch display 10 generally anywhere to activate the backlight and render display 10 easy to read (FIG. 45).

In programming to hide display of selected menu items in a system using display 10, a user places display 10 in an OPTION configuration substantially as described above in connection with FIGS. 5-7. In the OPTIONS configuration display 10 may appear substantially as presented in FIG. 46. To hide display of a selected menu item, a user may press UP arrow $20_S$ or DOWN arrow $20_n$ to scroll through a list of adjustable settings presented in display area 30. Adjustable settings are highlighted or otherwise differentiated from other adjustable settings as each becomes available for selection. A user may select INSTALLER SETTINGS by pressing or otherwise actuating ENTER button $22_5$ when INSTALLER SETTINGS is highlighted. FIG. 41 may be presented at this juncture to warn a user that installer settings must be set by a qualified user. A user may then press ENTER button $22_5$ to advance to installer settings. A user may then press UP arrow $20_S$ or DOWN arrow $20_n$ to scroll through a list of INSTALLER SETTINGS presented in display area 30 (FIG. 46). A user may then select SYSTEM SETUP by pressing or otherwise actuating ENTER button $22_5$ when SYSTEM SETUP is displayed in display area 30 (FIG. 46). A user may then press UP arrow $20_S$ or DOWN arrow $20_n$ to scroll through a list of SYSTEM SETUP choices presented in display area 30 (FIG. 47). A user may then select NON HEAT PUMP by pressing or otherwise actuating SAVE button $22_m$ when NON HEAT PUMP is displayed in display area 30 (FIG. 47).

A user may then press UP arrow $20_S$ or DOWN arrow $20_n$ to scroll through a list of NON HEAT PUMP choices presented in display area 30 (FIG. 47). A user may then select ELECTRIC (indicating an electric system is controlled by a thermostat employing display 10 rather than a gas system) by pressing or otherwise actuating ENTER button $22_5$ when ELECTRIC is displayed in display area 30 (FIG. 47).

After indicating that the system is an ELECTRIC system, a user may be again be presented with a list of SYSTEM SETUP choices presented in display area 30. A user may scroll among the displayed settings using UP arrow $20_S$ or DOWN arrow $20_n$ and may then select COMPRESSOR STAGES by pressing or otherwise actuating ENTER button $22_5$ when COMPRESSOR STAGES is displayed in display area 30 (FIG. 48). A user may then press UP arrow $20_S$ or DOWN arrow $20_n$ to scroll through a list of COMPRESSOR STAGES choices presented in display area 30. A user may then select "1" (indicating that the system controlled by a thermostat employing display 10 has a single compressor stage) by pressing or otherwise actuating SAVE button $22_m$ when "1" is displayed in display area 30 (FIG. 48).

A message INDOOR HEAT STAGES may thereafter be displayed in display area 30 (FIG. 49), and a user may then press UP arrow $20_S$ or DOWN arrow $20_n$ to scroll through a list of INDOOR HEAT STAGES choices presented in display area 30. A user may then select "1" (indicating that the system controlled by a thermostat employing display 10 has a single indoor heat stage) by pressing or otherwise actuating SAVE button $22_m$ when "1" is displayed in display area 30 (FIG. 49). A user may then depress BACK button $22_2$, followed by UP arrow $20_S$ or DOWN arrow $20_n$ to scroll through a list of selections until STG 1 DIFF appears in display area 30 (FIG. 50) and is selected by pressing or otherwise actuating ENTER button $22_5$.

This exemplary set of selections (FIGS. 45-50) would be appropriate, by way of example and not by way of limitation, when a system controlled by a thermostat employing display 10 is a non heat pump system providing electric heat and having a one-stage compressor and one stage of indoor heat. In such an exemplary system, menu items such as, by way of example and not by way of limitation, STG 2 DIFF and STG 3 DIFF would be hidden and not displayed to a user.

Prior art HVAC system controller displays typically present all menu items regardless of whether the physical equipment is connected or otherwise installed or included with the system being controlled. This display of menu items with which a user may be unfamiliar (because the user may have no need to deal with the menu item) may be confusing and worrisome to a user. The user—whether a dealer or a homeowner—may be led to mistakenly believe that there is a need to set a control parameter for something that does not exist in the system at hand.

Providing a capability to hide menu items not associated with a system at hand, as described in connection with FIGS. 45-50, removes irrelevant distractions not associated with equipment installed. By way of example and not by way of limitation, if a dealer configures a system for a single stage furnace no options will be displayed that pertain to second stage settings. By way of further example and not by way of limitation, if a system has not been configured with a humidifier, then no humidification settings will be displayed.

Figure 51:
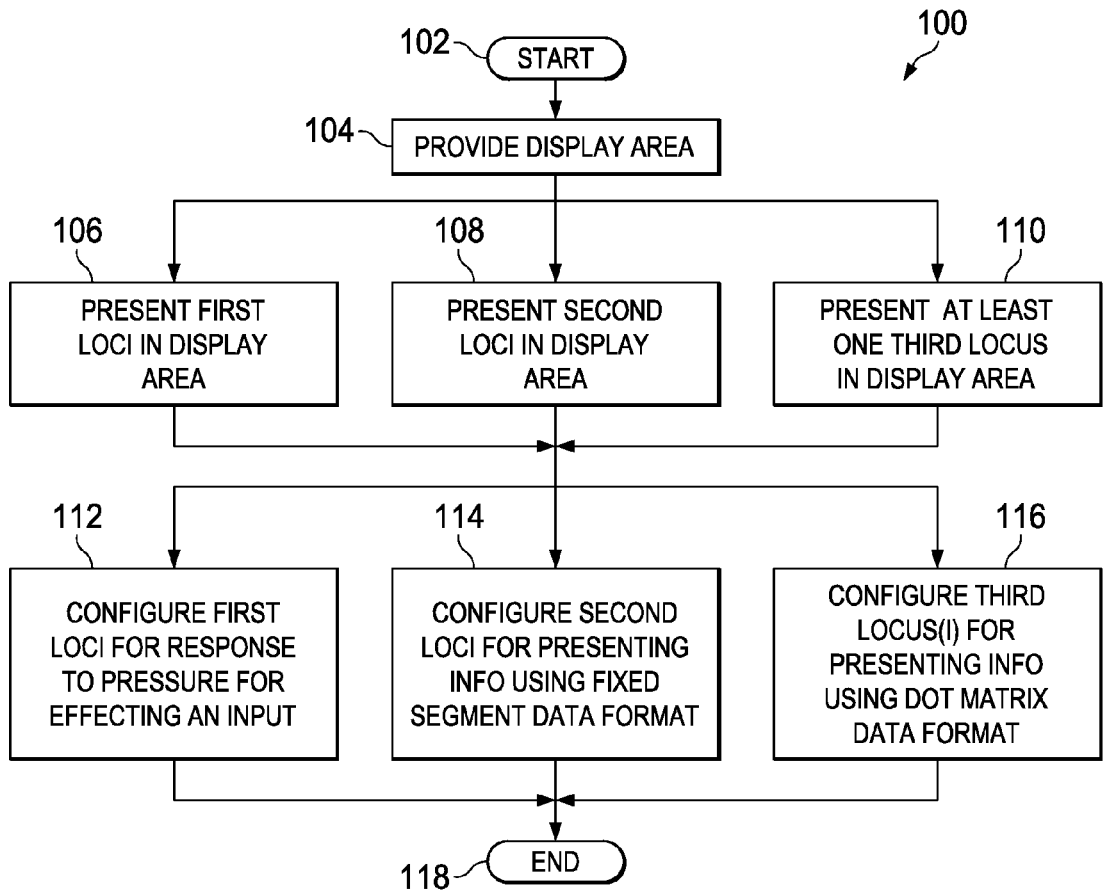
FIG. 51 is a flow chart illustrating the method of the present invention.

FIG. 51 is a flow chart illustrating the method of the present invention. In FIG. 51, a method 100 for entering input to an environmental control system begins at a START locus 102. Method 100 continues with providing a display area, as indicated by a block 104.

Method 100 continues with, in no particular order: (1) presenting a plurality of first loci in the display area, as indicated by a block 106; (2) presenting a plurality of second loci in the display area, as indicated by a block 108; and (3) presenting at least one third locus in the display area, as indicated by a block 110.

Method 100 continues with, in no particular order: (1) configuring each respective first locus of the plurality of first loci for being responsive to pressure for effecting a respective input, as indicated by a block 112; (2) configuring each respective second locus of the plurality of second loci presenting information using a fixed segment data format, as indicated by a block 114; and (3) configuring at least one third locus of the at least one third locus presenting information using a dot matrix data format, as indicated by a block 116. Method 100 terminates at an END locus 118.

Display 10 avoids requiring a user to navigate to system settings by entering a configuration mode, selecting a configuration or other code to configure and then entering or selecting a configuration parameter. Display 10 also avoids requiring a user having to "drill down" through layers of menus by pressing a "next" or "back" button to enter a configuration mode, select a configuration or other code to configure and enter or select a configuration parameter, as is required when operating prior art HVAC control devices. In contrast, display 10 permits a user to scroll through a list of menu items until a desired programmable item is displayed. Thereafter, a user can enter parameters desired for effecting programming of the desired item in real text without having to deal with configuration codes, a user's manual or similar complications.

Those skilled in the art to which this application relates will appreciate that other and further additions, deletions, substitutions and modifications may be made to the described embodiments.

What is claimed is:

1. A display apparatus for a control unit in environmental control system, the display apparatus comprising:
    a display area presenting a plurality of first loci, a plurality of second loci and at least one third locus; each respective first locus of said plurality of first loci being responsive to pressure for effecting a respective response; each respective second locus of said plurality of second loci presenting information using a fixed segment data format; at least one locus of said at least one third locus presenting information using a dot matrix data format; said display apparatus configured to toggle automatically among displays of pre-selected parameters for operation said environmental control system;
    wherein said at least one locus of said at least one third locus includes a plurality of associated customizable selecting areas, each of said associated customizable selecting areas having two definite programmable states, one state being responsive to touch and a second state being non-responsive to touch, each of said associated customizable selecting areas being programmed to effect a predetermined response from said environmental control system to each respective portion of said at least one locus in reaction to pressure applied thereto when said associated customizable selecting areas are responsive to touch, said predetermined response being indicated by a customized message in said dot matrix data format displayed prior to said pressure being applied thereto, and wherein each of said associated customizable selecting areas labels one of said first loci located substantially adjacent thereto as a button for selecting an element displayed in said at least one third locus when said associated customizable selecting areas are non-responsive to touch.

2. A display apparatus for a control unit in an environmental control system as recited in claim 1 wherein at least one said respective first locus overlaps with at least one said respective second locus.

3. A display apparatus for a control unit in an environmental control system as recited in claim 1 wherein at least one said respective first locus overlaps with at least one said respective third locus.

4. A display apparatus for a control unit in an environmental control system as recited in claim 2 wherein at least one said respective first locus overlaps with at least one said respective first locus.

5. A display apparatus for a control unit in an environmental control system as recited in claim 2 wherein each said respective first locus is substantially aligned with a respective said second locus.

6. A display apparatus for a control unit in an environmental control system as recited in claim 4 wherein each said respective first locus is substantially aligned with a respective said second locus.

7. A display apparatus for a control unit in an environmental control system as recited in claim 1 wherein said display area is configured for selectively populating said respective second loci with display information.

8. A display apparatus for a control unit in an environmental control system as recited in claim 1 wherein said display area is configured for selectively populating said respective third loci with display information.

9. A display apparatus for a control unit in an environmental control system as recited in claim 2 wherein said display area is configured for selectively populating said respective third loci with display information.

10. A touchscreen input apparatus for an environmental control system; the apparatus comprising:
    a display area having a plurality of touch-sensitive input loci, at least one first display locus and at least one second display locus; said at least one first display locus presenting information using a fixed segment data format; said touchscreen input apparatus configured to toggle automatically among displays of pre-selected parameters for operating said environmental control system,
    wherein said second display locus presents information using a dot matrix display format and includes a plurality of associated customizable selecting areas, each of said associated customizable selecting areas having two definite programmable states, one state being responsive to touch and a second state being non-responsive to touch, each of said associated customizable selecting areas being programmed to effect a predetermined response form said environmental control system to each respective portion of said at least one locus in reaction to pressure applied thereto, when said associated customizable selecting areas are responsive to touch, said predetermined response being indicated by a customized message in said dot matrix data format displayed prior to said pressure being applied thereto, and wherein each of said associated customizable selecting areas labels one of said first loci located substantially adjacent thereto as a button for selecting an element displayed in said at least one third locus when said associated customizable electing areas are non-responsive to touch.

11. A touchscreen input apparatus for an environmental control system as recited in claim 10 wherein at least one respective touch-sensitive input locus of said plurality of touch-sensitive input loci overlaps with at least one respective first display locus of said at least one first display locus.

12. A touchscreen input apparatus for an environmental control system as recited in claim 11 wherein at least one respective touch-sensitive input locus of said plurality of touch-sensitive input loci overlaps with at least one respective second display locus of said at least one second display locus.

13. A touchscreen input apparatus for an environmental control system as recited in claim 10 wherein each said respective touch-sensitive input locus is substantially aligned with a respective said first display locus.

14. A touchscreen input apparatus for an environmental control system as recited in claim 11 wherein each said respective touch-sensitive input locus is substantially aligned with a respective said first display locus.

15. A touchscreen input apparatus for an environmental control system as recited in claim 10 wherein said display area is configured for selectively populating at least one selected first display locus of said at least one first display locus with display information.

16. A touchscreen input apparatus for an environmental control system as recited in claim 10 wherein said display area is configured for selectively populating at least one selected second display locus of said at least one second display locus with display information.

17. A touchscreen input apparatus for an environmental control system as recited in claim 15 wherein said display area is configured for selectively populating at least one selected second display locus of said at least one second display locus with display information.

18. A method for entering input to an environmental control system; the method comprising:
    (a) providing a display area;
    (b) in no particular order:
        (1) presenting a plurality of first loci in said display area;
        (2) presenting a plurality of second loci in said display area; and
        (3) presenting at least one third locus in said display area; and
    (c) in no particular order:
        (1) configuring each respective first locus of said plurality of first loci for being responsive to pressure for effecting a respective said input;
        (2) configuring each respective second locus of said plurality of second loci for presenting information using a fixed segment data format;
        (3) configuring at least one locus of said at least one third locus for presenting information using a dot matrix data format and to include an plurality of associated customizable selecting areas, each of said associated customizable selecting areas having two definite programmable states, one state being responsive to touch and a second state being non-responsive to touch, each of said plurality of selecting areas programmed to effect a predetermined response from said environmental control system to each respective portion of said at least one locus in reaction to pressure applied thereto when said associated customizable selecting areas are responsive to touch, said predetermined response being indicated by a customized message in said dot matrix data format prior to pressure being applied thereto, and wherein each of said associated customizable selecting areas labels one of said first loci located substantially adjacent thereto as a button for selecting an element displayed in said at least one third locus when said associated customizable selecting areas are non-responsive to touch; and
        (4) toggling automatically among displays of pre-selected parameters for operating said environmental control system.

19. A method for entering input to an environmental control system as recited in claim 18 wherein said display area is configured for selectively populating said respective second loci with display information, and wherein said display area is configured for selectively populating said respective third loci with display information.

* * * * *